US012726525B2

(12) United States Patent
Abotchie

(10) Patent No.: US 12,726,525 B2
(45) **Date of Patent: *Sep. 1, 2026**

(54) LARGE LANGUAGE MODEL TRIGGERED EPHEMERAL DIRECTIVE

(71) Applicant: HackSeal Corporation, Marlborough, MA (US)

(72) Inventor: David D. Abotchie, Shrewsbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/406,023

(22) Filed: Dec. 2, 2025

(65) Prior Publication Data

US 2026/0122112 A1 Apr. 30, 2026

Related U.S. Application Data

(63) Continuation of application No. 19/097,466, filed on Apr. 1, 2025, now Pat. No. 12,519,840, which is a continuation of application No. 19/048,482, filed on Feb. 7, 2025.

(60) Provisional application No. 63/745,139, filed on Jan. 14, 2025, provisional application No. 63/743,657, filed on Jan. 10, 2025, provisional application No. 63/735,591, filed on Dec. 18, 2024, provisional application No. 63/721,179, filed on Nov. 15, 2024, provisional application No. 63/719,270, filed on Nov. 12, 2024, provisional application No. 63/717,017, filed on Nov. 6, 2024, provisional application No. 63/711,371, filed on Oct. 24, 2024.

(51) Int. Cl.
*H04L 9/40* (2022.01)

(52) U.S. Cl.
CPC .................................... *H04L 63/20* (2013.01)

(58) Field of Classification Search
CPC ...................................................... H04L 63/20
USPC ............................................................. 726/1
See application file for complete search history.

(56) References Cited

U.S. PATENT DOCUMENTS 2,126,895 A 8/1938 Knott
6,671,757 B1 12/2003 Multer et al.
(Continued)

OTHER PUBLICATIONS

Papanikolaou, N. et al., “A Toolkit for Automating Compliance in Cloud Computing Services,” International Journal of Cloud Computing 2, vol. 3, Issue 1, Jan. 1, 2014, pp. 45-68.
(Continued)

*Primary Examiner* — Dant B Shaifer Harriman

(57) ABSTRACT

A computer-implemented method is disclosed for dynamically controlling operations of computing resources in an environment using artificial intelligence. A large language model (LLM) analyzes data associated with the computing resources, each governed by a default directive controlling their functional behavior. The LLM identifies suspicious usage patterns within the analyzed data. In response to such detection, the system generates an ephemeral machine-executable directive tailored to address the specific suspicious activity. This ephemeral directive temporarily supersedes the default directive and is enforced to gate or modify the resource’s function, thereby mitigating potentially harmful or unauthorized operations. The approach enables responsive, automated, and context-aware modification of system behavior, leveraging AI-based detection and just-in-time directive generation to enhance operational security and adaptability.

21 Claims, 17 Drawing Sheets

(56) References Cited

U.S. PATENT DOCUMENTS 9,100,363 B2 8/2015 Burchfield et al.
9,229,696 B2 1/2016 Box et al.
9,369,488 B2 6/2016 Woods et al.
10,389,754 B2 * 8/2019 Mortman ................ H04L 63/20
10,715,554 B2 7/2020 Golan et al.
11,429,464 B2 8/2022 Raheja et al.
11,444,946 B2 9/2022 LaManna et al.
11,726,964 B2 8/2023 Randhi et al.
11,770,398 B1 9/2023 Erlingsson et al.
11,909,731 B1 2/2024 Dayan et al.
11,922,220 B2 3/2024 Haghighat et al.
12,309,182 B1 * 5/2025 McAleer ................. G06F 9/455
12,438,919 B1 * 10/2025 Cohen ..................... H04L 63/20
2006/0227713 A1 * 10/2006 Zuberi .................... H04L 1/242 370/389
2007/0128899 A1 * 6/2007 Mayer ................... G06F 9/4406 439/152
2007/0156661 A1 * 7/2007 Allen ...................... H04L 41/22
2010/0095348 A1 4/2010 Foster et al.
2010/0228862 A1 * 9/2010 Myers ................. H04L 65/1045 709/227
2010/0228875 A1 * 9/2010 Myers ..................... H04L 65/65 709/219
2012/0023546 A1 * 1/2012 Kartha .................. H04L 63/104 726/1
2012/0079577 A1 * 3/2012 Hao ................. H04N 21/64322 726/7
2015/0347107 A1 12/2015 Munshi et al.
2016/0103897 A1 * 4/2016 Nysewander ......... G06F 16/254 707/602
2017/0070536 A1 3/2017 Mortman
2018/0109555 A1 * 4/2018 Reddy ................... G06F 21/554
2019/0042737 A1 * 2/2019 Krebs ................. H04L 63/1441
2020/0084053 A1 3/2020 Åkesson
2021/0029175 A1 1/2021 Jeong
2021/0092156 A1 3/2021 Sharif
2021/0365410 A1 11/2021 Bonfiglio et al.
2022/0078181 A1 3/2022 Brito et al.
2022/0201041 A1 6/2022 Keiser et al.
2022/0210194 A1 6/2022 Parekh et al.
2022/0224707 A1 7/2022 Kapoor et al.
2023/0221867 A1 * 7/2023 Radi ................... G06F 11/1004 711/111
2023/0289444 A1 * 9/2023 Ermey .................. G06F 21/552
2023/0401274 A1 * 12/2023 Denninghoff ....... G06F 16/9538
2024/0236150 A1 7/2024 Jadhav et al.
2025/0141931 A1 * 5/2025 Sanghvi .............. H04L 63/0227
2025/0175456 A1 * 5/2025 Crabtree ............... H04L 9/0643

OTHER PUBLICATIONS

PCT International Search Report and Written Opinion, PCT Application No. PCT/US2025/052307, Jan. 16, 2026, 16 pages.

* cited by examiner

Figure 6B:
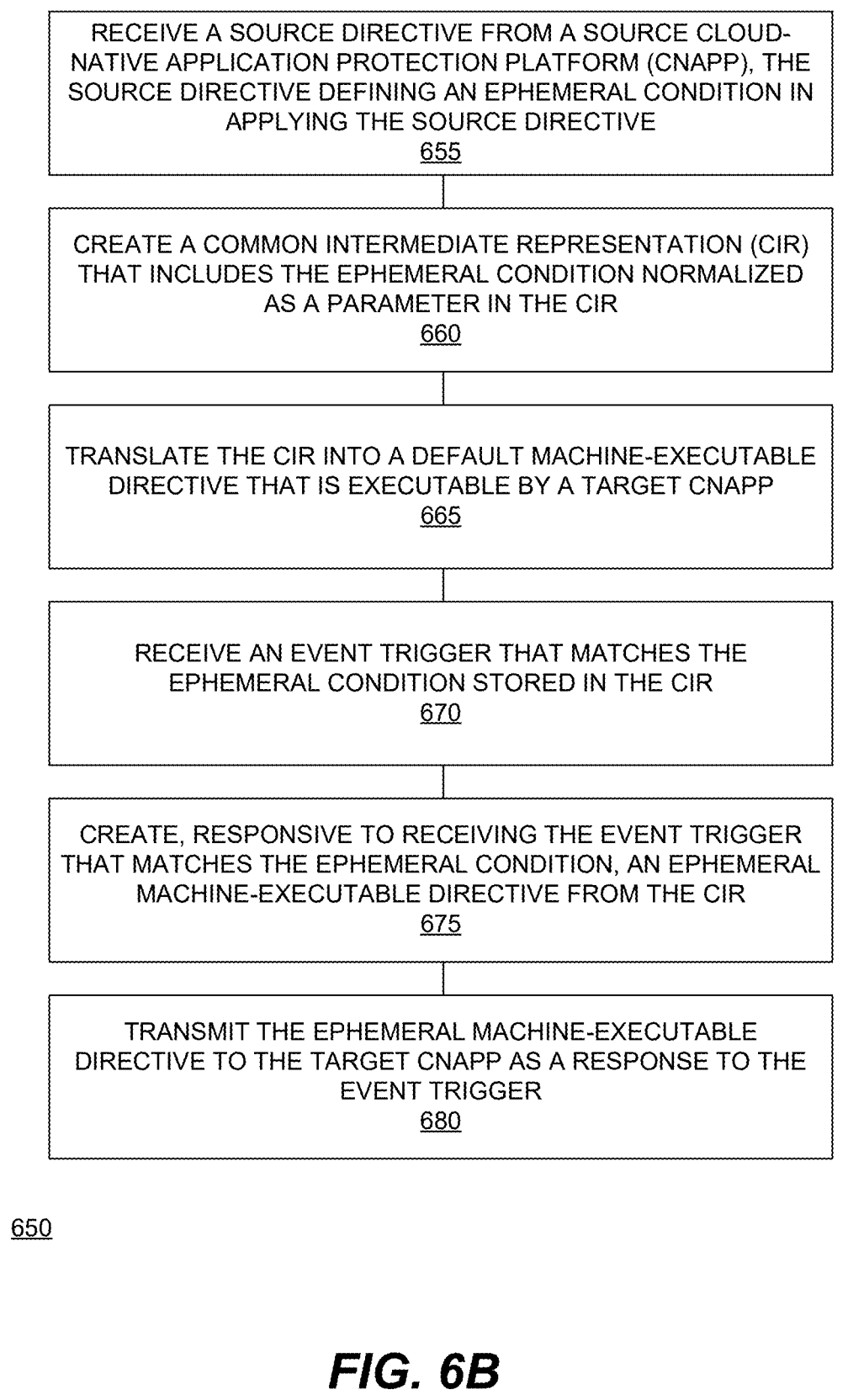

RECEIVE A SOURCE DIRECTIVE FROM A SOURCE CLOUD-NATIVE APPLICATION PROTECTION PLATFORM (CNAPP), THE SOURCE DIRECTIVE DEFINING AN EPHEMERAL CONDITION IN APPLYING THE SOURCE DIRECTIVE
655

CREATE A COMMON INTERMEDIATE REPRESENTATION (CIR) THAT INCLUDES THE EPHEMERAL CONDITION NORMALIZED AS A PARAMETER IN THE CIR
660

TRANSLATE THE CIR INTO A DEFAULT MACHINE-EXECUTABLE DIRECTIVE THAT IS EXECUTABLE BY A TARGET CNAPP
665

RECEIVE AN EVENT TRIGGER THAT MATCHES THE EPHEMERAL CONDITION STORED IN THE CIR
670

CREATE, RESPONSIVE TO RECEIVING THE EVENT TRIGGER THAT MATCHES THE EPHEMERAL CONDITION, AN EPHEMERAL MACHINE-EXECUTABLE DIRECTIVE FROM THE CIR
675

TRANSMIT THE EPHEMERAL MACHINE-EXECUTABLE DIRECTIVE TO THE TARGET CNAPP AS A RESPONSE TO THE EVENT TRIGGER
680

LARGE LANGUAGE MODEL TRIGGERED EPHEMERAL DIRECTIVE

CROSS REFERENCE TO RELATED APPLICATIONS

This application is a continuation application of U.S. patent application Ser. No. 19/097,466, filed Apr. 1, 2025, which is a continuation application of U.S. patent application Ser. No. 19/048,482, filed Feb. 7, 2025, which claims the benefit of U.S. Provisional Patent Application No. 63/711,371, filed on Oct. 24, 2024, U.S. Provisional Patent Application No. 63/715,056, filed on Nov. 1, 2024, U.S. Provisional Patent Application No. 63/717,017, filed on Nov. 6, 2024, U.S. Provisional Ser. No. 63/721,179, filed on Nov. 15, 2024, U.S. Provisional Patent Application No. 63/719,270, filed on Nov. 12, 2024, U.S. Provisional Patent Application No. 63/735,591, filed on Dec. 18, 2024, U.S. Provisional Patent Application No. 63/745,139, filed on Jan. 14, 2025, and U.S. Provisional Patent Application No. 63/743,657, filed on Jan. 10, 2025. All of the abovementioned related applications are hereby incorporated by reference in their entirety.

TECHNICAL FIELD

The instant disclosure is related to machine-executable directive management, and in particular, automated directive migration in governance, provisioning, and cybersecurity related to Cloud native systems.

BACKGROUND

In modern computing environments, organizations face increasing challenges in managing and enforcing policies that govern cloud resources across diverse and evolving infrastructure. These policies, which govern cybersecurity, compliance, and operational workflows, adapt to dynamic regulatory landscapes, emerging security threats, and heterogeneous technological platforms. Many organizations utilize cloud-native application protection platforms (CNAPPs) to manage security and compliance, yet these platforms often operate in siloed environments with proprietary configurations, complicating the migration, translation, and interoperability of policies across different CNAPPs. Moreover, traditional methods of policy management often rely on manual processes that are error-prone, labor-intensive, and incapable of scaling to meet the demands of large, complex environments.

BRIEF DESCRIPTION OF THE DRAWINGS

FIG. 6B is a flowchart depicting an example process for migrating an ephemeral based policy directive, in accordance with some embodiments.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A directive management system provides a framework for managing, translating, validating, and enforcing machine-readable policies across diverse environments, such as cloud-native application protection platforms (CNAPPs) and organizational domains. The directive management system extracts policy directives from various sources, such as CNAPPs or file-based repositories. These directives are normalized into a platform-agnostic format, which may be referred to as common intermediate representation (CIR), enabling consistent processing and cross-platform compatibility. The CIR may include ephemeral conditions that allow the directive management system to generate ephemeral machine-executable directive that may be used to replace another directive based on event or ephemeral trigger. The directive management system may include a platform capabilities database that serves as a knowledge base to store platform-specific configurations, compliance requirements, and operational constraints, which the directive translation engine utilizes to convert CIR objects into target-specific directives while preserving regulatory and operational intent. The directive management system may validate translated directives under simulated scenarios.

In some embodiments, the directive management system may further integrate machine learning models to enhance directive translation, validation, and compliance evaluation by identifying patterns, automating adjustments, and dynamically adapting to changes in regulations and threats. A continuous feedback engine processes runtime data, validation results, and compliance metrics to iteratively improve directive management workflows. Additionally, a user interface provides visibility and tools for administrators to manage policies, compliance statuses, and deployment logs efficiently.

System Overview

Figure 1:
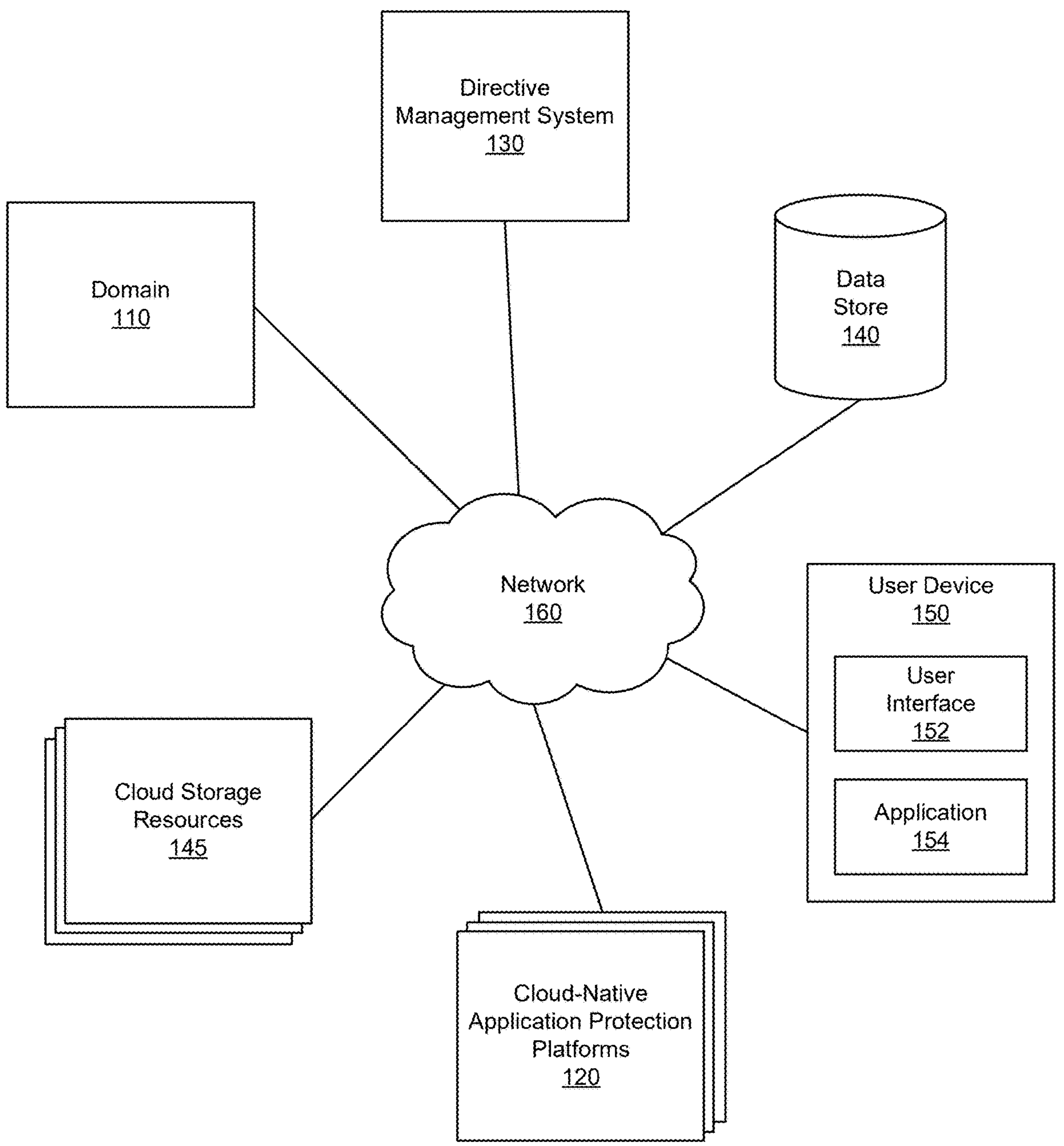
FIG. 1 is a block diagram of a system environment, in accordance with some embodiments.

FIG. 1 is a block diagram that illustrates an example of a system environment 100 for managing data access, in accordance with some embodiments. By way of example, the system environment 100 includes a domain 110, cloud-native application protection platforms (CNAPPs) 120, a directive management system 130, a data store 140, cloud native systems 145, and a user device 150. The entities and components in the system environment 100 communicate with each other through network 160. In various embodiments, the system environment 100 may include different, fewer, or additional components.

The components in the execution environment 100 may each correspond to a separate and independent entity or may be controlled by the same entity. For example, in some embodiments, the directive management system 130 may control the data store 140. In other embodiments, the directive management system 130 and the data store 140 are operated by different entities and the data store 140 provides data storage service to the directive management system 130. In some embodiments, the directive management system 130 may manage policies for multiple domains 110, each domain being a customer of the directive management system 130. In some embodiments, a domain 110 may initially use a first CNAPP 120 to manage its policies and subsequently use the directive management system 130 to migrate the policies to a second CNAPP 120.

While each of the components in the system environment 100 is sometimes described in disclosure in a singular form, the system environment 100 may include one or more of each of the components. For example, there can be multiple user devices 150 communicating with the directive management system 130 and a domain 110. The directive management system 130 may provide policy migration and policies management services to different unrelated domains 110, each of which may use one or more CNAPPs 120. While a component is described in a singular form in this disclosure, it should be understood that in various embodiments, the component may have multiple instances. Likewise, while some of the components are described in a plural form, in some embodiments the component only has a single instance in the system environment 100.

A domain refers to an environment for a group of units and individuals to operate and use domain knowledge to organize activities, enforce policies, and operate in a specific way. An example of a domain is an organization, such as a business, an institute, or a subpart thereof, and the data within it. A domain 110 may define an application environment in which a group of individuals, devices, and other agents organize and perform activities and exchange information. The system environment 100 may include multiple domains 110, which may be customers of the directive management system 130 that provide various directive management-related services to customers, such as policy migration, policy compliance, validation, etc. A domain 110 may be referred to as a business, an organization, or an application environment, depending on the situation. By way of example, a domain 110 may also be referred to as an organization. In some embodiments, the terms domain and organization may be used interchangeably. A domain 110 may be any suitable entity such as a government entity, a private business, a profit organization or a non-profit organization.

A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of a business. For example, a domain may be a subsidiary of a company. Various divisions or departments of the organization may have their own definitions, internal procedures, tasks, and entities. In other situations, multiple businesses may share the same domain.

In some embodiments, a domain 110 may have various types of resources that are under its control. The resources may be directly controlled by the domain 110 within its physical or digital domain, controlled through cloud native systems 145 or managed by the domain 110 through one or more CNAPPs 120. Examples of resources may include data resources, domain knowledge, policies, and named entity resources such as employees. Cloud resources can be related to any aspect of the domain 110. In some situations, domain 110 may use one or more third-party software platforms such as software-as-a-service (SaaS) platforms that provide services to the domain 110. Organization data may be stored and generated by those third-party platforms. Data may be stored in one or more cloud native systems 145. Cloud resources managed in cloud native systems 145 and policy directives related to usage of cloud platforms associated with the cloud native systems 145 may be managed by a domain 110 through one or more CNAPPs 120.

Other examples of resources may include storage buckets, virtual machines, and containerized applications. These resources may be under the control of the domain 110 through various mechanisms. For instance, domain 110 may directly manage these resources through organization-operated infrastructure, such as on-premises data centers or proprietary cloud environments. In some embodiments, the domain 110 may leverage third-party services, such as infrastructure-as-a-service (IaaS) or platform-as-a-service (PaaS) offerings, to provision and operate these resources. In some embodiments, the domain 110 may utilize cloud native systems 145 to store and manage data associated with storage buckets, virtual machines, and containerized applications. Policies governing the usage and access of such resources may be established and enforced by a CNAPP 120.

A domain 110 may implement one or more policies specifying data usage and cybersecurity requirements. These policies may include access control rules, data retention guidelines, encryption standards, and monitoring protocols. For example, access control policies may define which users or devices are authorized to interact with specific data resources, while data retention policies may outline the duration for which data is stored within the domain 110 or in associated cloud native systems 145. Encryption policies may specify that sensitive data must be encrypted both in transit and at rest, ensuring data security across all interactions. Monitoring protocols may include auditing and logging requirements to track access, modifications, or potential breaches. In some embodiments, policies implemented within a domain 110 may be dynamically adjusted based on evolving operational needs, security threats, or regulatory changes. For instance, cybersecurity policies may mandate additional authentication measures during periods of heightened risk or modify access permissions based on user roles or geographical locations. Policies may also include compliance requirements aligned with industry standards. Various policies may be enforced through CNAPPs 120 or other management tools.

In some embodiments, a CNAPP 120 refers to a cloud-native application protection platform that provides services related to enforcing and managing security policies for protecting cloud resources. A CNAPP 120 typically performs functions such as detecting and mitigating threats, identifying misconfigurations, and ensuring compliance with regulatory requirements. A CNAPP 120 may operate across various levels of the cloud stack, including infrastructure, workloads, and applications, to provide security coverage.

A CNAPP 120 may receive policy and cybersecurity configuration by various ways. In some situations, a CNAPP 120 may provide a platform for a customer domain 110 to set up various policies, such as in an onboarding process. In some CNAPP 120 may interact with external systems, such as the directive management system 130, to receive policies for deployment, such as in a migration process where the directive management system 130 provides migrated policies from another CNAPP 120. After deployment, CNAPP 120 actively monitors cloud resources, such as storage buckets, virtual machines, and containerized applications, to detect potential risks, unauthorized access, and vulnerabilities. CNAPP 120 can apply configured rules and policies to enforce access controls, restrict network traffic, and remediate identified issues.

In some embodiments, a CNAPP 120 may provide various services to a domain 110 in connection with enforcing policies of the domain 110. For example, a CNAPP 120 may include services for policy lifecycle management, such as creating, updating, and retiring policies to reflect evolving security needs or regulatory requirements. A CNAPP 120 may perform compliance assessments that evaluate cloud resources against standards such as System and Organization Controls 2 (SOC 2), the General Data Protection Regulation (GDPR), or the Health Insurance Portability and Accountability Act (HIPAA). CNAPP 120 may integrate threat intelligence feeds to dynamically adjust rules in response to emerging threats or vulnerabilities. In some embodiments, CNAPPs 120 may vary in their capabilities and configurations, depending on the security and compliance needs of an organization. CNAPPs 120 can range from lightweight platforms focused on a specific aspect of cloud security, such as application-layer protections, to comprehensive solutions that provide infrastructure-level defenses and compliance tracking.

In some embodiments, examples of CNAPPs 120 may include PRISMA CLOUD by PALO ALTO NETWORKS, WIZ, MICROSOFT DEFENDER for the Cloud, CHECK POINT CLOUDGUARD, LACEWORK, and ORCA SECURITY, among others. Additional examples of specific CNAPPs 120 include AWS services such as SECURITY HUB, GUARDDUTY, EVENTBRIDGE, and CLOUDWATCH ALARMS, as well as AZURE services like RESOURCE MANAGER, MONITOR, And EVENT GRID. Additionally, SPLUNK (SIEM AND SOAR), PALO ALTO NETWORKS XSIAM, CISCO NEXT-GENERATION FIREWALL, and sources such as file-based inputs (YAML, JSON, text logs) and lightweight agents on endpoints such as IoT devices or firewalls are relevant components of CNAPPs. These platforms collectively contribute to managing and securing cloud-native applications. Various CNAPPs 120 may provide cloud security and compliance tools, including threat detection, vulnerability management, and runtime protection for containers and applications. A CNAPP 120 may also provide services on identifying cloud misconfigurations, vulnerabilities, and excessive permissions across multi-cloud environments through continuous security assessments. For example, MICROSOFT DEFENDER may offer integrated tools for securing AZURE resources, extending its capabilities to hybrid and multi-cloud environments with features like advanced threat detection and compliance management. A CNAPP 120 may provide unified cloud-native security with emphasis on automated posture management and application-level protections. Some CNAPPs 120 may also deliver capabilities for workload protection, anomaly detection using machine learning, and integration with DevOps pipelines for proactive risk mitigation.

While CNAPPs 120 are used as primary examples in this disclosure related to management of policy directives, in various embodiments the policy directives managed by the directive management system 130 does not need to involve any CNAPPs 120. For example, the components and processes performed by the directive management system 130 may also be used in local systems that work with local resources, instead of cloud resources. As such, each and every discussion of examples that involve CNAPPs 120 may also be used in local settings.

In some embodiments, a directive management system 130 manages policy directives for domain 110 and interacts with heterogeneous CNAPPs 120. In some embodiments, the directive management system 130 may manage the policy directives in a CNAPP-agnostic manner. In some embodiments, the directive management system 130 may serve as a centralized platform that manages policies for domain 110 that are deployed in different CNAPPs 120. The directive management system 130 may facilitate the creation, storage, migration and deployment of policy directives and ensure compatibility across diverse CNAPP environments without requiring CNAPP-specific adjustments. This directive management system 130 may streamline policy migration by standardizing policies into a format, such as in common intermediate representations (CIR objects), that abstracts CNAPP-specific configurations to enable transitions between different CNAPPs while preserving the intent and functionality of the policies.

In some embodiments, the terms policies and directives may be used interchangeably. For example, a policy of a domain 110 requiring a cybersecurity setting to be approved by a certain manager with the domain 110. This policy directive has at least two parts. The first part is a human readable form that is commonly referred to as a policy. The second part is a machine-executable directive that is stored as part of a policy directive in an algorithm for a CNAPP 120 or the directive management system 130 to automatically enforce the policy. For this disclosure, a policy is sometimes referred to as a directive or a machine-executable directive. Machine-executable directives may generally encompass rules, logics, or configurations (e.g., AWS IAM machine-executable directives, data retention machine-executable directives, security compliance guidelines such as GDPR). Code may refer to the actual software or scripts that implement these directives (e.g., Python scripts, Terraform templates, or microservices that enforce them).

In some embodiments, the directive management system 130 may provide various services to support directive management for domain 110. The services may include directive normalization, directive translation, directive validation and continuous improvement to allow directives of a domain 110 to meet regulatory compliance requirements and are operationally effective. Directive normalization may include converting platform-specific directives into a standardized schema that is agnostic to CNAPPs, such as in CIR objects. In some embodiments, the directive management system 130 may provide translation of directives may include adapting the normalized policies into formats that are compatible with target CNAPPs. In some embodiments, the directive management system 130 may also validate directives in real-time, such as conducting compliance checks and security simulations, to confirm that translated directives enforce the intended security measures within target CNAPPs. In some embodiments, the directive management system 130 may also conduct periodic directive synchronization and AI-driven semantic analysis. Periodic synchronization allows a domain 110 to monitor whether directives remain up-to-date with evolving compliance requirements and security landscapes. In some embodiments, a directive management system 130 may provide semantic analysis to enable deeper understanding and interpretation of policy intent, including in situations of free-text descriptions or ambiguous parameters. The directive management system 130 may integrate various directive management features into a feedback-driven improvement loop that refines directive translation and deployment processes over time based on operational outcomes and new regulatory standards.

In some embodiments, the directive management system 130 may provide configurable deployment options, allowing administrators to choose deployment schedules, validation intervals, and error-handling protocols. The directive management system 130 may also include a dashboard for domain 110, offering visibility into active policies, compliance statuses, and deployment logs.

Figure 2:
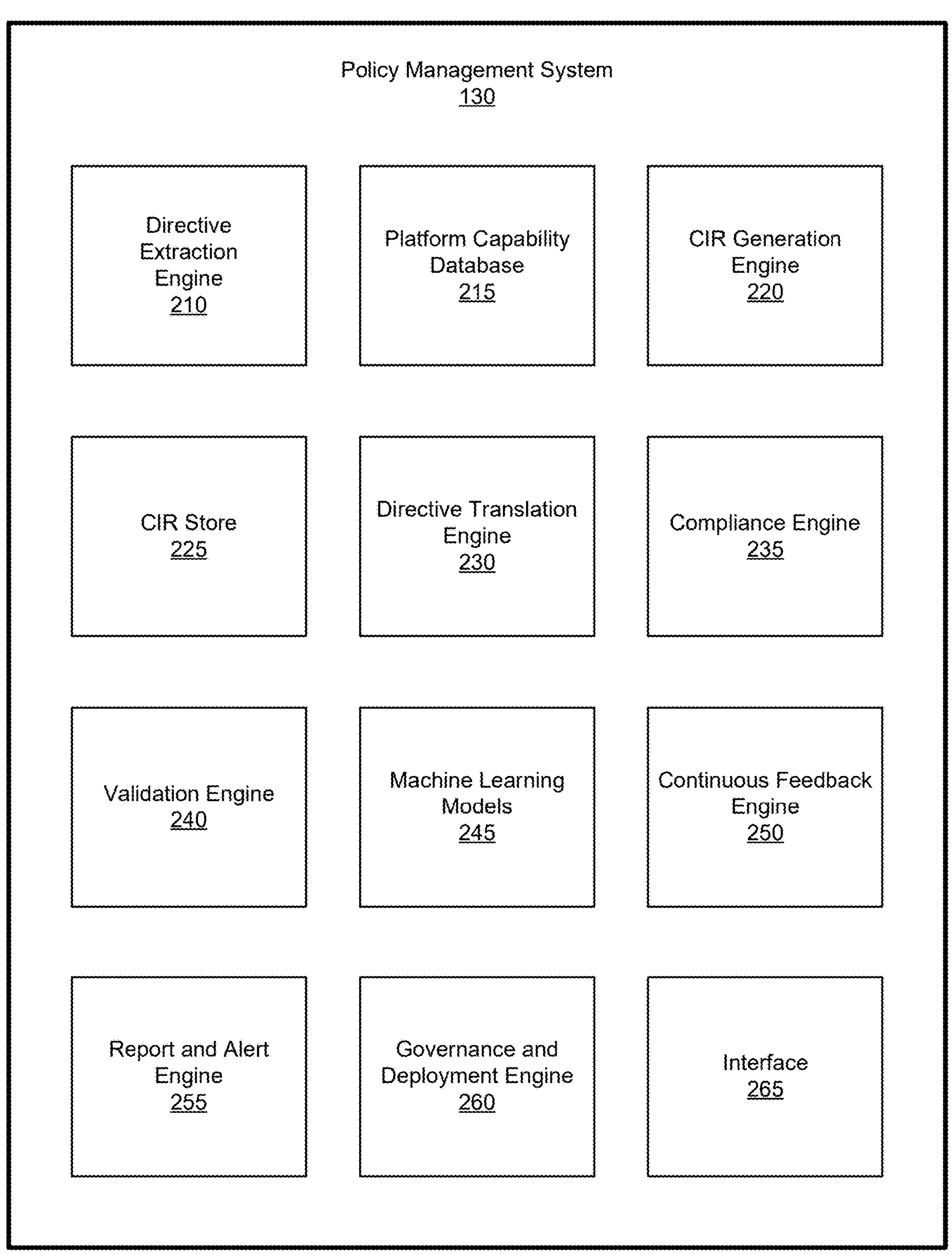
FIG. 2 is a block diagram representing an example directive management system, in accordance with an embodiment.

Additional details and features provided by the directive management system 130 are described in FIG. 2 and subsequent discussions.

In some embodiments, the directive management system 130 may also function as a CNAPP 120 that provides integrated directive management and enforcement capabilities. When operating as a CNAPP 120, the directive management system 130 may directly enforce security policies on cloud native systems 145 by leveraging its internal mechanisms for directive translation, validation, and deployment. The directive management system 130 may act as both a directive repository and an enforcement engine, streamlining the workflow for domain 110 by eliminating the need for separate systems to manage and apply policies. The directive management system 130 may incorporate features such as real-time threat detection, resource-specific compliance checks, and adaptive directive updates to ensure that cloud native systems 145 are continuously protected and aligned with organizational and regulatory requirements.

In various embodiments, the directive management system 130 may take different suitable forms. For example, while the directive management system 130 is described in a singular form, the directive management system 130 may include one or more computers that operate independently, cooperatively, and/or distributively. In some embodiments, the directive management system 130 may be a server computer that includes one or more processors and memory that stores code instructions that are executed by one or more processors to perform various processes described herein. In some embodiments, the directive management system 130 may be a pool of computing devices that may be located at the same geographical location (e.g., a server room) or be distributed geographically (e.g., cloud computing, distributed computing, or in a virtual server network). In some embodiments, the directive management system 130 may be a collection of servers that independently, cooperatively, and/or distributively provide various products and services described in this disclosure. The directive management system 130 may also include one or more virtualization instances such as a container, a virtual machine, a virtual private server, a virtual kernel, or another suitable virtualization instance. The directive management system 130 may provide domains 110 with various data management services as a form of cloud-based software, such as software as a service (SaaS), through the network 160. In some situations, the directive management system 130 may also refer to the entity that operates the directive management system 130. The directive management system 130 may also be referred to as a directive management server 130, even though the system may include multiple servers that operate in a distributed manner.

The directive management system 130 may provide directive management in governance, provisioning, and cybersecurity. Governance encompasses the establishment and enforcement of high-level, machine-readable rules that dictate organizational policies across systems. Governance may include user access controls, compliance requirements, and data residency restrictions to ensure adherence to regulatory frameworks. Examples of governance directives include role-based access controls such as "user.role=admin=>allow full access," data residency rules such as "region!=EU=>deny data transfer," and compliance mandates such as "data encryption=true for compliance=GDPR." The extraction modules play a critical role by querying APIs (e.g., AWS IAM, Azure AD) or parsing configuration files (e.g., YAML, JSON) to manage rules related to permissions, compliance, and role hierarchies effectively.

Provisioning may refer to the automated deployment, configuration, and management of both infrastructure and applications. Provisioning may involve creating virtual machines, networks, or storage and ensuring they are properly configured with security groups and resource policies. For applications, provisioning includes installing binaries or containers, setting runtime dependencies, and applying configurations for monitoring or logging. Extraction modules facilitate provisioning by ingesting Infrastructure as Code (IaC) definitions such as Terraform or CloudFormation and parsing Kubernetes manifests or application configurations to ensure accurate and automated setup across environments.

Cybersecurity focuses on the automated enforcement of policies to protect system integrity, confidentiality, and availability. Machine-executable directives drive these efforts, enabling threat detection, access control, and event-driven responses. Examples include Zero Trust policies such as "user.device_compliance!=true=>deny access," threat response actions such as "threat_level=HIGH=>block network port 22," and cloud-native security rules such as "resource.tag.Environment!=set=>deny resource creation." The directive management system 130 gathers threat intelligence and security directives from platforms such as Splunk or Palo Alto XSIAM and normalize configurations from CNAPP, firewalls, endpoint security tools, and vulnerability management systems, enabling real-time enforcement of cybersecurity policies.

The system environment 100 may include various data stores 140 that store different types of data for different entities. For example, a domain 110 may have data stores 140 that store the organization's data. The directive management system 130 may also use one or more data stores 140 to store data related to preference, configurations, policies and other specific data associated with each domain customer.

Each data store 140 includes one or more storage units, such as memory, that take the form of a non-transitory and non-volatile computer storage medium to store various data. The computer-readable storage medium is a medium that does not include a transitory medium, such as a propagating signal or a carrier wave. In one embodiment, the data store 140 communicates with other components by the network 160. This type of data store 140 may be referred to as a cloud storage server. Examples of cloud storage service providers may include AMAZON AWS, DROPBOX, RACKSPACE CLOUD FILES, AZURE, GOOGLE CLOUD STORAGE, etc. In some embodiments, instead of a cloud storage server, a data store 140 may be a storage device that is controlled and connected to the directive management system 130. For example, the data store 140 may take the form of memory (e.g., hard drives, flash memory, discs, ROMs, etc.) used by the directive management system 130, such as storage devices in a storage server room that is operated by the directive management system 130.

In some embodiments, a cloud native system 145 may be a cloud system that provides services for a domain 110. The type of service can be Cloud data storage, SaaS platforms, AI, AI agents, machine learning platforms, analytics services, Internet of Things (IoT) solutions, cybersecurity services, content delivery networks, DevOps tools, blockchain services, virtual desktop infrastructure, enterprise resource planning (ERP) systems, customer relationship management (CRM) tools, and serverless computing platforms. The cloud resources associated with a domain 110 can be hosted with one or more cloud native systems 145. A cloud native system 145 may manage various cloud resources, such as data resources, compute resources, account resources, network resources, storage resources, application resources, container resources, service resources, security resources, monitoring resources, and API resources. The management and enforcement of policies governing the data resources stored in a cloud native system 145 may be performed by a CNAPP 120 or a directive management system 130. In some embodiments, a cloud native system 145 may interact with a CNAPP 120 or the directive management system 130 to apply specified policies. The policies can govern actions such as access permissions, encryption standards, and data lifecycle management. Examples of cloud native systems 145 may include AMAZON AWS, DROPBOX, RACKSPACE CLOUD FILES, AZURE, GOOGLE CLOUD STORAGE, SALESFORCE, SLACK, ZOOM, SERVICE NOW, WORKDAY, HUBSPOT, ADOBE CREATIVE CLOUD, CLOUDFLARE, ZSCALER, OKTA, PALO ALTO NETWORKS PRISMA, SNOWFLAKE, DATABRICKS, SPLUNK, JIRA, ASANA, FACEBOOK, X.COM, TWILIO, BOX, SHOPFIY, APPLE ICLOUD, TRELLO, and NOTION.

A user device 150 may also be referred to as a client device. A user device 150 may be controlled by a user who may be the user of the directive management system 130, such as an administrator of the domain 110. In such a case, the user device 150 may be an example of an administrator device. A user may also be a user of a CNAPP 120. In some cases, a user device 150 may be controlled by an employee of a domain 110 who manages the policies and cybersecurity issues of the domain 110. The user device 150 may be used to gain access to services provided by the directive management system 130, such as to access a dashboard or a directive management platform provided by the directive management system 130. The user device 150 may be any computing device. Examples of user devices 150 include personal computers (PC), desktop computers, laptop computers, tablet computers, smartphones, wearable electronic devices such as smartwatches, or any other suitable electronic devices.

A user device 150 may include a user interface 152 and an application 154. The user interface 152 may be the interface of the application 154 and allow the user to perform various actions associated with application 154. For example, application 154 may be a software application, and the user interface 152 may be the front end. The user interface 152 may take different forms. In one embodiment, the user interface 152 is a software application interface. For example, a business may provide a front-end software application that can be displayed on a user device 150. In one case, the front-end software application is a software application that can be downloaded and installed on a user device 150 via, for example, an application store (App store) of the user device 150. In another case, the front-end software application takes the form of a webpage interface of domain 110 that allows clients to perform actions through web browsers. The front-end software application includes a graphical user interface (GUI) that displays various information and graphical elements. For example, the GUI may be the web interface of a software-as-a-service (SaaS) platform that is rendered by a web browser. In some embodiments, user interface 152 does not include graphical elements but communicates with a server or a node via other suitable ways, such as command windows or application program interfaces (APIs).

In system environment 100, multiple different types of applications 154 may be operated on a user device 150. Those applications 154 may be published by different entities and be in communication with different components in the system environment 100. For example, in some embodiments, a first application 154 may be a software application that is published as one of the CNAPPs 120 for the administrators of the domain 110 to manage policies. In some embodiments, a second application 154 may be a data management application published by the directive management system 130 for a user to perform directive management, migration and other directive-related tasks. For example, a directive management system 130 may provide a directive dashboard. These are merely examples of various types of applications 154 that may be operated on a user device 150.

The communications among a domain 110, a CNAPP 120, the directive management system 130, a data store 140, a cloud native systems 145, and a user device 150 may be transmitted via a network 160. The network 160 may be a public network such as the Internet. In one embodiment, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats, including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet-switching networks such as the Internet.

Directive Management System

A directive management system 130 may include various directive management-related services. FIG. 2 is a block diagram representing an example directive management system 130, in accordance with an embodiment. In the embodiment shown in FIG. 2, the directive management system 130 includes a directive extraction engine 210, a platform capability database 215, a CIR generation engine 220, a CIR store 225, a directive translation engine 230, a compliance engine 235, validation engine 240, machine learning models 245, a continuous feedback engine 250, a report and alert engine 255, a governance and deployment engine 260, and an interface 265. The functions of the directive management system 130 may be distributed among different components in a different manner than described below. Also, in various embodiments, the directive management system 130 may include different, fewer, and/or additional components.

In some embodiments, the directive extraction engine 210 within retrieves policies, such as in the form of machine-executable directives, from one or more source CNAPPs 120. The directive extraction engine 210 may initiate secure API calls to interact with a source CNAPP 120. In some embodiments, policies are fetched using authenticated and encrypted connections. The retrieved policies may include data elements such as conditions, actions, resources, and compliance metadata specific to the source CNAPP 120. The directive extraction engine 210 processes the directives by identifying their structural components and metadata, extracting key elements such as attribute-value pairs for conditions, procedural directives for actions, and identifiers for targeted resources. The directive data may be passed to downstream components, such as the CIR generation engine 220, for normalization into a common intermediate representation (CIR). The directive extraction engine 210 may also include functionality to handle varying authentication methods, adjust for rate-limiting imposed by the source CNAPP 120, and adapt to changes in API endpoints.

In some embodiments, the directive extraction engine 210 supports multiple directive ingestion methods for importation of directives, such as machine-executable directives, from a platform (e.g., a CNAPP 120) to the directive management system 130. One approach is API ingestion, where policy definitions are retrieved directly from remote endpoints such as a Facebook Graph API, X API, multi-cloud CNAPP API, or SIEM/SOAR API. This method allows the directive management system 130 to remain synchronized with the latest configurations and rules across diverse platforms and tools. In some embodiments, the directive management system 130 can employ light agent ingestion, utilizing lightweight agents deployed on endpoints such as consumer IoT devices, laptops, desktops, or enterprise firewalls. These agents stream local policy fragments or configuration data to the directive management system 130, enabling real-time updates from edge devices. In some embodiments, the directive extraction engine 210 also supports file-based ingestion, processing static or semi-static files in formats such as YAML, JSON, or text logs from both consumer and enterprise contexts, ensuring flexibility in handling diverse data sources.

In some embodiments, the directive extraction engine 210 supports diverse input formats and directive data structures from heterogeneous CNAPPs 120. In some embodiments, the policies retrieved from a source CNAPP 120 by the directive extraction engine 210 may be presented in various formats, including structured configurations such as JSON, YAML, or XML, natural language descriptions, plain text files, or tabular formats such as CSV or Excel files. The policy formats (directive formats) may differ in the way how a policy defines conditions, actions, resources, and compliance attributes, with structured formats using standardized schema fields. Natural language or plain text policies may rely on descriptive language to convey the intents. The policies may define conditions in logical expressions, such as "public_access=true," actions in procedural terms such as "remediate" or "alert," and resources as identifiers such as resource URLs, ARNs, or tags. The directive extraction engine 210 processes various formats by leveraging parsers, schema validators, and, where necessary, natural language processing techniques to normalize the policies into a standardized schema for further processing by the directive management system 130.

In some embodiments, the directive extraction engine 210 may use various parsing techniques, such as leveraging natural language processing to interpret free-text descriptions within the policy or custom attributes that lack structured formatting. In some embodiments, the directive extraction engine 210 may accommodate incomplete directive data by applying fallback strategies or requesting supplementary data from the source CNAPP 120. In some embodiments, the directive extraction engine 210 may identify and preprocess compliance tags such as SOC 2 or HIPAA to preserve the tags for downstream normalization and translation processes.

In some embodiments, the platform capabilities database 215 is a structured knowledge base within the directive management system 100 that stores detailed information about a platform's (e.g., a CNAPP 120, a domain 110) configurations, capabilities, constraints, and compliance frameworks. The platform capabilities database 215 may serve as a knowledge based for the directive translation engine 230 to convert platform-agnostic CIR—which standardize policy intent, including conditions, actions, resources, and metadata—into platform-specific configurations. The platform capabilities database 215 provides granular knowledge of how each target platform interprets and enforces policies. In some embodiments, the directive management system 130 queries the platform capabilities database 215 to map CIR policies into valid, platform-specific syntax, ensuring proper enforcement and compliance across diverse systems.

In some embodiments, the platform capabilities database 215 is a structured repository that stores data about the configurations, enforcement mechanisms, compliance tags, and resource representations of supported platforms. The platform capability database 215 provides data for translating CIR-based rules into actionable, platform-specific syntax by providing granular details about each platform's capabilities and constraints. This includes knowledge of supported actions such as deny, remediate, alert, or monitor, as well as platform-specific compliance tags such as HIPAA and GDPR. In some embodiments, the platform capability database 215 may incorporate zero-trust features, such as micro-segmentation and user-posture checks, which may be used for enforcing modern security policies.

In some embodiments, the platform capabilities database 215 may maintain data about configuration syntax and mappings to compliance frameworks. For example, the platform capability database 215 may distinguish between formats such as JSON, YAML, and Rego. The platform capability database 215 may include platform-specific resource references, such as Azure Resource Manager IDs and AWS ARNs. In some embodiments, the platform capability database 215 may map compliance frameworks such as PCI-DSS, ISO 27001, SOC 2, and HIPAA, detailing feature support across platforms. If gaps are identified—such as a scenario where Splunk supports ephemeral dynamic blocking while Palo Alto XSIAM requires an external script—the platform capabilities database 215 flags the need for custom bridging to ensure directive enforcement consistency.

In some embodiments, the CIR generation engine 220 converts the extracted policies from the directive extraction engine 210 into common intermediate representations (CIR objects). The CIR serves as a platform-agnostic (e.g., CNAPP-agnostic) schema that standardizes policy elements, such as conditions, actions, resources, and metadata, into a uniform format. In some embodiments, the transformation performed by the CIR generation engine 220 may remove platform-specific syntax and ensures that policies from heterogeneous CNAPPs 120 can be represented in a consistent structure. For example, conditions specifying "public_access=true" and actions such as "alert" or "remediate" are mapped into predefined CIR fields, while resource identifiers, such as ARNs or tags, are normalized into a unified format compatible with downstream translation and validation processes. The CIR generation engine 220 may also integrate compliance attributes, such as SOC 2 or HIPAA tags, into the CIR's metadata, preserving the regulatory context of the original policies.

In some embodiments, the CIR objects may be generated using different approaches, such as ontology-driven, event-based, or probabilistic-driven frameworks. In some embodiments, ontology-driven CIR objects may rely on structured domain knowledge, defining entities, relationships, and attributes based on a predefined ontology. Ontology-driven CIR objects may provide semantically rich representations of policies, capturing intent and context through formalized relationships and hierarchical classifications. In some embodiments, event-based CIR objects may capture conditions and actions as event-triggered rules. Policies may be defined in terms of specific triggers, responses, and state changes within a system. Event-based CIR objects may be used to enforce real-time monitoring and reactive security measures. In some embodiments, probabilistic-driven CIR objects may incorporate uncertainty and likelihoods into the representations. Probabilistic-driven CIR objects may allow for the modeling of policies that account for variable conditions or risk assessments, such as evaluating the probability of a security breach based on observed patterns or historical data.

In some embodiments, the CIR generation engine 220 may select or combine various CIR-generation approaches depending on the source policies and the intended application. For example, ontology-driven CIR objects may be generated for policies requiring rigorous semantic alignment with regulatory standards or complex hierarchical relationships between resources and compliance requirements. Event-based CIR objects may be used for policies targeting runtime enforcement, such as detecting and mitigating unauthorized access based on observed events. Probabilistic-driven CIR objects may be employed when policies involve adaptive decision-making, such as dynamically adjusting access controls based on threat levels or user behavior patterns.

In some embodiments, the CIR generation engine 220 processes policies with varying data types and levels of structure. The input policies may include highly structured configurations, semi-structured descriptions, or unstructured natural language elements. For structured policies, the CIR generation engine 220 may use schema-based parsers to extract and map data fields directly into the CIR format. For semi-structured or unstructured policies, the CIR generation engine 220 may apply natural language processing models to interpret the policy's intent, conditions, and actions, converting them into standardized CIR fields. In some embodiments, the CIR generation engine 220 may handle multiple resource reference types, such as resource tags, URLs, and object paths, by applying normalization rules to ensure compatibility across CNAPPs 120. If certain policy attributes or fields are missing, the CIR generation engine 220 may apply fallback strategies, such as assigning default values or generating placeholder entries, to maintain schema integrity and facilitate downstream processing.

CIR objects may be policy driven (directive driven) and/or code driven. In code-centric embodiments, the directive management system 130 emphasizes managing and analyzing code directly, bypassing high-level policy directives. The CIR generation engine 220 may generate CIRs from code, instead of policy directives. For instance, implementation scripts such as Terraform templates or Python code can be translated into a CIR format for analysis, optimization, or automation without referencing explicit policies. This enables the CIR to facilitate tasks such as configuration checks, resource provisioning, or runtime deployment purely based on the structure of the translated code, while also managing version control and environment setup independently of policy guidance. The code-driven approach extends to security scanning and runtime enforcement, where the directive management system 130 analyzes code artifacts to detect vulnerabilities, enforce standards, or verify dependencies. At runtime, the directive management system 130 can intercept and enforce behaviors such as memory usage or network activity directly from the CIR's code representation, eliminating reliance on external policy constructs.

In some embodiments, the CIR store 225 is a data store that may serve as a centralized repository for storing CIR objects generated by the CIR generation engine 220. The CIR store 225 maintains the standardized, platform-agnostic schemas of cybersecurity policies. The CIR objects may be stored in formats that are readily accessible for downstream processes such as translation, validation, and deployment. In some embodiments, the CIR store 225 may organize the CIR objects using indexing and metadata tagging and may supports structured querying based on policy attributes, such as compliance requirements, affected resources, or security conditions. The CIR store 225 may support version control for directive management system 130 to track changes to policies over time and retrieve historical versions when required. The stored CIR objects may also be annotated with operational data, such as validation results or deployment history, to provide a comprehensive view of the policy lifecycle.

In some embodiments, the CIR store 225 may be implemented using various data storage technologies and configurations, such as in relational databases, document-oriented databases, or distributed storage systems. The CIR store 225 may support schema validation so that the stored CIR objects are conformed to the predefined structure. In some situations, the CIR store 225 may include encryption and access control measures to protect sensitive policy information. In some situations, the directive management system 130 may restrict access to authorized entities within the CNAPP 120 or a domain 110.

In some embodiments, the directive translation engine 230 converts CIR objects into target-specific machine-executable directives compatible with an intended platform, such as a targeted CNAPP 120. The directive translation engine 230 leverages mapping rules, AI-driven intent analysis, and semantic alignment techniques to translate policies to accurately reflect the original intent of the source policies while adapting to the syntax, configurations, and constraints of the target CNAPP 120. For instance, a CIR condition specifying "public_access=true" and an action such as "deny" may be translated into a YAML configuration for one CNAPP 120 or a JSON policy for another CNAPP 120, depending on the target platform's requirements. In some embodiments, the directive translation engine 230 may also include algorithms to ensure compliance attributes, such as SOC 2 or HIPAA tags, are retained or mapped into equivalent constructs in the target format, ensuring regulatory adherence during the translation process.

In some embodiments, the directive translation engine 230 may support different translation approaches to generate machine-executable directives, such as rule-based, AI-driven, and hybrid techniques. Rule-based translation may use predefined mappings between CIR fields and the constructs of various CNAPPs 120, such as certain well-understood platforms with stable configurations. AI-driven translation may employ natural language processing and machine learning models to interpret ambiguous or free-text descriptions in CIR objects to dynamically generate target-specific configurations when direct mappings are unavailable. Hybrid approaches combine various methods, using rules for standard constructs and AI models for more complex or evolving elements. The directive translation engine 230 may also account for platform-specific constraints, such as API rate limits, naming conventions, or resource hierarchies, and apply normalization techniques to resolve conflicts. In some embodiments, the directive translation engine 230 may generate custom scripts or workflows when the target CNAPP 120 lacks native support for a specific policy element.

In some embodiments, the compliance engine 235 may evaluate deployed policies, such as policies translated by the directive translation engine 230, against applicable regulatory and domain organizational standards. The compliance engine 235 cross-references policy attributes, conditions, and actions with predefined compliance frameworks, such as SOC 2, HIPAA, GDPR, or ISO 27001, to determine whether the translated policies meet the requirements for deployment under a CNAPP 120. The compliance engine 235 may validate attributes such as encryption requirements, access control configurations, and data retention policies, identifying any discrepancies or gaps that could lead to non-compliance. The compliance engine 235 generates detailed compliance reports that annotate the policies with results, such as "pass," "fail," or "requires manual review." These reports may be stored for audit purposes or presented to administrators via the interface 265.

In some embodiments, the compliance engine 235 supports dynamic and extensible validation mechanisms to handle diverse regulatory landscapes and evolving standards. Compliance rules may be defined as static configurations, rule-based logic, or machine learning models capable of adapting to new regulatory changes. For example, the compliance engine 235 may use predefined rule sets to validate policies against fixed thresholds, such as a maximum retention period for sensitive data. In some embodiments, the compliance engine 235 may use AI to interpret free-text compliance requirements and dynamically apply the requirements to the policy evaluation process. The compliance engine 235 may also integrate with external compliance tools or third-party regulatory feeds to update validation criteria in real time. To account for the specific needs of different CNAPPs 120 or domains 110, the compliance engine 235 may apply contextual adjustments to the validation rules, such as regional data privacy regulations or industry-specific security standards.

In some embodiments, the validation engine 240 may perform thorough evaluations of translated policies to ensure the functionality, accuracy, and adherence to intended security objectives within a target domain 110 or a target CNAPP 120. The validation engine 240 may apply simulated scenarios, compliance checks, and security tests to verify that the policies enforce the expected conditions and actions without introducing misconfigurations or vulnerabilities. For example, the validation engine 240 may simulate an unauthorized access attempt to confirm that a policy denying public access to storage resources successfully triggers the "deny" action. Validation results, such as pass/fail outcomes, performance metrics, and error logs, are recorded and analyzed to identify issues or improvements needed before deployment. The validation engine 240 may also provide these results to the interface 265 for review by administrators or feed them into the continuous feedback engine 250 for iterative refinements.

In some embodiments, the validation engine 240 may support different policy validation strategies tailored to the specific requirements of the policies and the target CNAPP 120. These strategies may include static analysis and dynamic validation. Statis analysis may examine the policy's syntax and logic for errors or inconsistencies. Dynamic validation may test the policy's behavior in simulated or isolated environments. The validation engine 240 may use compliance rule sets to validate adherence to regulatory standards, such as SOC 2 or GDPR, and may incorporate predefined or user-defined test cases to verify specific security scenarios. In some embodiments, the validation engine 240 may integrate with external testing frameworks or employ AI-driven analysis to interpret ambiguous or complex policies. The validation engine 240 can adapt its processes to different CNAPPs 120 by applying platform-specific configurations or utilizing APIs to execute validations directly in the target environment.

In some embodiments, machine learning models 245 are used to enhance the processes of directive translation, validation, compliance evaluation, and continuous improvement in the directive management system 130. A machine learning model 245 may analyze historical data, such as policy deployment outcomes, compliance results, and detected misconfigurations, to refine the ability of the directive management system 130 to interpret, translate, and validate cybersecurity policies. For example, a machine learning model 245 may identify patterns in policy failures to recommend adjustments in translation logic or validation criteria, ensuring improved alignment with the security objectives of the source CNAPP 120 and the requirements of the target CNAPP 120. A machine learning model 245 may also interpret free-text descriptions or ambiguous conditions in source policies, mapping them to the standardized schema of the CIR and generating accurate target-specific configurations. The machine learning models 245 allow the directive management system 130 to dynamically adapt to evolving regulatory standards, emerging threats, and changes in CNAPP capabilities.

In some embodiments, a machine learning model 245 can be trained on diverse datasets and tailored to specific aspects of directive management. For translation, a machine learning model 245 may include natural language processing techniques, such as transformer-based models, to semantically analyze free-text policy descriptions and generate equivalent constructs for the CIR or target CNAPP 120. For compliance evaluation, a machine learning model 245 may use classification techniques to predict policy adherence to regulatory frameworks based on policy attributes and historical compliance data. In some embodiments, reinforcement learning models may be employed to optimize validation processes. A machine learning model 245 may learn from iterative testing scenarios to improve policy accuracy and performance. A machine learning model 245 may also incorporate clustering algorithms to group policies with similar attributes to allow efficient management and recommendation of best practices for domains 110. The outputs from the machine learning models 245 are integrated into the directive management system 130, providing insights and automation that enhance the effectiveness and adaptability of directive translation, validation, and deployment workflows.

In some embodiments, the continuous feedback engine 250 may collect and process feedback from various stages of directive management, including translation, validation, deployment, and runtime monitoring in one or more CNAPPs 120 or in a domain 110. The continuous feedback engine 250 may analyze performance metrics, compliance outcomes, and detected security events to refine the directive management processes iteratively. For example, if validation results indicate frequent misconfigurations or compliance failures, the continuous feedback engine 250 updates the rules or models used by the directive translation engine 230 and validation engine 240 to enhance the accuracy of the directive translation engine 230 and the validation engine 240. The continuous feedback engine 250 may also incorporate feedback from real-world deployment data, such as resource performance metrics, operational anomalies, and audit logs, to adjust policies dynamically and improve the policies'alignment with organizational and regulatory requirements.

In some embodiments, the continuous feedback engine 250 may use advanced analytics and machine learning techniques to evaluate and apply feedback. The engine may employ anomaly detection models to identify unexpected behaviors in deployed policies or trend analysis to assess the long-term effectiveness of policy changes. In some embodiments, the continuous feedback engine 250 may prioritize and categorize feedback to focus on critical issues such as compliance violations or high-severity security threats. Feedback may be presented to administrators via the interface 265, allowing for manual review or override, or fed directly into machine learning models 245 for automated refinement of policy processes.

The continuous feedback engine 250 may use different feedback sources, including performance logs, validation reports, compliance assessments, and user-provided inputs to ensure that the directive management system 130 remains responsive to the dynamic needs of domains 110 and the evolving capabilities of CNAPPs 120. By maintaining this continuous improvement loop, the continuous feedback engine 250 enhances the overall reliability and effectiveness of the directive management workflows.

In some embodiments, the report and alert engine 255 may generate detailed reports and real-time alerts related to directive management activities, compliance results, and security events. The report and alert engine 255 consolidates information from various components, such as validation outcomes from the validation engine 240, compliance assessments from the compliance engine 235, and feedback metrics from the continuous feedback engine 250. These reports may include summaries of directive translation processes, compliance pass/fail statuses, and identified misconfigurations or threats within the target CNAPP 120. The generated alerts provide immediate notifications of critical events, such as validation failures, compliance violations, or detected vulnerabilities, ensuring timely responses from administrators or automated systems. Reports and alerts may be delivered to the interface 265, where administrators can review, acknowledge, or act upon the information.

In some embodiments, the report and alert engine 255 supports configurable reporting and alerting mechanisms to cater to the specific requirements of domains 110 and CNAPPs 120. Reports may be generated in various formats, such as PDFs, spreadsheets, or dashboards, and may be customized to include specific metrics, such as policy adherence rates, resource-level security gaps, or audit trail logs. Alerts can be configured for delivery through multiple channels, including email, SMS, or system dashboards, and may include varying levels of severity, such as informational, warning, or critical. The report and alert engine 255 may also integrate with external monitoring tools or incident response systems, enabling seamless communication and escalation of issues. Additionally, the report and alert engine 255 may leverage historical data to generate trend analyses and predictive insights, assisting administrators in proactive directive management and long-term planning.

In some embodiments, the governance and deployment engine 260 may manage the configuration, scheduling, and deployment of policies to target CNAPPs 120 or a target domain 110 while ensuring adherence to governance requirements and organizational policies. In some embodiments, the governance and deployment engine 260 may coordinate the deployment process, converting validated and translated policies into configurations compatible with specific CNAPPs 120 and delivering the policies via secure interfaces or APIs. The governance and deployment engine 260 may also support the enforcement of deployment governance rules, such as access controls, approval workflows, and audit logging, to ensure that policy updates align with organizational compliance and operational guidelines. The governance and deployment engine 260 may schedule deployments based on administrator-defined intervals, immediate application requirements, or triggered events, such as changes in compliance regulations or detected security incidents.

In some embodiments, the governance and deployment engine 260 may provide flexible configuration and customization options to accommodate diverse deployment scenarios and governance models. The governance and deployment engine 260 may allow administrators to define deployment strategies, such as incremental rollouts, blue-green deployments, or canary testing, to minimize the impact of policy changes. Deployment schedules may be configured to align with maintenance windows, regulatory deadlines, or real-time security requirements. The governance and deployment engine 260 may also integrate with external systems, such as CI/CD pipelines or infrastructure orchestration tools, to automate policy application workflows. To support governance, the governance and deployment engine 260 may track deployment actions, including policy versions, timestamps, and responsible users, maintaining a comprehensive audit trail for regulatory and operational review. In some embodiments, the governance and deployment engine 260 may include mechanisms to detect and resolve deployment conflicts, such as overlapping policies or incompatible configurations.

In some embodiments, the interface 265 may provide a dashboard for administrators and users to interact with the directive management system 130 and manage policies across heterogeneous CNAPPs 120. The interface 265 displays comprehensive information, including active policies, compliance statuses, deployment logs, validation results, and real-time alerts generated by the report and alert engine 255. The interface 265 allows users to perform various actions, such as reviewing policy configurations, initiating directive translations, scheduling deployments, and monitoring compliance assessments. Through this interface, administrators can access a graphical representation of the policy lifecycle, enabling the administrators to identify and address issues related to policy validation, deployment conflicts, or regulatory compliance.

In some embodiments, the interface 265 includes interactive tools and visualizations to simplify complex directive management tasks. The dashboard may feature dynamic graphs, charts, and tables summarizing metrics, such as compliance adherence rates, policy deployment success rates, and detected security vulnerabilities. The interface 265 may also support policy creation and editing through intuitive input fields, dropdown menus, and AI-driven suggestions, which guide users in defining conditions, actions, and compliance requirements. Notifications and alerts generated by the report and alert engine 255 may be displayed, categorized by severity, and accompanied by recommended actions. In some embodiments, the interface 265 may also provide audit trail access, allowing users to track changes, view historical policy versions, and analyze trends over time.

In some embodiments, the interface 265 includes a navigation bar that provides links to the primary sections of the directive management dashboard, such as Home, Create Policy, Policies, Compliance Reports, ML Insights, History, and Alerts. The Home section presents a default overview of the system's activities and metrics, while the Create Policy section serves as a user interface for authoring custom policies. The navigation bar may also display the logged-in user's role and include a logout option, offering users streamlined access to system functionalities and ensuring secure interactions.

In some embodiments, the interface 265 includes a create-custom-policy panel that allows users to define and configure new policies. This panel provides fields for entering the policy name, description, conditions, actions, and compliance tags. The panel incorporates an AI/NLP-enhanced suggestion box that dynamically displays the policy's intent, recommended changes, and identified risks based on user input. Users may save the policy in the CIR format or trigger its translation and deployment to multiple CNAPPs 120 using dedicated buttons. Validation of the policy occurs in real time, with the directive management system 130 checking the validity of conditions and the recognition of compliance tags before the policy is finalized.

In some embodiments, the interface 265 includes a real-time alerts panel that displays notifications of critical events, such as validation failures, compliance issues, or detected security vulnerabilities. Alerts are delivered through a WebSocket or event queue, with high-priority alerts prominently displayed at the top alongside noticeable icons. Each alert is interactive, allowing users to click for more details about the issue, including the affected policy, the CNAPP 120 it pertains to, and suggested remediation steps. The panel also includes options to acknowledge or dismiss alerts, and resolved alerts may contribute to machine learning refinements or administrative notes for future reference.

In some embodiments, the interface 265 includes a policies and compliance overview panel that presents an aggregated view of recently deployed policies, the target CNAPPs 120, and corresponding compliance results. This panel highlights specific compliance failures, such as a HIPAA failure due to encryption issues, and provides actionable suggestions generated by machine learning models to address these failures. The panel displays aggregate compliance scores and pass rates for different regulatory frameworks and includes links or buttons to apply machine learning recommendations, such as adding scripts or adjusting scanning intervals.

In some embodiments, the interface 265 includes a historical analysis and continuous integration and continuous delivery (CI/CD) panel that offers insights into the version-controlled history of policies and the logic of the directive management system 130. This panel may display a list of Git commits, allowing users to view diffs between policy versions, track the introduction of machine learning-driven changes, and assess their impact on compliance outcomes. Time-series graphs visualize trends such as compliance scores, latency, and threat detection rates, providing users with a comprehensive understanding of system performance over time. The panel also includes options to trigger CI pipelines or sandbox tests directly from the dashboard, ensuring that directive management workflows align seamlessly with continuous integration and delivery practices.

In various embodiments, an interface 265 may take various forms. In some embodiments, an interface 265 may be a software application interface that is provided and operated by the directive management system 130. For example, the directive management system 130 may provide a SaaS platform or a mobile application for use to receive epigenetic analysis and recommendations. In some embodiments, the interface 265 may take the form of various types of applications. For instance, the interface 265 may be a standalone mobile app that users can download on their smartphones or tablets, allowing the users to manage policies. In some embodiments, the interface 265 may also be implemented as a web-based interface, accessible through standard web browsers. In some embodiments, an interface 265 may also take the form of an application programming interface. The API may be in compliance with any common API standards such as Representational State Transfer (REST), query-based API, Webhooks, etc. The data transferred through the API may be in formats such as JSON and XML.

Directive Management Pipeline

Figure 3:
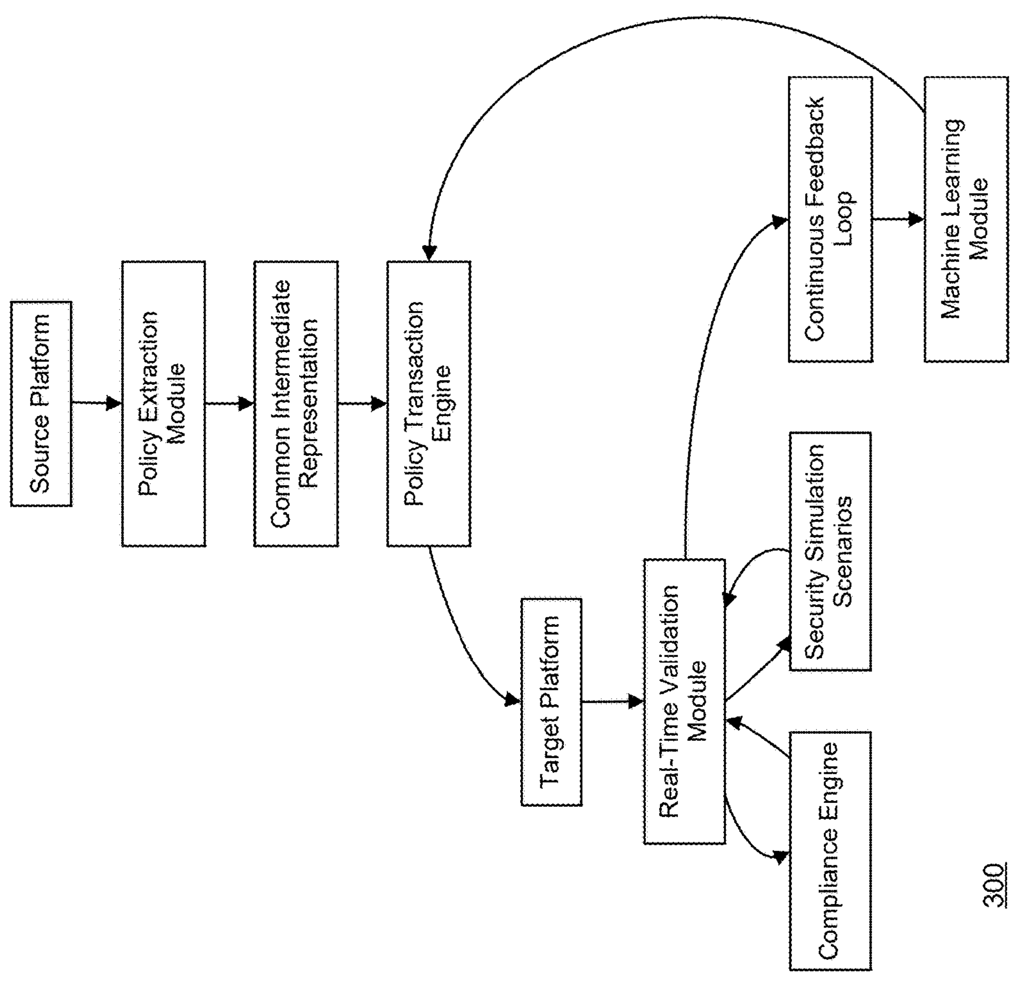
FIG. 3 illustrates an automated process for migrating, translating, and validating security directives, in accordance with some embodiments.

In some embodiments, FIG. 3 is a block diagram depicting a directive management pipeline 300 of a directive management system 130, in accordance with some embodiments. FIG. 3 illustrates an automated process for migrating, translating, and validating security policies across heterogeneous CNAPPs 120. In various embodiments, the directive management pipeline 300 may include additional, fewer, or different steps.

In some embodiments, the directive management system 130 may retrieve policies defined in platform-specific formats within a source platform, such as a cloud native system 145 or a source CNAPP 120. The directive management system 130 may apply the directive extraction engine 210 to retrieve the platform-specific machine-executable directives through API calls. The directive management system 130 may further use the directive extraction engine 210 to process the retrieved policies and convert the policies into CIR objects. In some embodiments, the directive management system 130 uses the CIR objects to abstract platform-specific syntax, providing a standardized, platform-agnostic schema for downstream processes. The CIR generated by the directive management system 130 captures essential policy attributes, including conditions, actions, resources, and compliance metadata, ensuring the semantic intent and functionality of the source policies are preserved.

By way of example, in some embodiments, the directive management system 130 may perform two primary functions in directive extraction. First, the directive management system 130 may apply the directive extraction engine 210 to issue API calls to the source CNAPP 120 to securely retrieve cybersecurity policies. Second, the directive management system 130 may utilize the CIR generation engine 220 to convert the retrieved policies into a Common Intermediate Representation (CIR). In performing these functions, the directive management system 130 may retrieve policies through secure access such as by using authenticated connections and managing varying authentication schemes. The directive management system 130 may configure the directive extraction engine 210 to account for rate limits imposed by the source platform and to adapt to changes in the platform's endpoints in order to maintain continuous and reliable access to the required directive data.

In some embodiments, the directive management system 130 may create CIR objects using the CIR generation engine 220 to provide a platform-agnostic, normalized format that simplifies downstream interpretation and adaptation processes. The directive management system 130 may configure the CIR objects to abstract away platform-specific syntax while preserving the semantic intent, conditions, actions, resources, and compliance data of the original policies. By operating on this stable schema, the directive management system 130 ensures accurate and consistent translation and validation of policies, regardless of the heterogeneity of the source CNAPP 120.

In some embodiments, the directive management system 130 may use the CIR objects to represent extracted elements from the source policies in a canonical schema. The directive management system 130 may extract and normalize conditions that define when a policy is triggered. The directive management system 130 may capture actions, such as "alert" or "remediate," in a standardized format. Resources affected by the policy, such as S3 buckets or IAM roles, may be represented in a normalized form by the directive management system 130. The directive management system 130 may also include compliance tags, such as SOC 2 or ISO 27001, as metadata within the CIR to ensure compatibility with subsequent translation and validation processes.

The CIR enforces a uniform representation of policy attributes, ensuring compatibility across heterogeneous CNAPPs 120, regardless of the source platform's field names or structural differences. For instance, the CIR may include fields such as a unique policy identifier, a name describing the policy, a set of conditions, a set of actions, a list of affected resources, and metadata.

For example, the conditions field within the CIR may take the form of an array of condition objects, each defining criteria for directive enforcement, such as attribute checks, allowed or denied configurations, and user-defined thresholds. The actions field may be an array specifying the responses triggered when the conditions are satisfied, such as generating alerts or performing remediation steps. The resources field may represent the affected cloud assets, such as storage buckets or virtual machines, in a normalized format to ensure consistency across platforms. The metadata field may capture additional policy attributes, including severity levels, the type of policy, and compliance tags that denote relevance to specific regulatory frameworks, such as SOC 2 or ISO 27001.

In some embodiments, the directive management system 130 transforms source directive data into CIR objects through a structured process involving data extraction, AI-driven analysis, and normalization. By way of example, the directive management system 130 processes source directive data in formats such as JSON, including identifiers, descriptive text, configuration rules, actions, resources, severity levels, policy types, and compliance information. During the extraction and analysis stage, the directive management system 130 may perform the following steps: (1) extract conditions from the rule. criteria field, such as attributes specifying "public_access"; (2) extract actions, such as "alert" or "remediate," from the rule. actions field; (3) extract resource identifiers, such as S3 bucket ARNs, from the rule. resource field; (4) collect severity levels, policy types, and compliance tags from their respective fields; and (5) apply AI/NLP analysis to interpret textual descriptions, identifying the policy's intent, such as restricting public access, and generating recommendations such as removing public ACLs or enabling encryption. This step may also highlight associated risks, such as the potential for data breaches.

In some embodiments, after the extraction and analysis, the directive management system 130 normalizes the data into the CIR schema. The policy_id and name fields in the CIR are directly derived from the source fields, such as policyId and name. The conditions array is constructed from rule. criteria, and the actions array is populated from rule. actions. The resources array is derived from rule. resource, and the metadata field aggregates severity, policy_type, and compliance_tags into a unified structure. Additionally, the CIR may include an ai_analysis field that stores interpreted intent, recommended changes, and identified risks derived from the AI/NLP step.

In some embodiments, the resulting CIR JSON produced by the directive management system 130 provides a clean, standardized format that abstracts away the original CNAPP 120-specific syntax and naming conventions. While the CIR remains independent of vendor-specific configurations, it preserves the original policy's intent, logical structure, and compliance attributes, ensuring compatibility with downstream translation, validation, and deployment processes.

In some embodiments, the directive management system 130 may leverage advanced AI or NLP-based modules integrated with machine learning models 245 to interpret non-standard or free-text policy descriptions during the CIR creation process. These machine learning models 245 may be used by the directive management system 130 to semantically analyze descriptions, identify policy intent, recommend changes, and highlight potential risks. For example, the directive management system 130 may analyze a description indicating that public access to storage buckets should be restricted and may recommend removing public access control lists (ACLs) and enabling encryption.

In some embodiments, the directive management system 130 may produce CIR objects that are free from platform-specific jargon or structural inconsistencies, ensuring compatibility with subsequent stages of the directive management pipeline. The directive management system 130 may use the CIR as a clean, normalized input for the directive translation engine 230.

In some embodiments, after the CIR objects are created and stored, the directive management system 130 may use the directive translation engine 230 to process the CIR objects and interpret the policies'underlying security objectives. The directive management system 130 may translate the CIR objects into configurations compatible with a target CNAPP 120. The directive management system 130 may implement advanced intent-based algorithms, which may be augmented by machine learning models 245, to semantically analyze policy elements such as conditions, actions, and compliance attributes. In addition to or alternatively to static field-to-field mappings, the directive management system 130 applies contextual understanding through the directive translation engine 230 to ensure that the translated policies retain the original policy's functional intent, even when direct equivalences between the source and target platforms do not exist.

In some embodiments, the directive management system 130 may configure the directive translation engine 230 to map CIR attributes into formats supported by the target CNAPP 120, such as JSON, YAML, or proprietary schemas. The directive management system 130 may convert conditions into rules compatible with the logic of the target platform. The directive management system 130 may adapt actions to align with the automation or enforcement mechanisms available in the target CNAPP 120. The directive management system 130 may preserve compliance attributes, such as regulatory tags or metadata, and map these attributes into equivalent constructs within the target environment. By employing AI-driven analysis, the directive management system 130 may resolve ambiguities or gaps in the CIR, ensuring that the translated policies remain functional and compliant with organizational and regulatory requirements.

In some embodiments, after translation, the directive management system 130 may deploy the policies to a target platform, such as a target CNAPP 120. The directive management system 130 may use the validation engine 240 to subject the deployed policies to rigorous evaluations to ensure their functionality and compliance. The validation may be conducted in real time. The directive management system 130 may apply the compliance engine 235 within the validation engine 240 to verify adherence to regulatory standards such as SOC 2 and HIPAA. The directive management system 130 may also simulate security scenarios, such as penetration tests or attack simulations, to confirm that the policies effectively enforce the intended security constraints. In some embodiments, the directive management system 130 records performance data from these validations, including discrepancies, identified misconfigurations, or gaps, for further analysis.

In some embodiments, the directive management system 130 may record validation results, including pass/fail outcomes, identified misconfigurations, and performance metrics, as part of its validation process. The directive management system 130 may flag discrepancies between the intended and actual policy behavior for further review. The validation data collected by the directive management system 130 is critical for ensuring the immediate correctness of deployed policies and for informing iterative improvements across the directive management pipeline.

In some embodiments, the directive management system 130 may process the recorded validation data using the continuous feedback engine 250. The directive management system 130 may integrate the continuous feedback engine 250 with machine learning models 245 to dynamically refine the processes of directive extraction, translation, and validation. By incorporating operational outcomes and adapting to evolving CNAPP capabilities, the directive management system 130 enhances its accuracy and adaptability over time.

In some embodiments, the machine learning models 245 within the directive management system 130 may provide determinations in a continuous feedback loop. The directive management system 130 may use the machine learning models 245 to analyze patterns in validation outcomes, compliance failures, and security incidents. For example, the directive management system 130 may refine translation algorithms to address recurring errors or recommend enhancements to validation scenarios to better reflect real-world conditions. By leveraging insights derived from historical data, the directive management system 130 continuously improves its accuracy, adaptability, and efficiency in managing policies across heterogeneous CNAPPs 120.

In some embodiments, the directive management system 130 implements an end-to-end workflow that enables automated policy migration, translation, and validation across heterogeneous CNAPP environments. FIG. 3 illustrates this feedback-driven workflow, where the directive management system 130 ensures that policies move seamlessly from source platforms through standardized extraction and normalization, advanced semantic translation, rigorous validation, and iterative refinement. This architecture provides a scalable and intent-preserving solution for managing cybersecurity policies in complex, multi-platform ecosystems, addressing the challenges of heterogeneity and evolving requirements.

Directive Translation Process

Figure 4A:
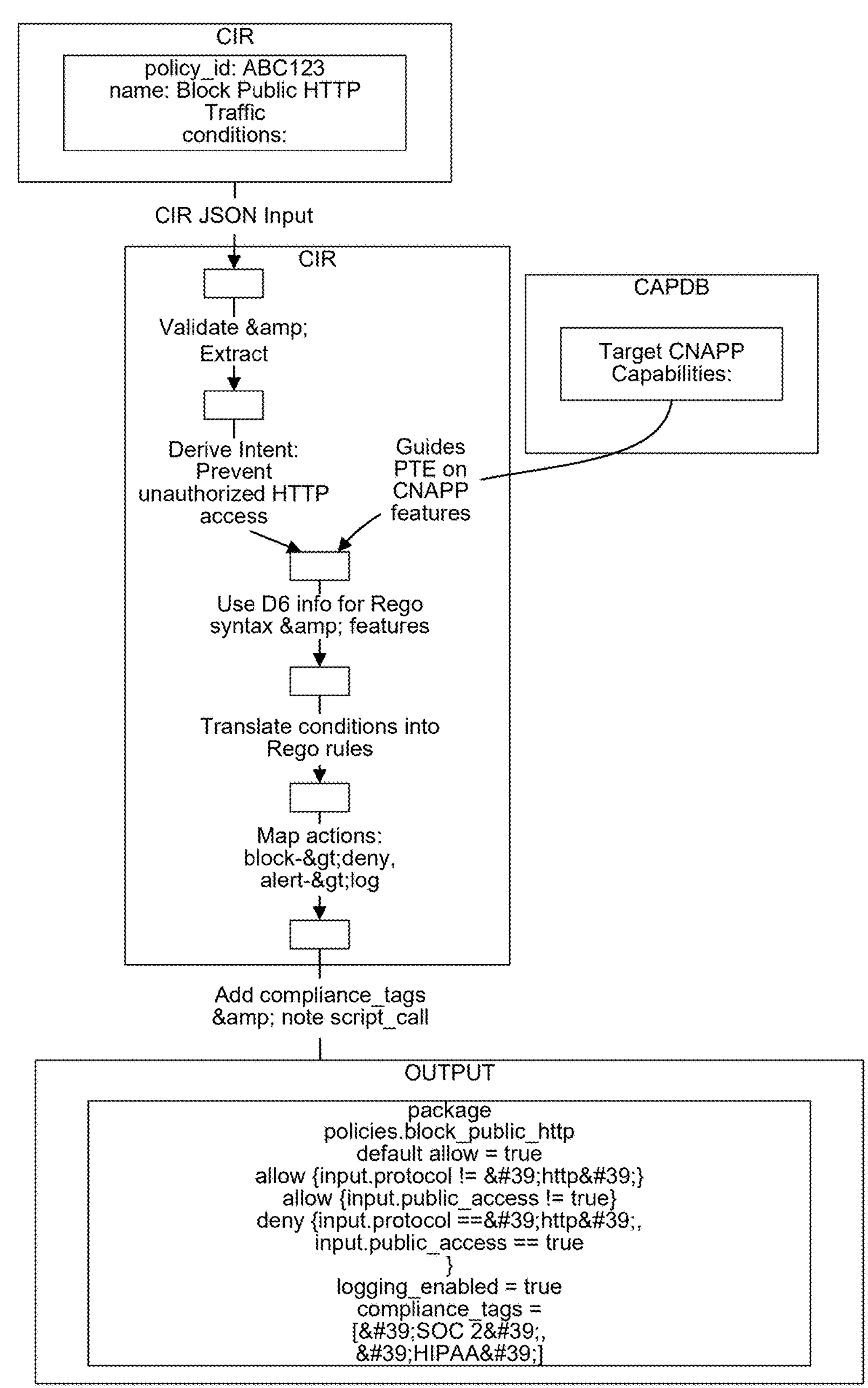
FIG. 4A and FIG. 4B are a block diagram illustrating a directive translation process, which may be performed by the directive translation engine of the directive management system, in accordance with some embodiments.
Figure 4B:
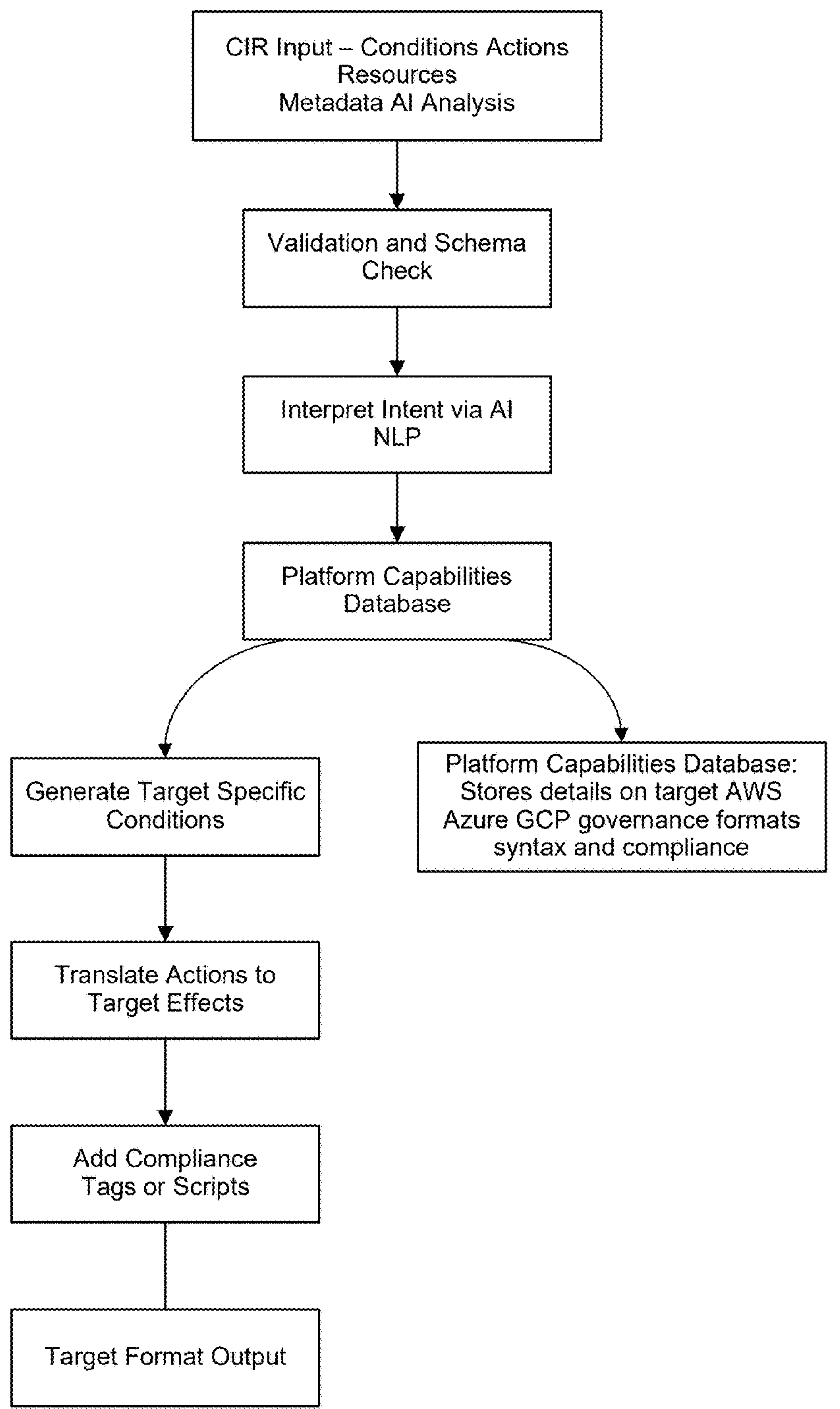

FIG. 4A and FIG. 4B are a block diagram illustrating a directive translation process 400, which may be performed by the directive translation engine 230 of the directive management system 130, in accordance with some embodiments. In some embodiments, the directive management system 130 may operate as an intermediary between the domain 110 and heterogeneous CNAPPs 120, facilitating directive migration and enforcement. The directive management system 130 may deploy directive translation engine 230 to use standardized policies in the form of CIR objects, integrate machine learning insights, and output machine-executable directives tailored to the target CNAPPs 120.

In some embodiments, the directive translation engine 230 may ingest directives formatted in CIR, which is a normalized schema abstracting platform-specific details. The CIR allows the directive management system 130 to interpret policy conditions, actions, resources, and compliance metadata in a uniform manner. CIR ingestion enables consistent downstream translation and validation.

In some embodiments, the directive management system 130 generates custom scripts or actions when direct equivalents are unavailable in the target CNAPP. For instance, if a CIR mandates encryption enforcement but the target platform lacks a native mechanism, the system synthesizes a script to implement the required security control. This ensures that the policy's core intent is preserved even in heterogeneous environments.

In some embodiments, the directive management system 130 may use directive translation engine 230 to retrieve CIR policies formatted as structured JSON data, representing normalized policies that abstract platform-specific details. Each CIR policy includes fields such as a unique identifier for traceability, a human-readable name, conditions specifying triggers, actions to be performed, resource references, metadata for compliance, and optional AI-derived analysis. The directive management system 130 retrieves CIR data from a designated data store or message queue using secure communication protocols, such as HTTPS, and authenticates access with mechanisms such as OAuth tokens to maintain data integrity and confidentiality.

In some embodiments, the directive management system 130, using the directive translation engine 230, pre-processes and verifies CIR data before initiating translation. Pre-processing may include schema validation to ensure that certain fields, such as conditions and actions, are present and properly formatted. The directive management system 130 may also conduct semantic coherence checks to confirm that inferred attributes, such as AI-recommended changes, align with the defined conditions and actions. If discrepancies are detected, the directive management system 130 logs warnings, applies fallback strategies, or flags the policy for manual review based on its configuration.

In some embodiments, the directive management system 130 performs semantic interpretation and intent-based analysis on the CIR data. In some embodiments, the directive management system 130 may incorporate input from machine learning models to refine translation strategies. The machine learning models process historical translation results, semantic insights, and policy feedback to dynamically enhance the translation accuracy and adaptability of the system. Machine learning models may provide heuristic refinements that adjust to the evolving features of CNAPPs 120. Using advanced AI models, such as transformer-based language models or domain-specific NLP classifiers, the system analyzes conditions, actions, and metadata to extract the policy's core security intent. For example, a policy specifying "public_access=true" with actions to "alert" and "remediate" is interpreted as requiring denial of public access and administrator notification. This semantic analysis ensures that even if the target CNAPP 120 lacks direct equivalents, the policy's functional objectives are preserved.

If metadata and compliance_tags indicate the policy is required to align with a regulatory framework such as SOC 2 or HIPAA, the directive translation engine 230 notes these compliance requirements and ensures the target configuration also includes corresponding tags, annotations, or compliance checks.

In some embodiments, the directive management system 130 may use directive translation engine 230 to translate CIR-based policies into machine-executable directives that are in the target CNAPP's syntax and configuration format. The translation process involves mapping CIR fields to platform-specific constructs, such as conditions, actions, and compliance hooks. For example, if a CIR specifies "deny public access" for storage buckets, the directive management system 130 converts this into a YAML or Rego rule compatible with the target CNAPP's requirements. The directive management system 130 system also accounts for platform-specific nuances such as compliance annotations or resource naming conventions.

By way of example, the directive management system 130 maps CIR policies to target CNAPP 120 configurations using a platform capabilities database. This database stores mappings between CIR constructs and features such as network restrictions, IAM role mappings, compliance tagging, and logging configurations supported by the target CNAPP. For example, if a CIR specifies blocking traffic from a specific IP range, the directive management system 130 generates the appropriate configuration snippet, such as YAML rules or Rego code, to enforce the policy within the target environment.

In some embodiments, the mapping may include converting conditions specified in the CIR into equivalent configurations supported by the target CNAPP 120. The directive management system 130 examines each condition in the CIR and identifies the closest logical equivalent in the target CNAPP. For example, if the CIR specifies "block all traffic from IP range 192.168.1.0/24," and the target CNAPP uses a YAML-based policy DSL requiring a "deny" rule for that CIDR block, the directive management system 130 constructs the necessary YAML snippet. If the target CNAPP expects conditions in a Rego policy format, the directive management system 130 generates Rego code that implements the equivalent logic, ensuring that the intended directive enforcement is preserved.

In some embodiments, the mapping may include generating equivalent actions for those specified in the CIR, even when direct mappings are unavailable in the target CNAPP 120. For instance, if the CIR includes actions such as "remediate," and the target CNAPP lacks a direct remediation feature but can execute scripts or workflows, the directive management system 130 synthesizes a sequence of supported steps. These steps may include generating custom scripts to remove public ACLs from storage buckets or triggering a Lambda function to enforce encryption. Additionally, if the CIR specifies actions such as "alert," and the target CNAPP provides a native logging or notification mechanism, the directive management system 130 configures the appropriate flags to enable such alerts.

In some embodiments, the mapping may include normalizing resource identifiers specified in the CIR to align with the resource reference format required by the target CNAPP 120. The directive management system 130 applies resource mapping functions to translate generic identifiers, such as ARNs for S3 buckets, into target-platform-compatible references. If the target CNAPP identifies resources by tags or resource IDs, the directive management system 130 queries its resource resolution logic to produce acceptable descriptors. This resource normalization ensures that the translated policies are fully compatible with the naming conventions and structures of the target CNAPP 120.

In some embodiments, the directive management system 130 addresses non-equivalent features through AI-driven recommendations and custom script generation. If the CIR specifies an action or condition unsupported by the target CNAPP 120, the directive management system 130 synthesizes alternative approaches. For instance, a requirement to "quarantine compromised instances" may be fulfilled by combining actions such as blocking traffic and revoking IAM permissions. The directive management system 130 generates custom scripts to implement these actions, ensuring that the policy's intent is effectively enforced.

In some embodiments, the directive management system 130 validates translated configurations for syntactic and semantic accuracy. Syntactic validation ensures compliance with the target CNAPP's required formats, such as YAML or Rego. Semantic validation confirms that the translated configurations align with the CIR-defined objectives. The directive management system 130 may also conduct static analyses or simulate threat scenarios to verify that the policies enforce intended security measures effectively. For instance, the directive management system 130 can verify that a deny rule correctly matches the intended conditions or that compliance tags align with known regulatory frameworks supported by the target CNAPP. If validation fails, the directive translation engine 230 logs errors, applies remediation suggestions (if feasible), and may revert to a simpler fallback configuration or raise an alert for manual review.

In some embodiments, the directive management system 130 delivers validated configurations to the target CNAPP 120 for deployment. The system uses secure API calls for delivery, ensuring authentication and authorization during deployment. The directive management system 130 may also integrate with CI/CD pipelines to automate policy updates, enabling streamlined and efficient deployment across multiple cloud environments.

By way of example, a CIR specifying conditions to block HTTP traffic and public access is translated into a Rego policy. The resulting policy includes deny rules for the specified conditions, compliance tags such as SOC 2 and HIPAA, and comments highlighting recommended changes, such as enforcing encryption. The directive management system 130 annotates these examples to demonstrate its ability to preserve security intent during translation. The directive translation engine 230 parses conditions to find an equivalent in the target CNAPP. Suppose the target CNAPP uses a Rego-based policy language and requires specifying conditions as logical expressions. The directive translation engine 230 generates a Rego snippet that denies traffic when protocol=="http" and public_access==true. Actions such as block translate to a deny rule, and alert maps to a logging directive. If the CNAPP 120 supports compliance tagging, the directive translation engine 230 attaches SOC 2 and HIPAA tags to the resulting machine-executable directives. If encryption enforcement isn't a native feature, the directive translation engine 230 may add a script that ensures server-side encryption by calling a CNAPP-managed function.

In the output, the directive translation engine 230 may have created a file, such as a Rego policy. The logic ensures that any traffic meeting the conditions ("http" protocol with public_access==true) triggers a deny action. The logging_enabled variable simulates an alert mechanism (the CNAPP 120 might have a logging function that picks this up), and compliance_tags are stored for compliance modules. Additionally, comments show how external scripts would be invoked to enforce encryption and restrict ACLs, as recommended by the AI analysis. The directive translation engine 230 may send the output machine-executable directives to the target CNAPP 120 directive management endpoint via an API call.

Referring to FIG. 4B, the directive translation engine 230 ensures seamless integration of policies into target environments through rigorous CIR JSON ingestion, validation, and deployment, handling governance, provisioning, and cybersecurity needs across diverse consumer and enterprise domains.

The ingestion process begins with the CIR Fields, such as 'policy_id' (e.g., "FB_X_Crosspost01"), 'conditions[ ]'0 (e.g., "time≥22:00"), 'actions[ ]' (e.g., "deny" or "remediate"), 'resources[ ]' (e.g., "facebook_page" or "aws_instance"), and 'metadata' (including compliance tags such as GDPR or HIPAA). This comprehensive structure ensures all policies, whether ephemeral or baseline, are normalized and ready for actionable insights. The PTE retrieves policies securely from repositories or message queues, ensuring sensitive data such as ephemeral firewall denies or user-privilege rules remain protected.

During pre-processing and verification, schema validation ensures that all required fields are present, and semantic coherence checks flag contradictions, such as mismatched encryption rules in ephemeral and baseline policies. The directive translation engine 230 leverages AI-driven semantic interpretation and intent-based analysis to translate textual descriptions into actionable rules, such as mapping Facebook post scheduling constraints to X's API or aligning AWS encryption denies with Azure storage rules.

The platform capabilities database 215 serves as a backbone for mapping CIR data to specific platform features. For example, ephemeral "deny inbound traffic after 22:00" in Cisco NGFW is transformed into a time-based rule on Palo Alto NGFW. Similarly, a Facebook "brand_manager post override after 10 PM" is converted into an X schedule rule with time and role constraints. Actions are tailored to target environments—e.g., "deny" becomes an Azure Policy effect or an AWS SCP action, while "remediate" triggers SOAR playbooks in XSIAM or encryption mandates in Terraform.

When direct equivalents are unavailable, the directive translation engine 230 employs AI recommendations and script synthesis, such as generating Python scripts to bridge feature gaps between Splunk and XSIAM or creating MDM-based Jamf policies for Windows-to-Mac translations. The generated configurations undergo validation through syntax checks (e.g., 'terraform validate') and semantic checks in test or dry-run modes, ensuring correctness before deployment. Minor errors are auto-remediated, while major conflicts require admin intervention.

For delivery and deployment, the directive translation engine 230 interfaces with APIs across domains—whether the directive translation engine 230 is creating ephemeral rules in X, provisioning cost-control policies in Azure, or setting time-based blocks on Palo Alto NGFW. Integration with CI/CD pipelines such as GitLab or Jenkins ensures systematic application and continuous enforcement. As new rules emerge in the source environment, the PTE dynamically updates the target, maintaining consistency across transitions such as Windows to macOS, Cisco to Palo Alto, or Splunk to XSIAM.

This robust system not only enables real-time ephemeral to baseline rule application but also ensures cryptographically secure logging and compliance tagging, bridging gaps across disparate platforms and enhancing the efficiency and reliability of policy governance.

CIR Creation

Figure 5A:
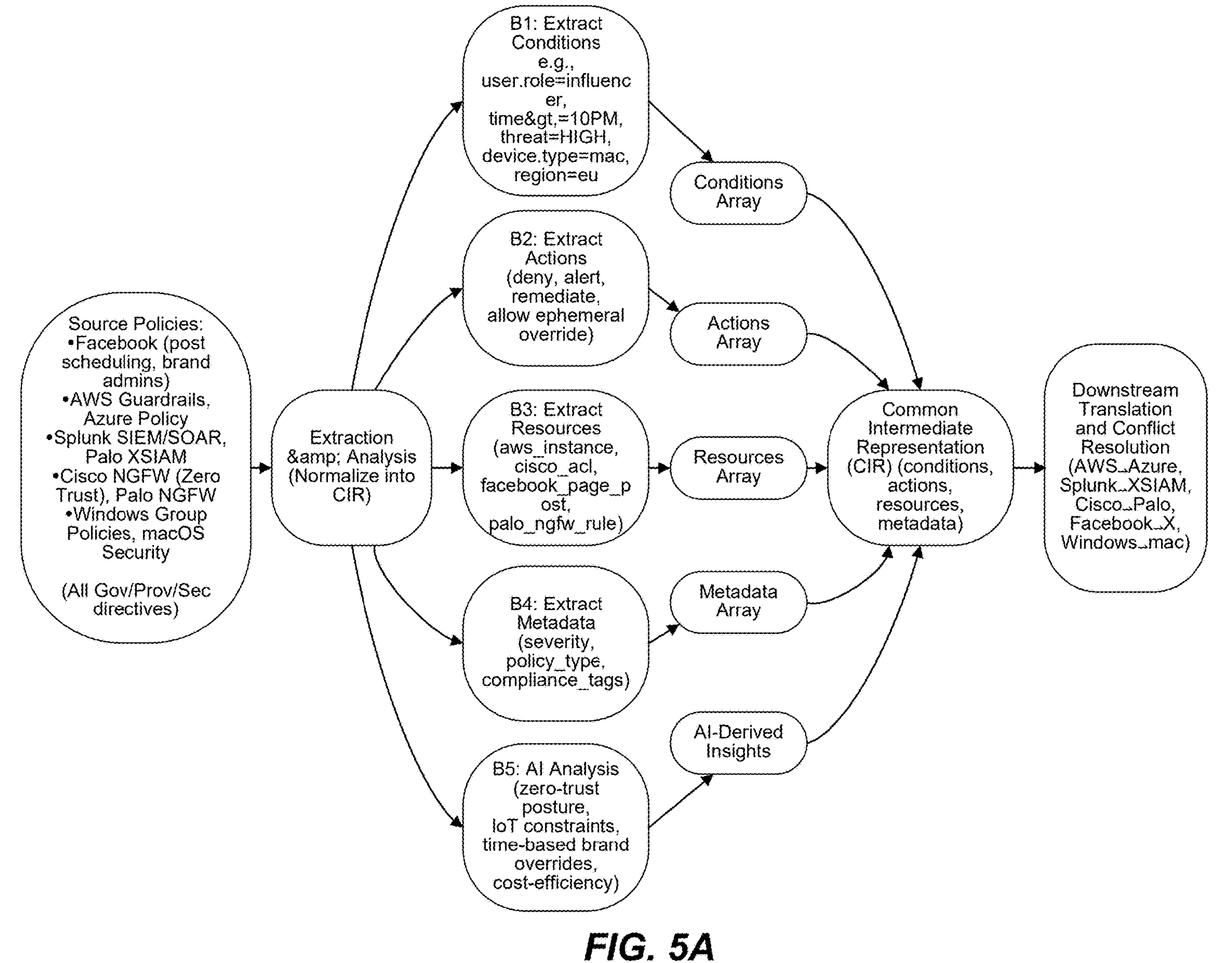
FIG. 5A is a flowchart depicting a CIR creation process that can be performed by a directive management system, in accordance with some embodiments.

FIG. 5A is a flowchart depicting a CIR creation process 500 that can be performed by a directive management system 130, in accordance with some embodiments. In some embodiments, the directive management system 130 includes a directive extraction engine 210 that ingests and extracts directives, such as in the forms of machine-executable directives.

By way of example, directive management system 130 ingests governance, provisioning, or cybersecurity directives from multiple platforms. Examples of such platforms include Facebook Graph API for post scheduling, AWS IAM/Control Tower guardrails, Azure Policy or Blueprints, Splunk SIEM rules, and Cisco NGFW zero-trust segments. Each platform may impose domain-specific requirements, such as cost controls, data residency constraints, ephemeral blocking rules, user-permission sets, or advanced zero-trust posture enforcement. Directive management system 130 processes these requirements to support the CIR creation process.

In some embodiments, the directive management system 130 extracts and analyzes platform-specific rules. The directive management system 130 reads directives such as time-based brand overrides from Facebook, multi-cloud encryption mandates from AWS and Azure, and ephemeral threat blocks from Cisco or Palo Alto. Directive management system 130 normalizes these rules into a consistent schema for further processing.

In some embodiments, the directive management system 130 converts the retrieved directive data into CIR objects by distilling platform-specific rules into uniform components, such as conditions, actions, resources, and metadata. For instance, directives defining access controls, compliance constraints, or ephemeral usage policies are normalized to ensure compatibility across platforms. By way of example, conditions may include triggers or preconditions such as user.role=brand_admin, threat≥HIGH, region=eu, or time≥22:00. Actions may include outcomes such as deny, alert, remediate, or ephemeral override. Resources specify the contexts or assets affected by the policies, such as aws_instance, azure_storage_account, splunk_correlation_rule, cisco_acl, or facebook_page_post. Metadata may include severity, compliance tags (e.g., HIPAA, PCI-DSS, ISO 27001), policy types (e.g., baseline or ephemeral), or ML cluster IDs.

In some embodiments, the directive management system 130 implements a platform-agnostic schema to unify policy directives from various platforms into a single CIR object. For example, governance, provisioning, or security policies such as AWS Guardrails, Azure Blueprints, Terraform checks, Splunk correlation rules, Cisco zero-trust segments, or user roles for social media posts are normalized into the CIR schema. This normalization allows directives such as "deny external traffic after 22:00" from Cisco to coexist seamlessly with policies such as "allow influencer post scheduling after 10 PM" from Facebook, or "time-based lockouts on Windows devices." For example, directive management system 130 may merge extracted conditions, actions, resources, metadata, and AI insights into a single, vendor-neutral CIR object. This CIR object enables consistent representation of directives across platforms. This uniform representation ensures that policy directives are adapted consistently for implementation across different platforms, minimizing translation errors and inconsistencies.

In some embodiments, the directive management system 130 may ensure semantic consistency over syntax when normalizing platform-specific directives. Rather than replicating platform-specific syntax, the directive management system 130 may capture the intent of policies as conditions and actions. For instance, the syntax differences between X's "block retweet," Facebook's "deny scheduled post," Cisco's "zone-based ACL," and Palo Alto's "security policy" are harmonized within the CIR schema. Actions such as Azure "deny," AWS SCP "deny," or Cisco ACL "block" are represented uniformly as actions=["deny"] in the CIR, ensuring compatibility across platforms.

In some embodiments, the directive management system 130 may categorize CIR fields as either mandatory or optional to ensure the completeness and functionality of normalized policies. Mandatory fields, such as policy_id and name, are required for consistent referencing across datasets, including transitions from AWS to Azure, Splunk to Palo Alto, or Windows to mac. If these fields are missing in the source policy, directive management system 130 generates the fields automatically to maintain structural integrity. Optional fields, such as advanced metadata such as compliance_tags or AI_analysis, are left blank or assigned default values when unspecified. This approach prevents structural inconsistencies and ensures seamless directive enforcement.

In some embodiments, the directive management system 130 may incorporate defaulting mechanisms to handle incomplete or partially defined policies during CIR creation. For example, when no conditions are provided, the system assigns conditions=[ ], interpreting it as a global policy. If no actions are specified, the system assumes a default action such as ["allow"] or a minimal no-op action. Missing resource definitions result in the policy being applied organization-wide or flagged as incomplete. For metadata fields, a missing severity value defaults to metadata. severity="medium," and an unspecified policy_type defaults to "baseline_control." These fallback strategies ensure that policies remain functional and complete within the CIR framework.

In some embodiments, the directive management system 130 uses AI and natural language processing (NLP) techniques to interpret ambiguous or free-text policy directives. For instance, directives such as "block malicious retweets at scale," "only brand admins can schedule posts after 9 PM," or "monitor zero-trust posture on mac endpoints in corporate VLAN" are parsed to produce structured conditions such as time≥21:00, user.role=brand_admin, posture=zero_trust, and platform=mac, and corresponding actions such as deny retweet, allow post scheduling, or alert SIEM. These structured outputs ensure consistent representation of unstructured policies in the CIR schema. This capability enables the system to handle ambiguous or unstructured policies with accuracy and consistency.

In some embodiments, the directive management system 130 employs intelligent field mapping and default mechanisms to handle missing or incomplete policy information. Fields such as compliance tags, ephemeral flags, or metadata that are absent in the source policy are automatically populated with default values. This approach ensures that no policy set is discarded due to missing data, preserving the overall integrity of the CIR framework.

In some embodiments, the directive management system 130 may apply a graceful degradation approach when AI or NLP fails to interpret certain policy directives. For example, if a rule such as "some HPC job policy" cannot be fully analyzed, the system records intent="No specific high-level intent identified" in the CIR's AI_analysis field. Despite incomplete interpretation, the directive management system 130 still produces a valid CIR object, preserving the overall policy set and enabling further refinement or manual intervention without discarding critical data.

In some embodiments, the directive management system 130 supports schema versioning to ensure compatibility and extensibility of the CIR framework. New features, such as ephemeral rules in Facebook, advanced patch checks in Windows, or IoT-specific constraints in Cisco NGFW, can be incorporated into the CIR schema as optional fields. This approach allows older policies to remain backward-compatible while enabling the addition of modern functionalities to address emerging governance, provisioning, and security requirements. The version-controlled schema supports extensibility and adaptability. A CIR object may evolve to incorporate new features such as zero-trust configurations, ephemeral social media usage rules, or advanced operating system security controls. Despite these updates, older policies remain backward-compatible, ensuring a seamless transition and continued usability across platform updates.

In some embodiments, the directive management system 130 extends metadata and condition types within the CIR schema to enhance adaptability for multi-cloud or multi-platform environments. For instance, new condition types, such as time_window=weekends, device. trusted_firmware=true, or emergent ephemeral logic from Splunk or Palo Alto SOAR workflows, can be incorporated. These extensions enable the CIR framework to accommodate evolving policies and requirements, ensuring continued relevance and effectiveness in complex operational contexts.

In some embodiments, the directive management system 130 validates CIR objects against predefined schemas, such as JSON Schema, before CIR objects are utilized in downstream processes. Validation checks ensure the presence and correctness of critical fields, including conditions, actions, resources, and metadata. If a CIR object contains malformed or missing critical fields, the system logs an error and prompts administrative review. For minor issues, such as missing severity metadata, directive management system 130 applies default values to maintain policy functionality without interrupting operations.

In some embodiments, the directive management system 130 incorporates error tolerance and logging mechanisms to handle partially corrupted or incomplete CIR definitions. For example, when a Windows GPO lacks region data or an IoT policy references an unknown resource, the system applies best-effort mapping to complete the CIR object. This ensures that large-scale migrations, such as those from Cisco to Palo Alto or AWS to Azure, are not disrupted by isolated errors. Directive management system 130 logs these issues for later review while preserving the overall continuity and integrity of the policy migration or enforcement process. The directive management system 130 logs issues such as partially defined or corrupted inputs, preventing these errors from disrupting the entire pipeline. Even in cases of incomplete or ambiguous data, directive management system 130 ensures operational continuity by applying corrective measures or default mappings, allowing for consistent and reliable directive enforcement.

In some embodiments, the directive management system 130 provides unique advantages that set it apart from traditional approaches. AI-powered semantic understanding enables the system to interpret directives such as "deny public inbound" as action=deny and conditions=public_inbound, bridging gaps between cloud services, operating systems, and social media usage. The consistent output of the CIR ensures uniformity across diverse policy types, such as Cisco zero trust configurations, Azure ephemeral deny rules, or brand admin overrides on Facebook.

The directive management system 130 minimizes operational overhead by reducing the need for manual policy rewriting whenever platforms evolve. The CIR schema is designed for scalability and future-proofing, allowing the incorporation of new features such as ephemeral security rules or advanced compliance requirements. This adaptability ensures that the directive management system 130 remains robust in dynamic, multi-platform environments.

Ontology Based CIR

Figure 5B:
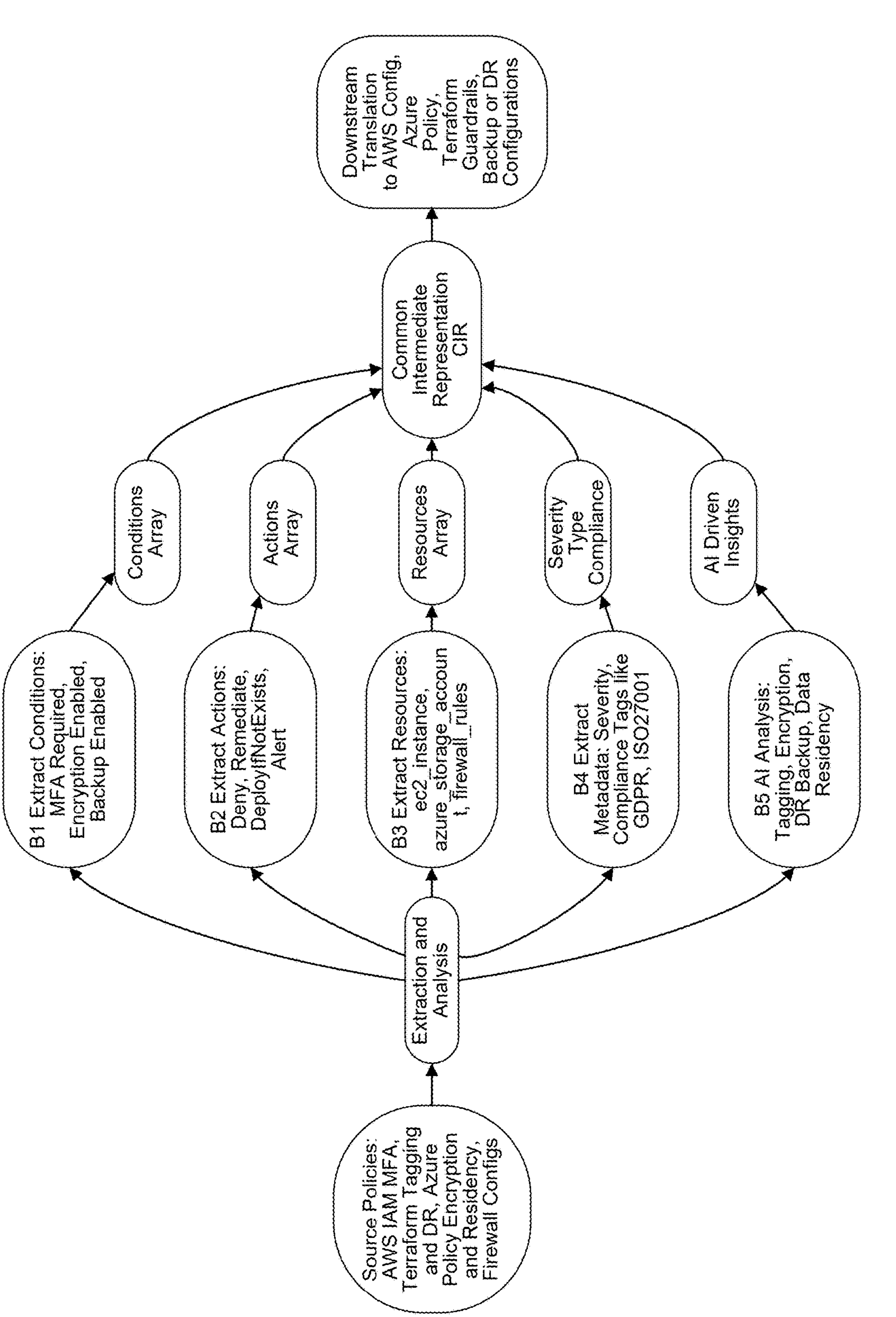
FIG. 5B is a flowchart depicting an ontology-based CIR creation process that can be performed by a directive management system, in accordance with some embodiments.

FIG. 5B is a flowchart depicting an ontology-based CIR creation process 530 that can be performed by a directive management system 130, in accordance with some embodiments. In an ontology-based CIR creation process 530, the directive management system 130 aligns free-text or partially structured directive data to a formal ontology. In some embodiments, ontology-based CIR creation involves a process to translate platform-specific security policies into a unified, platform-agnostic schema while preserving semantic intent and regulatory compliance.

In some embodiments, the directive management system 130 may ingest policies from a source platform through APIs or predefined formats. The ingested policies may include rules, conditions, actions, resources, and metadata. For example, the directive management system 130 may extract policy representations, which may include fields such as policy IDs, conditions, actions, and compliance tags.

In some embodiments, the directive management system 130 may define ontology-based categories, which may take the form of a hierarchy that organizes concepts and their relationships into structured levels. The directive management system 130 may use this hierarchy to classify and normalize policy elements such as conditions, actions, resources, and metadata. The hierarchy of ontology-based categories may include the following various levels. For example, the ontology may define categories such as cloud governance, cybersecurity, data protection, compliance, and resource management. Each category may encompass various subcategories that further refine the scope of policies.

Within a category, the ontology may define directive classes that group policies based on their functional roles. Directive classes may include access control policies, encryption policies, data retention policies, compliance policies, and monitoring policies. For example, a directive class for access control may address restrictions on user or device access to specific resources. Each directive class may include policy attributes, which specify detailed characteristics or parameters that the policies govern. For example, an access control directive class may include attributes such as user roles, access permissions, time-based restrictions, and geographic constraints. Policy attributes may be used to define the conditions under which a directive is triggered.

At a more granular level, the ontology may define entities that are governed or referenced by the policies. Entities may include resources such as storage buckets, virtual machines, containerized applications, user accounts, and network components. Some entities may also be referred to as named entities. Entities may also include abstract constructs such as roles, compliance tags, and threat levels. The ontology may further define relationships between entities and attributes. For example, relationships may express that a specific user role has access to a defined set of resources or that a particular resource must comply with encryption standards.

Relationships may also define dependencies, such as a compliance attribute requiring both encryption and auditing.

In some embodiments, the ontology may define actions and outcomes, representing the responses or enforcement mechanisms triggered by policy conditions. Actions may include alerts, remediations, resource access denials, or logging activities. Outcomes may represent the results of applying the policy, such as a compliance pass or the mitigation of a security risk.

The hierarchy of ontology-based categories enables the directive management system 130 to semantically map platform-specific configurations into CIR objects by leveraging the relationships between categories, policy classes, attributes, entities, and actions.

In some embodiments, the directive management system 130 may map platform-specific terms and structures into ontology-based categories. The mapping process may include converting conditions into triggers for directive enforcement, such as "time_of_day>=22:00" or "user_role=admin." The directive management system 130 may map actions into responses such as "alert," "remediate," or "deny access." The directive management system 130 may standardize resources as affected cloud resources, such as storage buckets or user accounts. The metadata associated with the policies may include additional attributes, such as severity, compliance tags, and directive types. The mapping process may normalize these elements into a CIR schema, ensuring platform-agnostic representation. For instance, the directive management system 130 may map platform-specific fields, such as public_access, to a generic property such as resourceAccessibility.

In some embodiments, the directive management system 130 may integrate an ontology framework that defines classes, relationships, and properties for interpreting policies. For example, the ontology may include classes such as UserRole, ResourceType, and ComplianceAttributes. The UserRole class may include roles such as "admin" or "influencer." The ResourceType class may include entities such as "virtual machines" or "storage buckets." The ComplianceAttributes class may include attributes associated with regulatory standards.

In some embodiments, the directive management system 130 may analyze free-text directive descriptions and ambiguous configurations using natural language processing or artificial intelligence models. For example, the directive management system 130 may infer intent from a description such as "ensure data is encrypted" and transform it into a CIR condition, such as encryptionStatus=enabled. The analysis may enrich the structured data and resolve ambiguities in the source policies.

In some embodiments, the directive management system 130 may generate a CIR schema based on the normalized and enriched data. The CIR schema may include fields such as a directive identifier to uniquely identify the directive, conditions that specify criteria for directive enforcement, actions that define responses to the conditions, resources that enumerate the affected assets, and metadata that includes compliance tags, severity, and directive type.

Temporal and Probabilistic Based CIR

Figure 5C:
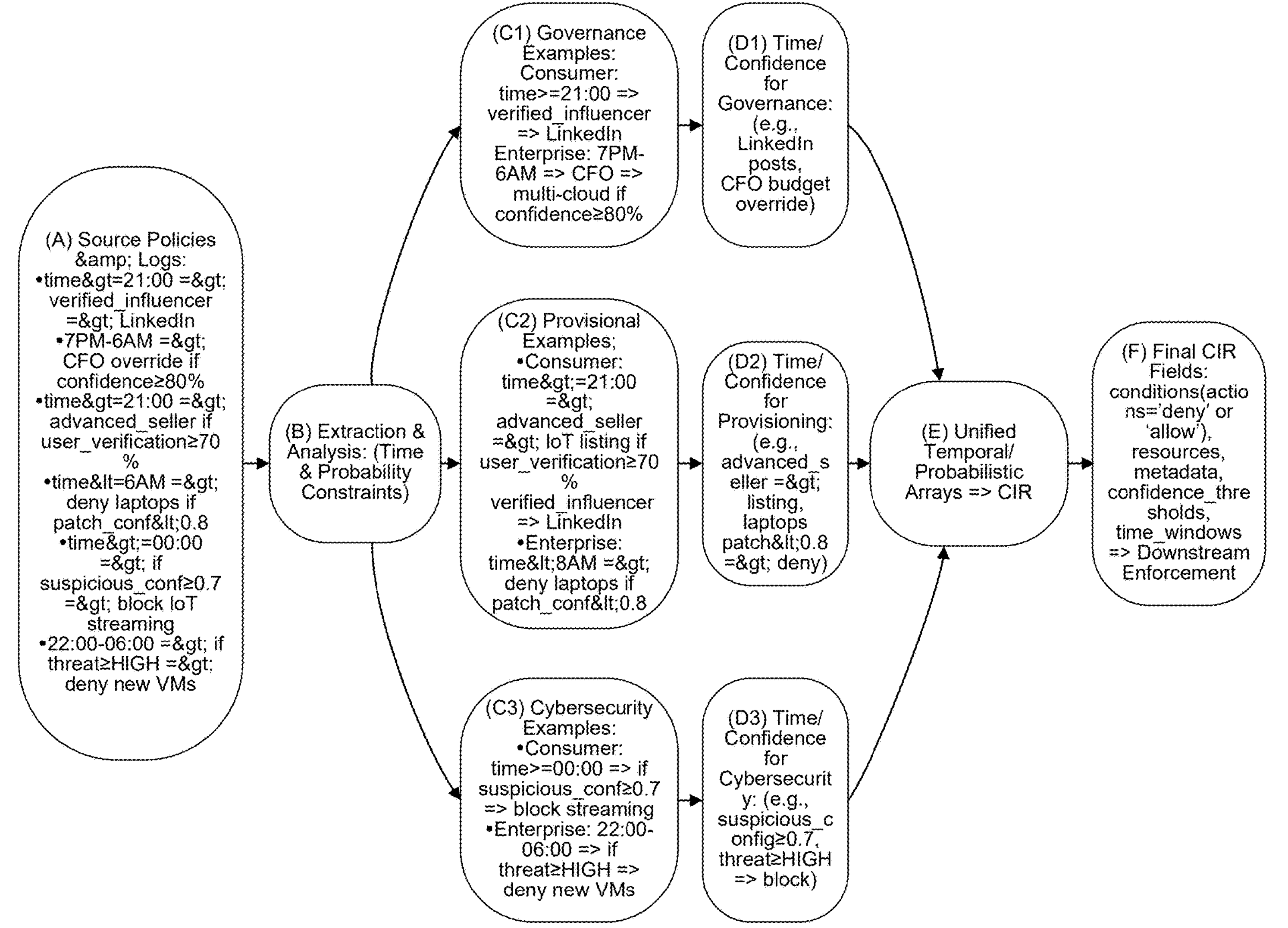
FIG. 5C is a flowchart depicting a temporal and probabilistic based CIR creation process that can be performed by a directive management system, in accordance with some embodiments.

FIG. 5C is a flowchart depicting a temporal and probabilistic based CIR creation process 580 that can be performed by a directive management system 130, in accordance with some embodiments. In some embodiments, the directive management system 130 integrates temporal and probabilistic constraints into compliance management, combining time-based triggers with confidence-based metrics for dynamic directive enforcement within CIR.

In some embodiments, the directive management system 130 gathers source policies and logs that define temporal constraints, such as "time≥21:00" or "7 PM-6 AM," and probabilistic constraints, such as "confidence≥80%," "user_verification≥70%," or "suspicious_conf≥0.7." These inputs are collected from consumer sources, such as LinkedIn posts restricted to verified influencers after 9 PM or IoT streaming blocked when suspicious_conf≥0.7, and from enterprise sources, such as CFO overrides allowed if confidence≥80% or denial of new VMs during high-threat periods. In some embodiments, the directive management system 130 supports heterogeneous data ingestion methods to load time-based and probabilistic rules. API ingestion dynamically retrieves time-stamped threat or compliance data from systems such as SIEM and CNAPP platforms. File-based ingestion processes temporal rules, such as those defined in JSON or configuration files, enabling offline compatibility. Light agents retrieve IoT-specific constraints directly from device logs, supporting real-time data extraction and integration.

In some embodiments, the directive management system 130 extracts and analyzes temporal and probabilistic constraints from the gathered inputs. Time-window references, such as "21:00-06:00" or "before 8 AM," and probability thresholds, such as "user_verification≥70%" or "threat≥HIGH," are processed and normalized into actionable data suitable for CIR generation.

In some embodiments, the directive management system 130 applies the extracted data to governance, provisioning, and cybersecurity domains. For governance, directive management system 130 processes consumer policies, such as "time≥21:00=>verified_influencer=>LinkedIn," and enterprise rules, such as "Between 7 PM-6 AM=>CFO override if confidence≥80%." For provisioning, directive management system 130 processes consumer directives, such as "advanced_seller=>IoT listing after 21:00 if user_verification≥70%," and enterprise policies, such as "deny laptops if patch_conf if threat≥HIGH=>deny new VMs."

In some embodiments, the directive management system 130 unifies temporal and probabilistic constraints across governance, provisioning, and cybersecurity domains into CIR arrays or objects. These unified CIR structures represent consistent conditions, such as time constraints and confidence thresholds, as well as user roles, actions, and metadata. In some embodiments, the directive management system 130 generates CIR objects that combine temporal and probabilistic attributes into a unified schema. CIR fields include conditions, such as "time≥21:00," actions, such as "deny" or "override," and metadata, such as "confidence≥0.8," enabling real-time, platform-neutral directive enforcement. This unified representation allows directive management system 130 to dynamically adapt and enforce compliance rules across diverse operational environments.

In some embodiments, the directive management system 130 normalizes temporal and probabilistic policies into CIR fields to enable consistent enforcement. Conditions represent triggers, such as "time≥21:00" or "confidence≥80%," while actions specify outcomes, such as "deny," "allow," or "override." Metadata includes additional attributes, such as confidence metrics, time windows, and ephemeral tags, to provide comprehensive policy context.

In some embodiments, the directive management system 130 synchronizes CIR fields with real-time data to enforce ephemeral policies dynamically. For example, a directive such as "Between 7 PM-6 AM=>CFO can override multi-cloud resource shares if confidence≥80%" is updated and enforced based on live inputs. Similarly, a rule such as "If suspicious_conf≥0.7=>ephemeral block consumer IoT streaming" is executed dynamically, ensuring robust and adaptive directive enforcement across governance, provisioning, and cybersecurity domains.

In some embodiments, the directive management system 130 converts these unified CIR objects into actionable policies. The CIR fields include normalized conditions (e.g., "time≥21:00," "confidence≥80%"), actions (e.g., "deny," "allow," "override"), resources, and metadata, such as compliance tags or severity levels. Directive management system 130 enforces these policies in downstream systems, such as multi-cloud environments, IoT configurations, or enterprise platforms, ensuring real-time and consistent application of temporal and probabilistic rules across all operational environments. In some embodiments, the directive management system 130 incorporates probabilistic constraints into CIR objects to enable enforcement based on confidence thresholds, which are not typically supported by conventional compliance solutions. For example, in cybersecurity, a rule such as "If suspicious_conf≥0.7=>ephemeral block consumer IoT streaming" dynamically blocks streaming based on threat assessments. In provisioning, a rule such as "If patch_conf deny new laptops join domain" ensures that only adequately patched devices are integrated into enterprise networks.

In some embodiments, the directive management system 130 enforces temporal and probabilistic constraints by dynamically integrating time-based triggers and confidence thresholds into compliance policies. Temporal constraints are triggered by specific time conditions, such as "time≥21:00," enabling policies such as "Only verified_influencer can modify LinkedIn posts" to ensure temporal access control. Probabilistic constraints are activated based on confidence thresholds, such as "confidence≥80%," allowing policies such as "If threat≥HIGH between 22:00-06:00, deny new VMs" to enforce context-sensitive cybersecurity rules.

Event Based Ephemeral CIR

Figure 6A:
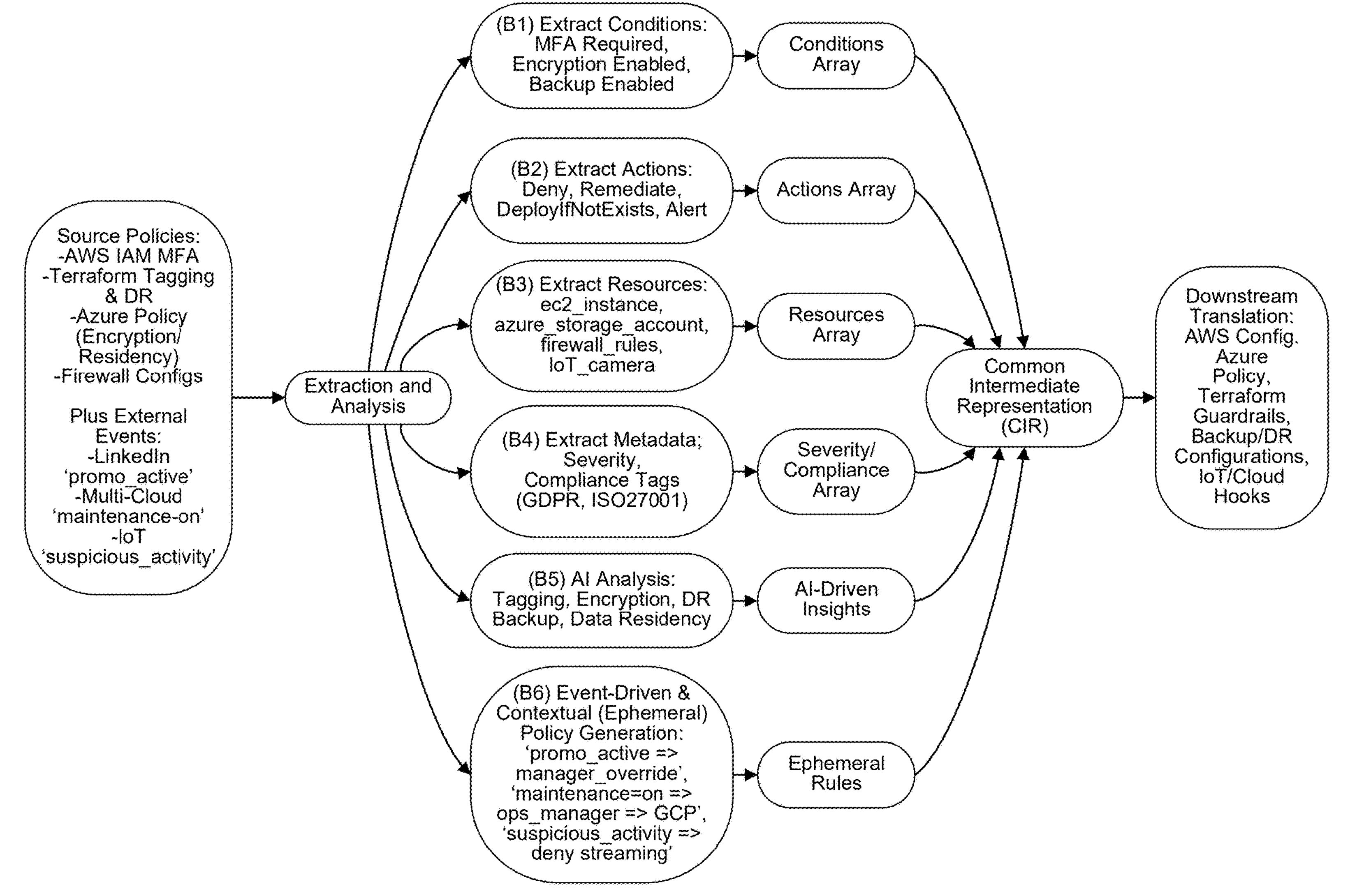
FIG. 6A is a flowchart depicting an event-based CIR creation process that can be performed by a directive management system, in accordance with some embodiments.

FIG. 6A is a flowchart depicting an event-based CIR creation process 560 that can be performed by a directive management system 130, in accordance with some embodiments. In an event-based CIR creation process 560, the directive management system 130 dynamically creates or updates ephemeral directives from CIR upon external triggers (e.g., security information and event management (SIEM) alerts, time-of-day, device posture).

In some embodiments, the directive management system 130 initiates the ingestion process by retrieving directives (e.g., cybersecurity policies) from directive sources such as domains 110, cloud native systems 145, or CNAPPs 120. This ingestion may occur via secure API calls, file transfers, or data streams, which may be authenticated using credentials, tokens, or other secure access mechanisms. The directive management system 130 can handle various source formats, such as JSON, YAML, or proprietary data models.

In some embodiments, the directive management system 130 collects not only static policy directive but also ephemeral and contextual data relevant to the operational state of a domain 110. Ephemeral data may take various forms that enable, disable, or alter a policy directive based on time or event triggers. For example, in some embodiments, ephemeral data may include system load triggers, such as directive activation during periods of high system utilization when CPU usage exceeds 90%. Ephemeral data may further include policies that temporarily restrict access during planned maintenance windows, for example, by allowing only administrative roles to access resources from 12:00 AM to 4:00 AM during scheduled updates. Additional examples of ephemeral data may include incident-based triggers, where temporary enforcement actions are implemented during security incidents, such as disabling external API calls upon detecting unauthorized access attempts. Ephemeral data may also include geospatial restrictions, such as denying resource access from specific regions during high-threat advisories due to geopolitical tensions or emerging compliance requirements. In some embodiments, ephemeral data may further include user-specific activity policies, which limit access when anomalous user behavior is detected. For example, a directive may block all data exports for a user account flagged for suspicious logins within a 24-hour period. Real-time threat alerts generated by external threat intelligence feeds may also serve as ephemeral triggers, such as blocking IP addresses flagged as malicious within the last 48 hours. Time-sensitive constraints may be defined to enforce restrictions on specific operations outside regular business hours, such as allowing file downloads only between 9:00 AM and 6:00 PM local time. Event-driven policies may also be included, where policy actions are triggered by specific operational events, such as invoking a deny rule for resource provisioning during data center failover events.

In some embodiments, the directive management system 130 utilizes contextual data to tailor policy directives based on operational and compliance needs. Contextual data may include user roles and hierarchical structures, such as policies that permit access to financial data only for users assigned the role of controllers or higher in the organizational hierarchy. Contextual data may further include geographic constraints, for example, policies requiring encryption of data stored in servers located in the European Union to ensure compliance with GDPR. Contextual data may include device-specific metadata, such as policies denying access to cloud resources from devices that do not have endpoint security software installed. Contextual data may also encompass historical activity patterns, such as policies flagging and requiring approval for transactions exceeding five times the usual activity of a given user account. In some embodiments, contextual data may include regulatory compliance tags, such as policies enforcing additional logging and encryption for resources tagged as compliant with SOC 2 or HIPAA requirements. Operational metrics may also serve as contextual data, for example, policies that limit new container deployments when memory usage on the cluster exceeds 80%. Access locations may further inform contextual data, such as policies allowing database access only from corporate IP ranges or through VPN connections. Contextual data may additionally include resource metadata, such as policies restricting modifications to critical resources tagged with identifiers such as "business-critical" or "confidential." Contextual data may also include behavioral risk scores, where policies require multifactor authentication for users with a risk score exceeding seven on a scale of ten. Collaboration contexts may further inform policies, such as restricting read-write permissions on shared documents if collaborators are external to domain 110.

In some embodiments, the directive management system 130 standardizes ephemeral and contextual data into CIR data fields by parsing the source policy directives to identify elements such as conditions, actions, and resources. For example, ephemeral triggers ingested from a source platform, may include rules such as "if time >=21:00 and user.role='influencer,' then allow post," or "if brand_promo=active, then invoke manager override." These triggers are normalized into the CIR conditions field as {"attribute": "time_of_day", "condition": ">=", "value": "21:00"} and {"attribute": "brand_promo", "condition": "equals", "value": "active"}. Actions associated with these conditions, such as ephemeral_allow_post or manager_override, are represented in the CIR actions field. The affected resources, such as specific social media posts, are encapsulated in the resources field such as ["facebook_post"].

In some embodiments, ephemeral conditions, which may be transient or event-driven, are mapped into CIR fields alongside corresponding actions. For instance, a cybersecurity rule specifying "if suspicious_activity=true, then deny post" is normalized into the CIR as a condition {"attribute": "suspicious_activity", "condition": "equals", "value": "true"} and an action ["ephemeral_deny_post"]. A CIR object may capture these conditions, actions, and resources in a consistent format, enabling subsequent directive translation and enforcement across target platforms.

An example of a CIR object with ephemeral conditions is shown below in JSON format:

json code

```
{
  "policy_id": "SPLK_XSIAM_01",
  "conditions": [
  {"attribute":"suspicious_process.count", "condition": ">=", "value":"3"},
  {"attribute":"time_of_day","condition":">=", "value": "00:00","ephemeral": true}],
  "actions": ["raise_incident=high", "quarantine_endpoint", "notify_admin"],
  "resources": ["siem_rule", "soar_playbook"],
  "metadata":{
  "policy_type":"cybersecurity_incident",
  "compliance_tags":["PCI-DSS"],
  "priority":"critical"
  }
}
```

In some embodiments, subsequent to the ephemeral and contextual data being normalized into CIR objects, the directive management system 130 translates the CIR objects into machine-executable directives suitable for the target CNAPP 120. Semantic mapping may applied to ensure the conditions and actions, such as {"attribute": "brand_promo", "condition": "equals", "value": "active"} and ["manager_override"], align with the target platform's capabilities. If the target platform lacks native support for ephemeral toggles, the directive management system 130 may generate custom hooking scripts or middleware. For instance, a generated script may include logic such as:

```
def x_ephemeral_events(event):
    if event. time>=21 and event. user.role== "verified_influencer":
        allow_post(event)
    if event.brand_promo=="active":
        manager_override_enable( )
```

This provides functional parity between the CIR-defined directive and its implementation of machine-executable directive in the target CNAPP.

In some embodiments, the directive management system 130 may conduct validation following the deployment of a machine-executable directive with one or more ephemeral triggers. For example, simulated triggers such as "time >=21:00," "brand_promo=active," or "suspicious_activity=true" are tested against the deployed directives. These simulations verify that the ephemeral and contextual directives correctly enforce the intended constraints. The directive management system 130 may log any discrepancies logged for further refinement.

In some embodiments, the directive management system 130 employs AI-driven analysis to interpret free-text policy descriptions and infer latent ephemeral or contextual conditions. For example, a policy text stating "secure brand usage at night" is analyzed by an NLP model, which generates the corresponding CIR condition {"attribute": "time_of_day", "condition": ">=", "value": "21:00"} and an action ["ephemeral_brand_rule"]. This step ensures that ambiguous or non-standard rules are standardized into a machine-readable format while preserving the policy's semantic intent.

In some embodiments, the directive management system 130 incorporates AI-driven tools to enhance the normalization process. The directive management system 130 may use natural language processing (NLP) techniques to analyze free-text descriptions, extracting directive intents and identifying semantic relationships that are not explicitly encoded in the source data. For example, a directive description stating "ensure no sensitive data is accessible publicly" may be mapped into CIR conditions that specify "public_access=false" and actions that include "remediate and alert." Machine learning models refine these interpretations by leveraging historical data and operational feedback to optimize the accuracy and relevance of the CIR mappings.

In some embodiments, the directive management system 130 translates the CIR objects into machine-executable directives that are in target-compatible formats for deployment in one or more CNAPPs 120. The directive management system 130 may use the directive translation engine 230, which applies mappings from a capabilities database that correlates CIR attributes with the configuration constructs of target platforms. For example, CIR conditions specifying "deny public access during high-threat conditions" might be translated into a YAML-based policy for one CNAPP 120 or a Rego policy for another. The translation process accounts for platform-specific idiosyncrasies, ensuring that the core policy intent and operational logic are preserved.

For example, the directive management system 130 deploys ephemeral and contextual CIR-based rules to the administrative interface of the target CNAPP 120. For example, ephemeral rules such as "time>=21:00 && user.role='influencer'=>allow post" and "brand_promo=active=>manager override" are translated into target-specific policies and deployed as:

```
{
  "x_policy_id": "fbx_evt_001",
  "ephemeral_rules": [
    {"trigger": "time>=21:00 && user.role= 'influencer'", "action": "allow_post"},
    {"trigger": "brand_promo='active'", "action": "manager_override"}
  ]
}
```

In some embodiments, the translated policies undergo validation before deployment. The directive management system 130 employs a validation engine 240 to conduct compliance checks to ensure alignment with regulatory standards such as GDPR or ISO 27001. The directive management system 130 may also simulate attack scenarios to verify that the translated policies effectively enforce the intended security measures. For instance, simulated attempts to access restricted resources during a high-risk period might test whether the translated directive correctly denies access and triggers an alert. Validation outcomes, including any detected discrepancies or misconfigurations, are recorded and analyzed.

In some embodiments, the directive management system 130 may dynamically generate a machine-executable directive based on a trigger that is ephemeral. For example, a cloud native system 145 may be governed by a set of default policy directives that are more permissive in nature. The directive management system 130 may receive a trigger, such as a cybersecurity incident indicating the threat level is high. In turn, the cloud native systems 145 may use the directive translation engine 230 to generate additional machine-executable directives that are ephemeral in nature or modify existing policies in response to the incident. For example, if the threat level is high, the directive translation engine 230 may extract relevant CIR objects and translate a new set of machine-executable directives that are used to ephemerally supersede the default policy directives. The new set of machine-executable directives may be transferred to the target system, such as a target CNAPP 120. If the incident is removed and the threat level returns to normal, the directive management system 130 may generate a series of API calls to remove those ephemeral machine-executable directives and return the policy directives to a default set.

Event-driven policy directives may take the form of dynamic and ephemeral directives that activate or adapt based on specific triggers such as high-threat alerts from AWS Security Hub, scheduled maintenance windows detected via AWS EventBridge, or other contextual events. These policies leverage contextual logic to adjust or create ephemeral rules in real time when specific conditions are met, such as time-based constraints, region-specific usage spikes, or compliance triggers. The directive management system 130 reflects these ephemeral or short-term constraints dynamically within the CIR objects and convert the CIR objects into target-platform specific policy directives for enforcement.

The benefits of this approach are multifaceted. First, it enables immediate adaptation, ensuring that if, for example, AWS detects a security anomaly, the CIR can dynamically incorporate ephemeral rules that reflect the anomaly before translating and enforcing them in Azure's environment. This rapid response eliminates delays and enhances overall security posture. Second, it significantly reduces manual overhead by automatically generating ephemeral or time-sensitive rules, removing the need for constant manual toggling or daily script maintenance. Lastly, the directive management system 130 provides unified governance by normalizing the event systems of disparate platforms, such as AWS EventBridge and CloudWatch with Azure Monitor and Event Grid, within the CIR. The directive management system 130 consistent and standardized approach to ephemeral policy management, regardless of the underlying platform differences.

By way of a specific example using AWS as a source and Azure as a target platform, the policy management system 130 may generate a CIR object, include ephemeral triggers in the CIR object, generate a set of default policy directives that are used in the target Azure normally, detect meeting of a ephemeral triggers, and generate a set of ephemeral policy directives to temporarily replace the default policy directives. For example, an examples of event-driven policy directives may be rules that activate or change dynamically based on specific triggers such as high-threat alerts from AWS Security Hub or maintenance windows detected through AWS EventBridge. Contextual logic further enables adjustments to or creation of ephemeral rules when predefined conditions are met, such as time-based constraints, regional usage spikes, or compliance events. The primary objective is to dynamically adapt ephemeral or short-term constraints in AWS and convert them into Azure-compatible policies via the CIR, ensuring unified governance across environments. The policy management system 130 eliminates the need for manual toggles or daily updates by automatically generating ephemeral or time-based rules in response to real-time triggers. Despite differing event systems, such as AWS EventBridge and CloudWatch versus Azure Monitor and Event Grid, the policy management system 130 normalizes these events into the CIR to maintain consistent ephemeral policy enforcement and governance.

The policy management system 130 ingests event-driven and contextual rules from AWS using its event and trigger mechanisms. For instance, AWS Security Hub or GuardDuty might flag a high-threat level, prompting the creation of ephemeral constraints that deny new resource creation. Similarly, AWS Systems Manager or EventBridge signals can indicate a maintenance window, resulting in ephemeral rules such as "only ops_admin can modify resources during maintenance." Usage spikes detected through AWS CloudWatch Alarms may also trigger ephemeral rules that limit resource creation to prevent overuse. These ephemeral or contextual rules may be further augmented by SIEM hooks that override baseline permissions, such as allowing only certain user roles to act during defined time periods when suspicious activity is logged. Each ephemeral rule is enriched with metadata, tagging conditions such as "threat=HIGH" or "maintenance=on" to define its application criteria clearly. The policy management system 130 normalizes this data into the CIR, attaching fields that indicate whether a policy is ephemeral, its time window, or specific triggers for activation. In cases where ephemeral logic conflicts with baseline AWS IAM or SCP rules, the directive management system 130 applies ephemeral constraints as the higher priority until the triggering event is resolved.

An example of CIR object is shown below.

JSON code

```
{
  "policy_id": "AWS-Event-001",
  "conditions": [
    {"attribute": "threat_level", "condition":
      "equals", "value": "HIGH"},
    {"attribute": "aws_region", "condition": "equals",
      "value": "us-east-1"}
  ],
  "actions": ["deny_resource_creation"],
  "resources": ["aws_ec2_instance"],
  "metadata": {
    "ephemeral": true,
    "priority": 4,
    "event_trigger": "AWS_SecurityHub"
  }
}
```

The policy management system 130 may leverage Azure Policy to implement ephemeral constraints that deny or audit actions based on attributes such as region, resource type (e.g., virtual machines or storage), or user roles. When ephemeral logic relies on triggers, the policy management system 130 replicates these triggers within Azure Monitor or Event Grid to enable real-time enforcement. For remediation actions, the policy management system 130 translates ephemeral "remediate" directives, such as "encrypt disk if threat≥MEDIUM," into deployIfNotExists actions or custom scripts within the Azure environment.

In some embodiments, the policy management system 130 performs semantic mapping to adapt ephemeral constraints for Azure Policy. For example, the policy management system 130 converts ephemeral rules like "deny resource if threat=HIGH" into a dynamic Azure Policy 'deny effect,' which is limited to a time-bound or alert-triggered scope. Time-based ephemeral constraints, such as "time≥21:00=>ephemeral block," are represented in Azure by storing the time condition in metadata and enforcing it during a scheduled window or via an Event Grid trigger.

In some embodiments, the policy management system 130 executes runtime adjustments for ephemeral constraints within Azure environments. The policy management system 130 establishes real-time hooking or ephemeral injection mechanisms, such as Azure Functions or Logic Apps, to block or quarantine resources based on ephemeral constraints derived from the CIR. If an ephemeral rule specifies expiration conditions, such as the resolution of a "threat=HIGH" state in AWS, the policy management system 130 ensures that such rules are automatically removed or downgraded within Azure's environment to maintain consistency and avoid unnecessary enforcement.

The policy management system 130 provides several key advantages for event-driven CIR conversion, enabling seamless synchronization and handling of ephemeral policies across cloud native systems 145, such as between AWS and Azure. One primary benefit is the ability of the directive management system 130 to achieve immediate policy synchronization. When AWS triggers ephemeral constraints, such as during maintenance windows or in response to security alerts, these ephemeral rules are propagated to Azure in near-real time via the CIR. This ensures that cross-cloud vulnerabilities are minimized by maintaining consistent policy enforcement across both environments. Additionally, the policy management system 130 ensures consistent handling of ephemeral events by unifying triggers from AWS and Azure into the same schema, preventing issues such as partial merges or conflicting ephemeral rules. This uniformity allows ephemeral constraints from different sources to integrate seamlessly without ambiguity.

The directive management system 130 also demonstrates scalability and extensibility, as additional event sources—whether SIEM-based or IoT-based—can be appended to the CIR without requiring extensive rewrites. New ephemeral triggers are simply added to the existing schema, enabling Azure or other target environments to parse and enforce these rules dynamically as they appear. Furthermore, the policy management system 130 significantly reduces manual coordination efforts. Administrators no longer need to manually toggle or replicate ephemeral logic in Azure each time an AWS event triggers a constraint. Instead, the system automatically updates Azure's environment to reflect the ephemeral rules as they are created, modified, or expired, ensuring continuous and consistent policy enforcement without requiring human intervention. This streamlined approach enhances operational efficiency while maintaining robust cross-cloud security and governance.

The ephemeral directives have applications in governance, provisioning, and cybersecurity. Governance directives define overarching rules, roles, and compliance standards for resource usage and organizational structure. For example, ephemeral constraints may restrict resource usage to specific regions, such as "region=us-east-1 only," or impose role-based limitations on resource creation and require mandatory cost-tagging. These directives ensure that actions align with organizational standards and compliance requirements.

Provisioning directives govern how resources are created, configured, and deployed within the system. For instance, ephemeral rules might enforce constraints such as "deny new S3 buckets" or "only ops_admin can modify VMs during maintenance." These directives define the exact conditions under which new resources may be instantiated or altered, ensuring that operational integrity is maintained even during high-pressure events like maintenance windows.

Cybersecurity directives focus on threat detection, adaptive responses, and secure configurations to safeguard the platform. Examples include ephemeral deny rules triggered by a GuardDuty threat=HIGH alert, requirements for data encryption, or real-time hooking mechanisms that block suspicious activities. These directives enable the system to dynamically adjust its security posture in response to events such as elevated threat levels or unusual usage patterns, ensuring both immediate and long-term resilience. By integrating these directive types within the CIR, the directive management system 130 ensures seamless, automated directive enforcement across AWS and Azure environments while maintaining consistency, compliance, and security.

The policy management system 130 dynamically integrates ephemeral or baseline rules into actionable configurations. For governance policies, the directive management system 130 might enforce constraints such as "user.role≠admin cannot install apps after 9 PM if USB is present." This policy is translated into API calls for Mac MDM commands or Apple Remote Desktop scripts, which push "deny app installations" rules to the targeted Mac devices. The directive management system 130 ensures that administrative boundaries and compliance requirements are upheld automatically in real time.

For provisioning policies, the directive management system 130 automates device enrollment to maintain compliance. For example, if a user logs into a Mac device after hours, the system applies an ephemeral rule like "auto-enroll Mac devices into the corporate environment." This is executed via Mac provisioning scripts, triggered by an MDM profile, to seamlessly configure the device according to ephemeral or baseline requirements. This ensures that all devices are fully compliant with organizational policies, even under varying operational scenarios.

In cybersecurity scenarios, the directive management system 130 enforces adaptive protection measures in response to detected threats. For instance, if suspicious activity is identified on a Mac device through security logs, the system applies an ephemeral block on new software installations or network connections. This ephemeral constraint is implemented through the Mac Endpoint Security API or third-party Endpoint Detection and Response (EDR) tools, ensuring an immediate lockdown to mitigate risks. By integrating these outputs with Mac-specific APIs and frameworks, the policy management system 130 provides robust, automated policy enforcement across governance, provisioning, and cybersecurity domains, maintaining compliance and security dynamically.

FIG. 6B is a flowchart depicting an example process 650 for migrating an ephemeral based policy directive, in accordance with some embodiments. While process 650 is primarily described as being performed by the directive management system 130, in various embodiments the process 650 may also be performed by any suitable computing devices. In some embodiments, one or more steps in the process 650 may be added, deleted, or modified. In some embodiments, the steps in the process 650 may be carried out in a different order that is illustrated in FIG. 6B.

In some embodiments, the directive management system 130 may receive 655 a source directive from a source CNAPP 120. The source directive may define an ephemeral condition in applying the source directive. For example, an ephemeral condition may represent a transient or situational rule that triggers specific policy actions based on temporary circumstances within the domain 110. The source CNAPP 120 may be any suitable CNAPP 120 that is currently enforcing a policy directive at a cloud native system 145.

In some embodiments, the directive extraction engine 210 within the directive management system 130 may be used for retrieving such directives. The directive extraction engine 210 may use secure API calls to interact with the source CNAPP 120 to enable authenticated and encrypted communication. The retrieved source directive may include structured and unstructured data elements, such as conditions, actions, resources, and metadata specific to the source CNAPP 120. For example, the source directive may be in machine-executive code, source code, policy in natural language text, a data file, etc. The directive extraction engine 210 may process the source directive by parsing its structural components and metadata. For instance, the directive extraction engine 210 may extract key attributes, including ephemeral conditions, procedural actions, and identifiers for targeted resources.

The directive management system 130 may have compatibility with various CNAPPs 120 that have heterogeneous directive formats. These formats may include JSON, YAML, plain text, or natural language descriptions, which the directive extraction engine 210 may parse and standardize for subsequent processing. Further details on the directive extraction process are discussed in connection with the directive extraction engine 210 in FIG. 2.

In some embodiments, the directive management system 130 may create 660 a common intermediate representation (CIR) that includes the ephemeral condition normalized as a parameter in the CIR. The CIR serves as a platform-agnostic object according to a schema so that the directive management system 130 may provide consistent processing and compatibility across diverse CNAPPs 120.

To create the CIR, the directive management system 130 may parse the source directive to extract the ephemeral condition. For example, the directive management system 130 may identify the structural components of the source directive, such as conditions, actions, and resource identifiers, and processes them into key-value pairs. These components may be mapped based on a platform-agnostic schema to normalize the ephemeral condition.

In some embodiments, the directive management system 130 may convert the parsed data into a standardized CIR format. This process abstracts platform-specific syntax and normalizes policy attributes, such as ephemeral conditions, actions, and compliance metadata. For example, the CIR may represent an ephemeral condition as a parameter that specifies the condition's logical criteria, associated actions, and affected resources in a structured format. Further detail on creating the CIR is described in FIG. 2, which illustrates the CIR generation engine 220 and the CIR store 225. The normalized CIR objects are stored in the CIR store 225 for downstream translation and validation processes.

In some embodiments, the directive management system 130 may translate 665 the CIR into a default machine-executable directive that is executable by a target CNAPP 120. The default machine-executable directive is designed to enforce a default directive that controls one or more cloud resources of a domain 110. For example, a default directive may be a directive that is used without a special event or specific trigger that changes the threat level in a cybersecurity environment. The target CNAPP 120 may be a second CNAPP 120 that is delegated by the domain 110 to maintain the cloud resources for the domain 110, such as the cloud resources in a cloud native system 145. The directive management system 130 may migrate the policy directive of the source CNAPP 120 to the target CNAPP 120, such as in a situation where the domain 110 is changing CNAPPs 120 or in a situation where the domain 110 wants a policy directive to be applied across multiple CNAPPs 120.

To perform the translation, the directive management system 130 may analyze platform-agnostic conditions and actions stored in the CIR. The directive translation engine 230 of the directive management system 130 may map these conditions and actions to the target-specific syntax required by the target CNAPP 120. For instance, ephemeral conditions stored in the CIR may be converted into platform-compliant rules, ensuring that the resulting machine-executable directive aligns with the operational and regulatory requirements of the target CNAPP 120.

In some embodiments, the directive translation engine 230 may generate additional scripts or configurations to handle translation conflicts or limitations in the target platform. For example, if the target CNAPP 120 lacks native support for specific CIR features, custom error-handling scripts or workflows may be created to ensure proper enforcement of the directive's functional intent.

The translation process may retain compliance attributes, such as regulatory tags or metadata stored in the CIR, by mapping the attributes to equivalent constructs in the target CNAPP 120. This ensures the machine-executable directive meets both operational and compliance requirements. Additional details on the translation process are described in FIG. 4A in connection with the directive translation engine 230.

In some embodiments, the directive management system 130 may receive 670 an event trigger that matches the ephemeral condition stored in the CIR. The event trigger corresponds to a specific condition or occurrence within the domain 110 or a cloud native system 145 that activates the ephemeral condition defined in the CIR. For example, the directive management system 130 may continuously monitor events to detect triggers matching the ephemeral condition. For example, the event trigger could represent a system anomaly, such as unauthorized access attempts, resource misconfigurations, or changes in compliance status. When such an event is identified, the directive management system 130 retrieves the associated ephemeral condition parameters from the CIR store 225 for further processing.

In some embodiments, the directive management system 130 may ensure the accuracy of event detection through predefined rules or machine-learning-based anomaly detection models integrated with directive management system 130. These models may analyze real-time data, such as system logs, user activity, or environmental conditions, to identify events that satisfy the criteria of the ephemeral condition.

In some embodiments, the directive management system 130 may create 675, responsive to receiving the event trigger that matches the ephemeral condition, an ephemeral machine-executable directive from the CIR. The ephemeral machine-executable directive is used to supersede the default machine-executable directive at least temporarily, enabling adaptive control of one or more cloud resources within the domain 110. For example, the temporary duration may be based on when the ephemeral condition is met.

To create the ephemeral machine-executable directive, the directive management system 130 may retrieve stored CIR parameters associated with the event trigger from the CIR store 225. These parameters may include the ephemeral condition, specific actions to be enforced, and resource identifiers. The directive translation engine 230 uses these parameters to generate platform-specific configurations and syntax tailored to address the ephemeral condition. In some embodiments, the directive management system 130 assigns a priority tag to the ephemeral machine-executable directive to signify that it temporarily overrides the default directive. This ensures that the ephemeral directive takes precedence during the duration of the triggering condition.

If the target CNAPP 120 lacks native support for ephemeral conditions or directives, the directive translation engine 230 may generate custom scripts or hooks to implement the required functionality. For example, the directive management system 130 may create a custom enforcement script to apply ephemeral constraints, such as denying access to a resource or restricting operational parameters for a specified time.

Further details about the creation of ephemeral machine-executable directives are described in FIG. 4A in connection with the directive translation engine 230 and in FIG. 6A in connection with various examples of ephemeral CIR objects.

In some embodiments, the directive management system 130 may transmit 680 the ephemeral machine-executable directive to the target CNAPP 120 as a response to the event trigger. The ephemeral machine-executable directive is executable by the target CNAPP 120 to enforce an ephemeral replacement directive that at least temporarily replaces the default directive to control one or more cloud resources of the domain 110. To transmit the ephemeral directive, the directive management system 130 may utilize secure communication protocols, such as HTTPS or API calls. The governance and deployment engine 260 of the directive management system 130 manage the configuration and scheduling of the transmission to ensure timely deployment of the ephemeral directive in response to the triggering event.

In some embodiments, the directive management system 130 may integrate with third-party tools, such as Endpoint Detection and Response (EDR) systems, to implement the ephemeral directive on target CNAPP 120. For example, the system may trigger an EDR tool to enforce ephemeral constraints, such as blocking unauthorized access or restricting resource usage temporarily.

In some embodiments, the directive management system 130 manages the ephemeral directive to maintain the directive's functional intent and compliance attributes throughout the transmission and execution process. This ensures that the ephemeral directive dynamically responds to situational triggers while adhering to operational and regulatory requirements.

The process 650 may also include one or more features below. For example, in some embodiments, the directive management system 130 may integrate a platform capability database 215 that stores platform-specific settings. The platform capability database 215 serves as a structured knowledge base that includes details about various CNAPPs 120, their supported configurations, compliance requirements, and operational constraints. During the translation process, the directive management system 130 may query the platform capability database 215 to map the ephemeral condition into the default machine-executable directive. By referencing platform-specific enforcement capabilities, the directive translation engine 230 ensures that the ephemeral condition is correctly represented in the directive syntax of the target CNAPP 120.

In some embodiments, the directive management system 130 may detect a new cloud resource within the domain 110. The governance and deployment engine 260 continuously monitors cloud infrastructure for new resource additions, such as newly provisioned virtual machines, storage buckets, or containerized applications. Upon detecting a new resource, the directive management system 130 may automatically apply the ephemeral machine-executable directive to the new cloud resource. This ensures that new resources remain governed under the same ephemeral constraints without requiring manual intervention.

In some embodiments, the directive management system 130 may transmit the ephemeral machine-executable directive to the target CNAPP 120 for an administrator of the domain 110 as a human-in-the-loop review process prior to enforcement. The governance and deployment engine 260 may facilitate this review by providing administrators with visibility into the ephemeral directive's parameters, intended enforcement scope, and compliance implications. If required, the administrator may approve, modify, or reject the ephemeral directive before it is deployed in the target CNAPP 120.

In some embodiments, the directive management system 130 may cause a display of analytics related to the enforcement of the ephemeral replacement directive at a graphical user interface 265. The report and alert engine 255 may aggregate enforcement outcomes, operational impacts, and compliance statuses associated with the ephemeral directive. These analytics may be presented in the form of dashboards, charts, or real-time alerts, enabling administrators to monitor directive effectiveness and identify potential policy gaps.

In some embodiments, the directive management system 130 may determine that the ephemeral machine-executable directive is in conflict with another directive implemented in the target CNAPP 120. The compliance engine 235 may detect conflicts by analyzing directive dependencies, enforcement conditions, and overlapping policy scopes. If a conflict is identified, the directive management system 130 may resolve the conflict by adjusting priority levels, merging directives, or generating corrective enforcement rules to ensure proper directive execution within the CNAPP 120.

In some embodiments, the directive management system 130 may apply a machine learning model 245 to analyze historical directive enforcement outcomes. The machine learning model 245 may process past directive executions, success rates, and compliance failures to identify patterns that inform future ephemeral directive creation. Based on the output of the machine learning model 245, the directive management system 130 may dynamically refine the creation of the ephemeral machine-executable directive, ensuring optimized enforcement strategies that adapt to evolving operational conditions.

In some embodiments, the directive management system 130 may receive external threat intelligence data from an external source. The continuous feedback engine 250 may integrate real-time security feeds, external vulnerability databases, or industry-specific threat advisories. Based on the received intelligence data, the directive management system 130 may adjust one or more parameters of the ephemeral machine-executable directive. For example, if a newly discovered exploit is identified in the threat intelligence feed, the system may modify access control parameters to mitigate the risk.

In some embodiments, receiving the event trigger that matches the ephemeral condition stored in the CIR may comprise analyzing time-series data representing directive enforcement events. The directive management system 130 may monitor historical event logs, security alerts, or operational metrics to detect patterns in directive executions. The system may determine that an event trigger is met when the frequency of a specific event type in the time-series data reaches a predefined threshold. This ensures that ephemeral directives are only activated when statistically significant conditions warrant their enforcement.

In some embodiments, the directive management system 130 may receive a type of cloud resource within the domain 110. The system may categorize resources into different types, such as compute instances, databases, or serverless functions. Based on the identified resource type, the directive management system 130 may tailor the ephemeral machine-executable directive to align with the operational characteristics and security requirements of the resource type. This ensures that ephemeral constraints are applied with resource-specific optimizations for enhanced security and compliance.

Multi-Modal CIR Generation

Figure 7A:
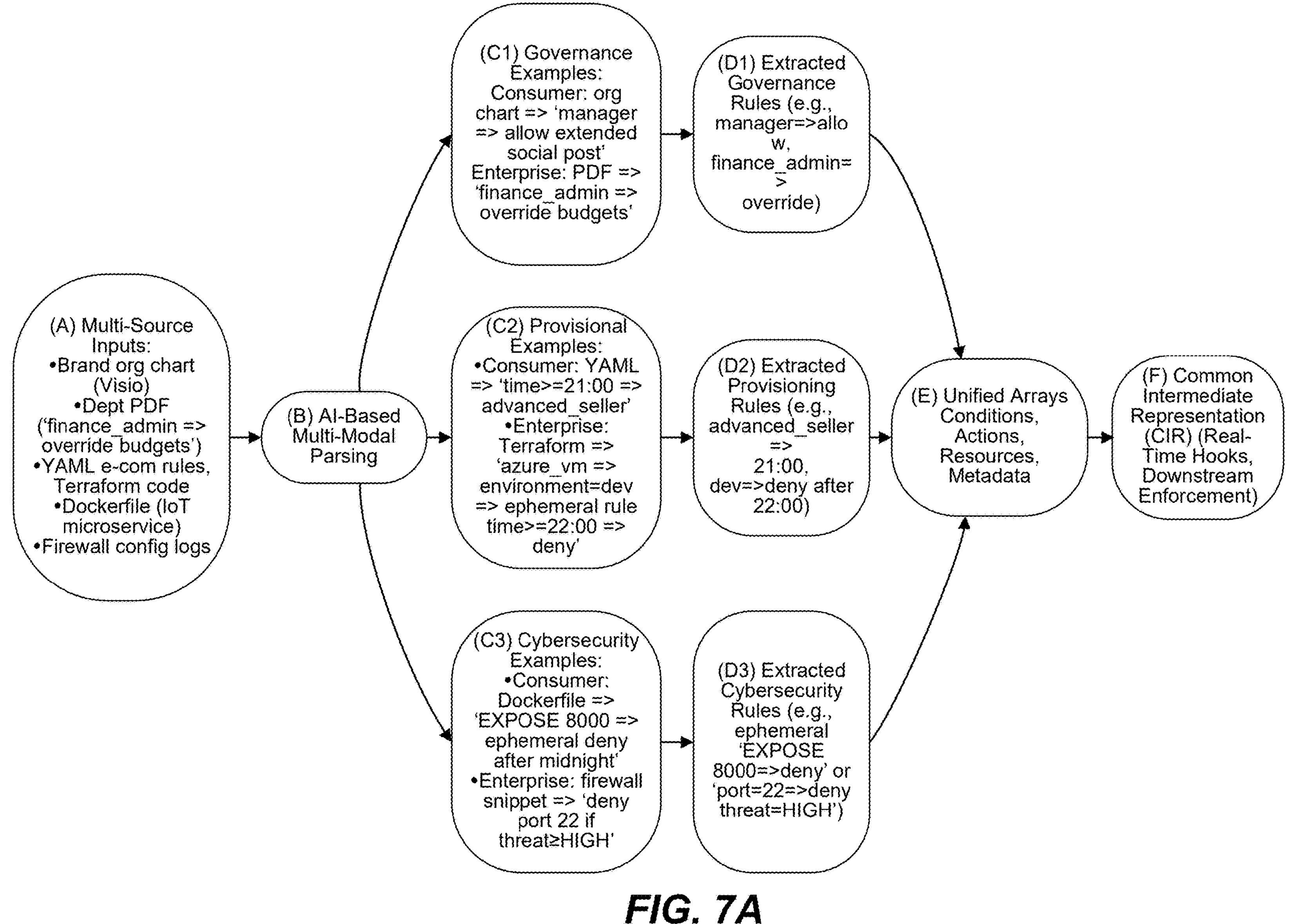
FIG. 7A is a flowchart depicting the generation of CIR objects from multi-modal sources, in accordance with some embodiments.

FIG. 7A is a flowchart depicting the generation of CIR objects from multi-modal sources, in accordance with some embodiments. In some embodiments, the directive management system 130 employs multi-modal AI reasoning to transform unstructured and semi-structured inputs, such as code snippets, diagrams, and textual logs, into structured CIR objects.

In some embodiments, the directive management system 130 processes multi-modal inputs, including code snippets, diagrams, and textual logs, to generate structured CIR objects. Code snippets, such as YAML files defining provisioning rules or Dockerfiles specifying microservices configurations, are ingested to extract actionable conditions and actions. Diagrams, including organizational charts, are analyzed to identify governance relationships, such as "finance_admin=>override budgets." Text logs, such as firewall configurations or free-form security logs, are processed to derive cybersecurity rules, such as "deny port 22 if threat=HIGH." The directive management system 130 processes multi-modal inputs by interpreting specific programming constructs (e.g., YAML, Terraform, Dockerfiles) into CIR fields, such as conditions and actions. For example, a YAML rule "time>=21:00=>advanced_seller" is parsed into CIR components, while a Dockerfile directive "EXPOSE 8000" triggers ephemeral actions such as "deny after midnight." Similarly, the directive management system 130 may perform file-based ingestion of diagrams semantically extracts relationships such as "manager=>allow extended social post." API-based ingestion of textual logs dynamically derives actionable insights, such as firewall configurations, to inform CIR generation.

In some embodiments, the directive management system 130 may use a multi-step workflow to process multi-modal inputs and generate CIR objects. During data ingestion, file-based methods parse uploaded files such as YAML, PDFs, and Visio documents, while API-based ingestion retrieves documents from external systems such as document management servers. Light agents are employed to process device-specific configurations, such as Dockerfiles containing microservices deployment rules. Additional inputs, such as automation scripts, promotional strategy diagrams, or admin notes describing ephemeral constraints (e.g., "Only brand_admin can override post content at night"), are parsed using file-based, API-based, or light agent ingestion. Artifacts such as Visio diagrams, markdown notes, and YAML/Terraform templates specifying social media connectors further enrich the directive translation process.

In some embodiments, the directive management system 130 employs AI reasoning to semantically parse relationships and constraints from multi-modal inputs. For instance, the system extracts governance rules such as "finance_admin=>override budgets" from unstructured text and dynamically generates ephemeral policies, such as "deny port 22 if threat=HIGH," based on contextual triggers or real-time events. These dynamically created rules are incorporated into the CIR framework for immediate enforcement. In some embodiments, the directive management system 130 applies AI interpretation to transform ingested data into actionable CIR fields. For example, a YAML snippet reading "azure_vm=>environment=dev=> ephemeral rule time>=22:00=>deny" is processed to identify conditions (e.g., time>=22:00), actions (e.g., deny), resources (e.g., azure_vm), and metadata (e.g., ephemeral tags). These extracted fields are normalized and integrated into the CIR framework.

In some embodiments, the directive management system 130 may perform multi-modal AI reasoning across governance, provisioning, and cybersecurity contexts. For governance, consumer applications may involve ingesting an organizational chart, where AI extracts a rule such as "manager=>allow extended social post." In an enterprise scenario, a departmental PDF specifying "finance_admin=> override budgets" is processed via API ingestion, normalizing the directive into CIR conditions and actions. In some embodiments, the directive management system 130 processes provisioning rules from both consumer and enterprise contexts. For example, a YAML snippet, "time>=21:00=>advanced_seller," ingested from a consumer file, is parsed to generate CIR conditions and actions. In an enterprise scenario, Terraform code specifying "azure_vm=> environment=dev=>ephemeral rule time>=22:00=>deny" is ingested and normalized into CIR fields, including conditions (e.g., time>=22:00), actions (e.g., deny), and resources (e.g., azure_vm). Cybersecurity rules, such as "deny port 22 if threat=HIGH," are parsed from textual logs and normalized into CIR objects for enforcement. For consumer applications, a Dockerfile specifying "EXPOSE 8000" is processed via light agent ingestion, triggering the ephemeral directive "deny after midnight." For enterprise environments, API ingestion of a firewall log specifying "deny port 22 if threat=HIGH" dynamically generates CIR conditions (e.g., threat=HIGH) and actions (e.g., deny port 22), ensuring real-time enforcement.

The directive management system 130 applies AI reasoning across diverse inputs, resolving ambiguities and conflicts. For instance, a departmental PDF stating "finance_admin=>override budgets" and a YAML snippet specifying "time>=22:00=>deny" are reconciled into consistent CIR fields. This resolution requires domain-specific interpretation of syntax and semantics, enabling actionable compliance policies.

In some embodiments, the directive management system 130 normalizes the extracted data into CIR objects using ontology alignment. Roles and constraints from Facebook, such as "verified_influencer" or "scheduling_post," are mapped onto standardized classes such as UserRole, Post-Action, and TimeConstraint. Compliance tags, such as GDPR or brand guidelines, are added to metadata fields, and probabilistic conditions, such as "suspicious_conf≥0.5," are incorporated for advanced cybersecurity logic. Time-based and ephemeral constraints, such as "region=eu=>brand_approval required," are integrated into the CIR with unified conditions, actions, and metadata.

In some embodiments, the directive management system 130 translates CIR objects for enforcement by performing semantic mapping, aligning roles such as "verified_influencer" to "verified_creator" and ephemeral constraints, such as "brand_approval=>ephemeral check," into X's scheduling endpoints. If X lacks equivalent features, custom scripts or hooks are generated to implement policies, such as "only verified_creator can tweet after 10 PM when brand_promo=active." Metadata and probabilistic conditions, such as "suspicious_conf≥0.5," are incorporated into X's directive framework to support real-time constraints.

In some embodiments, the directive management system 130 enforces the converted policies by integrating real-time hooks and testing multi-modal constraints. For example, ephemeral constraints such as "time≥22:00=>deny unverified" are validated in a staging environment to ensure compliance. Ongoing updates, derived from new Facebook logs or diagrams, are processed by the AI pipeline and re-applied in X's environment, maintaining semantic continuity and enforcement of updated rules. This process ensures robust and scalable directive translation and enforcement across platforms.

Integration with Knowledge Base

Figure 7B:
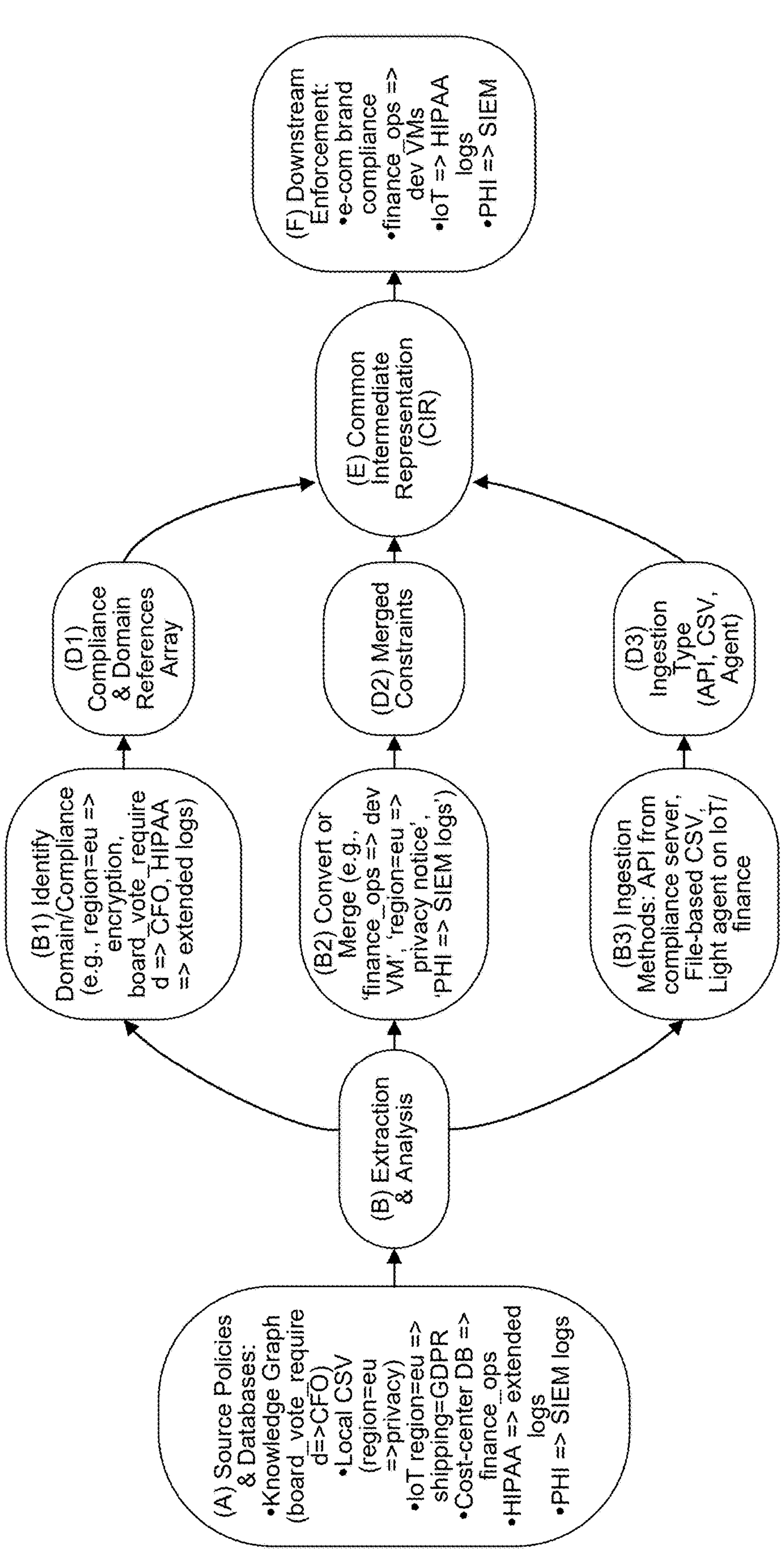
FIG. 7B is a flowchart depicting an integration with a platform capability database with a directive management system, in accordance with some embodiments.

FIG. 7B is a flowchart depicting an integration with a platform capability database 215 with a directive management system 130, in accordance with some embodiments. In various embodiments, a platform capability database 215 is a knowledge base that may take various different forms, such as a knowledge graph, a structured relational database, a semi-structured data repository, or any combination thereof. A knowledge base and the platform capability database 215 may be used interchangeably in this context. The integration supports the ingestion, normalization, and application of compliance rules, governance directives, or domain-specific constraints into the CIR framework for enforcement across multiple platforms. For example, the integration allows references such as "region=EU=> encryption required" to be dynamically contextualized and normalized into CIR fields for enforcement.

In some embodiments, the platform capability database 215 integrated with the directive management system 130 may the form of knowledge graphs, which include data structures storing entities as nodes and relationships as edges. Examples include entities such as devices, regulations, or governance policies and relationships such as "HIPAA=>requires encryption" or "board_ vote_ required=>CFO can finalize." These semantic relationships may be dynamically fetched and contextualized by the directive management system 130 and may be merged into CIR fields for enforcement purpose. For example, a knowledge graph may store a relationship "HIPAA=>if device=health_monitor=>extended logs," enabling dynamic enforcement of device-specific logging requirements.

In some embodiments, the directive management system 130 utilizes knowledge graphs to dynamically enrich compliance and cybersecurity rules. For example, a knowledge graph may store relationships such as "board_vote_ required=>CFO can finalize" or "HIPAA=>extended logs for health_monitor devices." The directive management system 130 ingests these relationships via API ingestion and maps them into CIR fields for enforcement. This mapping allows governance rules, such as requiring CFO approval for certain board actions, or cybersecurity rules, such as enforcing device-specific logging requirements, to be integrated into the CIR framework.

In some embodiments, the platform capability database 215 integrated with the directive management system 130 may the form of external databases, which may include structured or semi-structured repositories such as relational databases, CSV files, or cloud-hosted NoSQL systems. For instance, a database specifying "region=us_west=> cost_center=101=>finance_ops=>allow dev VM provisioning" may be ingested via light agents deployed on a financial gateway. Similarly, consumer compliance data, such as "region=EU=>must attach extended privacy notice," may be processed via file parsing.

In some embodiments, the platform capability database 215 combines data from knowledge graphs and external databases to create a unified CIR object. For example, compliance references such as "HIPAA=>extended logs" or provisioning rules such as "region=EU=>must attach extended privacy notice" are normalized into CIR fields. These fields may include conditions (e.g., region=EU), actions (e.g., encrypt, deny, remediate), resources (e.g., aws_instance, finance_ops), and metadata (e.g., severity, compliance tags such as HIPAA or GDPR). Mapping relationships such as "HIPAA=>if device=health_ monitor=>extended logs" requires semantic reasoning and structural transformation. The directive management system 130 may dynamically extract relevant actions, conditions, and metadata to create actionable CIR fields, which are subsequently enforced across different platforms. In some embodiments, the directive management system 130 may dynamically adapt policies based on real-time contextual triggers. For example, an ephemeral rule such as "IoT region=EU=>shipping must be GDPR-compliant" may be dynamically generated and incorporated into the CIR framework. Similarly, a governance rule such as "Promo_ active=>manager_override" may be triggered and enforced in real-time through integration with a knowledge graph.

In some embodiments, the directive management system 130 combines data from knowledge graphs and external databases to create unified CIR objects. For example, compliance rules such as "region=EU=>attach extended privacy notice" and cybersecurity rules such as "HIPAA=>extended logs" are merged and represented as conditions, actions, resources, and metadata within the CIR framework. Conditions may include triggers such as "region=EU" or "threat_level=HIGH," while actions specify enforcement outcomes such as "deny," "log," or "remediate." Metadata captures compliance tags such as HIPAA, PCI-DSS, or GDPR, ensuring comprehensive directive coverage.

In some embodiments, the directive management system 130 ingests data from platform capability database 215 using various methods, including API ingestion via RESTful endpoints to fetch rules such as "board_vote_required=>CFO can finalize," file parsing to process CSV files with directives such as "region=EU=>must attach privacy notice," and light agents deployed on gateways to retrieve localized rules, such as "region=us_west=>cost_center=101." The ingested rules are normalized into CIR fields, including conditions (e.g., region=EU), actions (e.g., encrypt, deny, or attach privacy notice), and metadata (e.g., compliance tags such as GDPR or ISO27001). Directive management system 130 dynamically adapts CIR objects based on contextual triggers, generating ephemeral policies in real time, such as "SIEM alert=>deny access." These CIR objects are then translated into platform-specific configurations, such as AWS Config policies or Terraform Guardrails, ensuring consistent and actionable enforcement across diverse operational environments. In some embodiments, the directive management system 130 enforces governance, provisioning, and cybersecurity policies by integrating diverse data sources into the CIR framework. Governance rules, such as "board_vote_required=>CFO can finalize," are ingested from a compliance database via APIs and mapped to CIR fields for enforcement, while region-specific directives such as "region=EU=>attach privacy notice" are processed through file-based ingestion and normalized accordingly. For provisioning, light agents dynamically retrieve cost-center-specific rules, such as "region=us_west=>cost_center=101=>allow dev VM provisioning," ensuring consistent resource allocation. Cybersecurity policies are enhanced by leveraging knowledge graphs to map device-specific compliance requirements, such as "HIPAA=>extended logs," and integrating real-time enforcement rules from external compliance databases, such as "PHI=>must route to SIEM logs." These integrated CIR objects enable seamless enforcement across multi-platform environments.

In some embodiments, based on the data in the platform capability database 215, the directive management system 130 enables contextual directive adaptation by generating ephemeral rules based on real-time events or external triggers. For example, a governance rule such as "Promo_active=>manager_override" or a provisioning rule such as "IoT region=EU=>shipping must be GDPR-compliant" may be dynamically created and incorporated into the CIR framework. Directive management system 130 ensures these dynamic rules are normalized and enforced without disrupting existing policies. In some embodiments, the directive management system 130 utilizes knowledge graphs to dynamically enrich compliance and cybersecurity rules. For example, a knowledge graph may store relationships such as "board_vote_required⇒ CFO can finalize" or "HIPAA⇒extended logs for health_monitor devices." The directive management system 130 ingests these relationships via API ingestion and maps them into CIR fields for enforcement. This mapping allows governance rules, such as requiring CFO approval for certain board actions, or cybersecurity rules, such as enforcing device-specific logging requirements, to be integrated into the CIR framework. In another example, an SIEM alert indicating "threat_level=HIGH" may dynamically generate a rule such as "deny external traffic from untrusted zones," derived from a knowledge graph entry or an external database. Directive management system 130 incorporates these ephemeral rules into the CIR framework for immediate enforcement.

In some embodiments, the directive management system 130 enforces cybersecurity policies by dynamically responding to real-time threats. For example, a knowledge graph entry such as "HIPAA⇒if device=health_ monitor⇒extended logs" may trigger the creation of a CIR object specifying enhanced logging requirements for IoT devices in healthcare environments.

In some embodiments, the directive management system 130 dynamically updates CIR objects based on real-time changes to compliance requirements or domain constraints. For example, a knowledge graph update introducing a new relationship, such as "region=APAC⇒advanced encryption required for IoT devices," triggers automatic updates to relevant CIR objects. Directive management system 130 propagates these updates to target platforms, ensuring that policies remain compliant with the latest regulatory standards.

In some embodiments, the directive management system 130 integrates knowledge graphs with CIR generation to provide semantic reasoning and structural transformation for compliance and cybersecurity policies. For example, a knowledge graph may store relationships such as "HIPAA⇒if device=health_monitor⇒extended logs." Directive management system 130 resolves these relationships by extracting relevant conditions, actions, and metadata and transforming them into actionable CIR fields. This process allows compliance rules derived from the knowledge graph to be dynamically enforceable in real-time. In some embodiments, the directive management system 130 enables contextual directive adaptation by generating ephemeral rules based on real-time events or external triggers. For example, a governance rule such as "Promo_active⇒manager_override" or a provisioning rule such as "IoT region=EU⇒shipping must be GDPR-compliant" may be dynamically created and incorporated into the CIR framework. Directive management system 130 ensures these dynamic rules are normalized and enforced without disrupting existing policies.

In some embodiments, in translating data in the platform capability database 215, the directive management system 130 may integrate AI-driven natural language processing (NLP) to interpret unstructured or ambiguous rules during CIR generation. For instance, a policy directive such as "enforce strict zero-trust policies in DMZ regions" is analyzed to extract conditions, actions, and metadata. Directive management system 130 maps these extracted components into structured CIR fields, ensuring that unstructured directives are actionable and enforceable.

In some embodiments, the directive management system 130 resolves conflicts between overlapping rules by applying priority-based or contextual resolution strategies. For example, if a knowledge graph specifies "HIPAA⇒encryption required for health monitors," while an external database provides a conflicting rule for a different device type, the directive management system 130 may prioritize the compliance requirement based on organizational standards and regulatory importance. The final CIR object may represent a harmonized policy.

In some embodiments, the directive management system 130 resolves ambiguities and inconsistencies in policies by applying semantic reasoning. For example, a rule specifying "IoT region=EU⇒GDPR-compliant data handling" is harmonized with overlapping policies from an external database stating "region=EU⇒encryption required." Directive management system 130 merges these rules into a unified CIR object that applies encryption and compliance tags such as "GDPR" for all IoT devices in the EU. In some embodiments, the directive management system 130 applies error-handling mechanisms to manage incomplete or corrupted inputs. For example, a partially defined rule from a CSV file specifying "region=???" is mapped to a default condition, such as "region=global," ensuring that the policy remains enforceable. Directive management system 130 logs these errors and prompts administrative review to refine the policy further.

In some embodiments, the directive management system 130 incorporates new fields and attributes as technology and regulatory requirements evolve in the platform capability database 215 and such new data are updated to the CIR objects. For example, emerging constraints such as "IoT region=APAC⇒advanced monitoring required" can be added to the CIR schema as optional fields without disrupting existing policies. This adaptability ensures that organizations remain compliant and secure in dynamic environments. In some embodiments, the directive management system 130 enables real-time updates to CIR objects by continuously monitoring a platform capability database 215 for changes. For example, a knowledge graph update indicating "region=EU⇒stricter encryption rules" triggers an automatic update to the CIR object, ensuring policies remain aligned with the latest regulatory requirements. These updates are propagated to all relevant platforms for immediate enforcement.

In some embodiments, the directive management system 130 supports policy lifecycle management by maintaining version-controlled CIR schemas. New fields, such as "time_window=weekends" or "device. trusted_firmware=true," can be incorporated into the schema to address emerging compliance requirements or technological advancements. Older policies remain backward-compatible.

In some embodiments, the directive management system 130 facilitates governance directive enforcement by integrating compliance and domain-specific rules into CIR objects. For example, a rule from a knowledge graph such as "board_vote_required⇒CFO can finalize" may be ingested and normalized as a condition and action within the CIR framework. Similarly, compliance rules such as "region=EU⇒ attach privacy notice" are dynamically applied to ensure alignment with organizational governance standards and regulatory requirements. In some embodiments, the directive management system 130 addresses provisioning policies by automating resource creation and configuration based on CIR objects. For instance, a rule specifying "region=us_west⇒cost_center=101⇒allow dev VM provisioning" may be derived from a database and integrated into the CIR schema. This rule is then enforced during resource provisioning, ensuring that resources are created with appropriate configurations and compliance tags, such as "HIPAA" or "SOC2." In some embodiments, the directive management system 130 translates CIR objects into platform-specific policies while preserving semantic fidelity. For instance, a CIR rule specifying "region=EU⇒attach privacy notice" may be transformed into an AWS SCP directive, an Azure Policy, or a Splunk SIEM correlation rule, depending on the target platform. Directive management system 130 ensures that the translated policies retain the original compliance and governance intents, enabling seamless cross-platform integration.

In some embodiments, the directive management system 130 integrates knowledge graphs to semantically enrich CIR objects with compliance and domain-specific metadata. For example, a knowledge graph containing the relationship "HIPAA⇒extended logs for health_monitor devices" provides additional context for dynamically generating CIR fields, such as conditions specifying "device= health_monitor" and actions requiring "enable extended logging." These enriched CIR objects are enforced across target platforms to ensure regulatory compliance.

In some embodiments, in managing a platform capability database 215, the directive management system 130 may incorporate error tolerance and validation mechanisms to ensure policy integrity. Entities stored in the platform capability database 215 are validated against predefined schemas to confirm the presence and correctness of mandatory fields, such as conditions, actions, and metadata. Missing fields may be auto-generated or flagged for review. For example, if a data object lacks severity metadata, the directive management system 130 may assign a default value of "medium." Validation processes may confirm the presence and correctness of critical fields, such as conditions, actions, and metadata, while default values are assigned to missing attributes. For example, if a CIR object lacks a compliance tag, directive management system 130 assigns "ISO27001" as a default tag to ensure completeness and enforceability.

In some embodiments, the directive management system 130 incorporates real-time validation and revalidation of CIR objects to ensure alignment with the latest compliance standards and operational requirements. For example, updates to a platform capability database 215 specifying "region=EU⇒stricter encryption required" automatically trigger updates to all CIR objects referencing this condition. Directive management system 130 propagates these updates across all platforms, maintaining compliance with evolving regulatory mandates.

In some embodiments, the directive management system 130 handles platform-specific conversions for governance, provisioning, and cybersecurity policies. For example, a CIR rule specifying "region=EU⇒attach privacy notice" may be converted into platform-specific directives, such as Azure Policy definitions or Splunk SIEM correlation rules. Directive management system 130 ensures semantic fidelity during the translation process, preserving the original intent of the policy across all platforms. In some embodiments, the directive management system 130 processes machine-executable directive conversions between platforms, such as Windows-to-macOS or Splunk-to-XSIAM. For example, Windows Group Policies (GPOs) specifying "Require domain_joined=YES⇒encryption enabled" may be normalized into a CIR object and translated into macOS Mobile Device Management (MDM) profiles. Similarly, Splunk SIEM rules such as "suspicious_port_scan=true⇒isolate endpoint" may be converted into Palo Alto XSIAM playbooks for real-time enforcement.

In some embodiments, the directive management system 130 enables multi-platform directive enforcement by translating CIR objects into environment-specific configurations. For instance, a CIR rule specifying "region=us_east=>encryption=advanced" is translated into corresponding configurations for AWS, Azure, and Cisco NGFW environments. Directive management system 130 ensures that these translations maintain the original compliance and governance intents. For example, the directive management system 130 facilitates the transition from Splunk SIEM to Palo Alto XSIAM by integrating knowledge graph and external database references into the CIR framework. For instance, a Splunk SIEM rule, such as "alert if threat=HIGH and device=ICS," may be enriched with compliance metadata from a knowledge graph specifying "ICS⇒CIP compliance required." Directive management system 130 generates a CIR object incorporating these attributes and translates it into Palo Alto XSIAM rules, ensuring consistent cybersecurity enforcement.

In some embodiments, the directive management system 130 addresses multi-platform directive enforcement by resolving differences in syntax and semantics between systems. For example, a governance rule specifying "allow brand manager override during promotions" may be represented as "role=brand_manager, promo_active=true" in one platform and as "manager_override=true" in another. The directive management system 130 harmonizes these variations into a unified CIR representation, enabling consistent enforcement across all platforms.

In some embodiments, the directive management system 130 may validate CIR objects by checking the presence and accuracy of critical fields in the dataset of a platform capability database 215. For example, a CIR object specifying "region=EU⇒attach privacy notice" is validated against predefined schemas to confirm that all conditions, actions, and metadata are correctly defined. Missing fields, such as compliance tags or severity levels, are auto-generated or flagged for administrative review.

Extensible Plug-In for Modification of CIR

Figure 8:
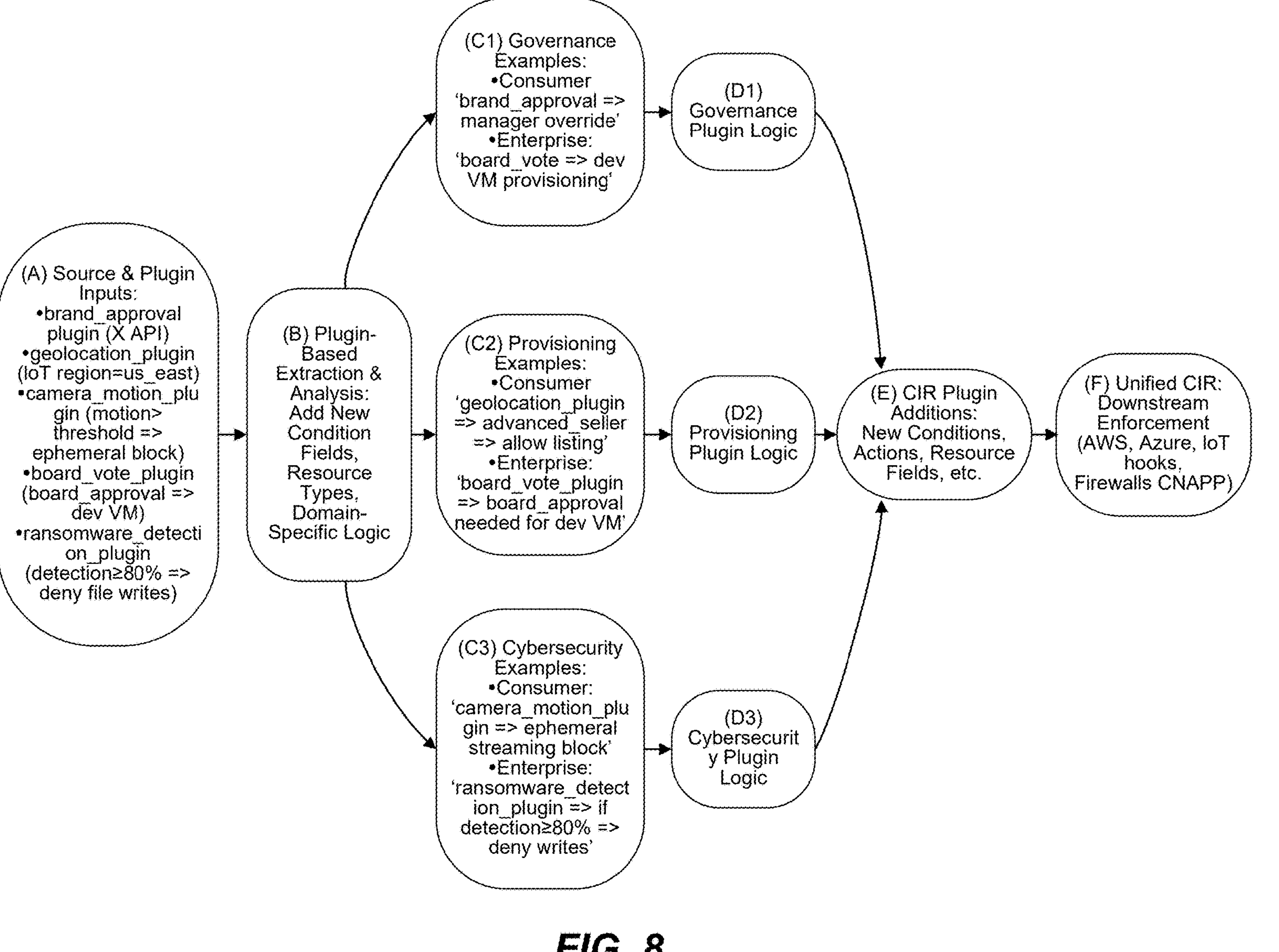
FIG. 8 is a flowchart depicting a CIR modification process using an extensible plug in provided by the directive management system, in accordance with some embodiments.

FIG. 8 is a flowchart depicting a CIR modification process using an extensible plug in provided by the directive management system 130, in accordance with some embodiments. In some embodiments, the directive management system 130 may provide an open, extensible plug-in architecture to dynamically enhance the CIR objects by enabling developers (e.g., developers from the domain 110) to add new fields, resource types, or domain-specific logic. This architecture supports dynamic extensibility, allowing new plugins to integrate into existing workflows without requiring structural redesigns. For example, a "brand_approval" plugin adds a new condition field to the CIR, enabling rules such as "brand_manager=>override social guidelines," while a "geolocation_plugin" defines IoT-specific rules, such as "IoT region=us_east=>advanced_seller=>allow listing." In some embodiments, the directive management system 130 ingests data from heterogeneous data sources to enhance CIR generation through plugins. Plugins can ingest rules from various origins, such as API integrations, light agents, or YAML configuration files. For instance, a "ransomware_detection_plugin" integrates with CNAPP feeds to enforce ephemeral policies, such as "deny file writes," in response to ransomware threats. In some embodiments, the directive management system 130 utilizes plugins to fetch rules from diverse data sources and dynamically update CIR objects. Plugins add new condition fields, resource types, or logic into the CIR. For example, a "geolocation_plugin" appends IoT-specific rules such as "IoT region=us_east=>advanced_seller=>allow listing" to the CIR schema.

In some embodiments, the directive management system 130 encapsulates domain-specific logic into modular plugins to extend CIR capabilities. For example, a "camera_motion_plugin" introduces logic such as "if motion>threshold=>ephemeral streaming block," enabling dynamic enforcement of IoT-specific security rules. This modularity allows directive management system 130 to accommodate evolving domain requirements.

In some embodiments, the directive management system 130 facilitates plugin integration through a structured workflow. Plugin registration is supported via APIs, YAML configurations, or light agents, enabling the system to detect and load new logic dynamically. For example, a "brand_approval" plugin connects to a brand management API to register compliance rules, while a "camera_motion" plugin retrieves motion data from IoT devices through light agent ingestion. Additionally, file-based parsing allows plugins such as "board_vote_plugin" to read governance rules directly from YAML files.

In some embodiments, the directive management system 130 processes plugin-based extraction and analysis, integrating new domain-specific logic or fields into the standard extraction pipeline. Plugins dynamically expand CIR components, including conditions, actions, resources, metadata, and ephemeral rules. For instance, a "brand_approval plugin" might introduce conditions such as "brand_manager=>override social guidelines," while a "ransomware_detection_plugin" adds actions such as "deny file writes."

In some embodiments, the directive management system 130 merges plugin logic into CIR plugin additions. Plugin expansions append new or extended condition fields (e.g., "time≥21:00," "detection≥80%"), resource types (e.g., IoT devices, dev VM), or ephemeral rules into the CIR framework.

In some embodiments, the directive management system 130 translates updated CIR objects into actionable policies for real-time enforcement. For example, a plugin such as "ransomware_detection_plugin" integrates ephemeral rules such as "deny file writes" into CIR fields, which are then translated into configurations for multi-cloud environments or IoT devices. Similarly, provisioning rules derived from a "board_vote_plugin" are enforced to ensure governance compliance. In some embodiments, the directive management system 130 produces a unified CIR containing baseline rules and ephemeral expansions. The finalized CIR is translated or enforced across various platforms or hooking layers, such as AWS, Azure, CNAPP, or IoT environments.

In some embodiments, the directive management system 130 applies the open, extensible plug-in architecture through governance, provisioning, and cybersecurity examples across consumer and enterprise applications. For governance, consumer policies such as "brand_approval plugin=>brand_manager can override social guidelines" are dynamically integrated into CIR using data fetched from an API plugin. The directive management system 130 enables ephemeral policies, such as brand-specific overrides, to be seamlessly incorporated. In enterprise scenarios, the "board_vote_plugin=>board_approval needed for dev VM provisioning" dynamically processes YAML configurations to define governance rules within the CIR framework.

In some embodiments, the directive management system 130 applies the plug-in architecture to provisioning policies. For consumer use cases, the "geolocation_plugin=>IoT region=us_east=>advanced_seller=>allow listing" dynamically integrates region-based provisioning rules into CIR using plugin logic. In enterprise environments, the "board_vote_plugin=>board_approval needed for provisioning" automates governance checks without requiring hardcoded rules, enhancing operational efficiency.

In some embodiments, the directive management system 130 dynamically enforces cybersecurity policies through plug-in integration. For consumer applications, the "camera_motion_plugin=>if motion>threshold=>ephemeral streaming block" uses IoT camera light agent feeds to retrieve motion data and integrates ephemeral policies into CIR for real-time enforcement. In enterprise settings, the "ransomware_detection_plugin=>if detection≥80%=>deny file writes" leverages CNAPP analysis to enforce ephemeral policies in real time, ensuring robust protection against threats.

ML Based Policy Clustering

Figure 9:
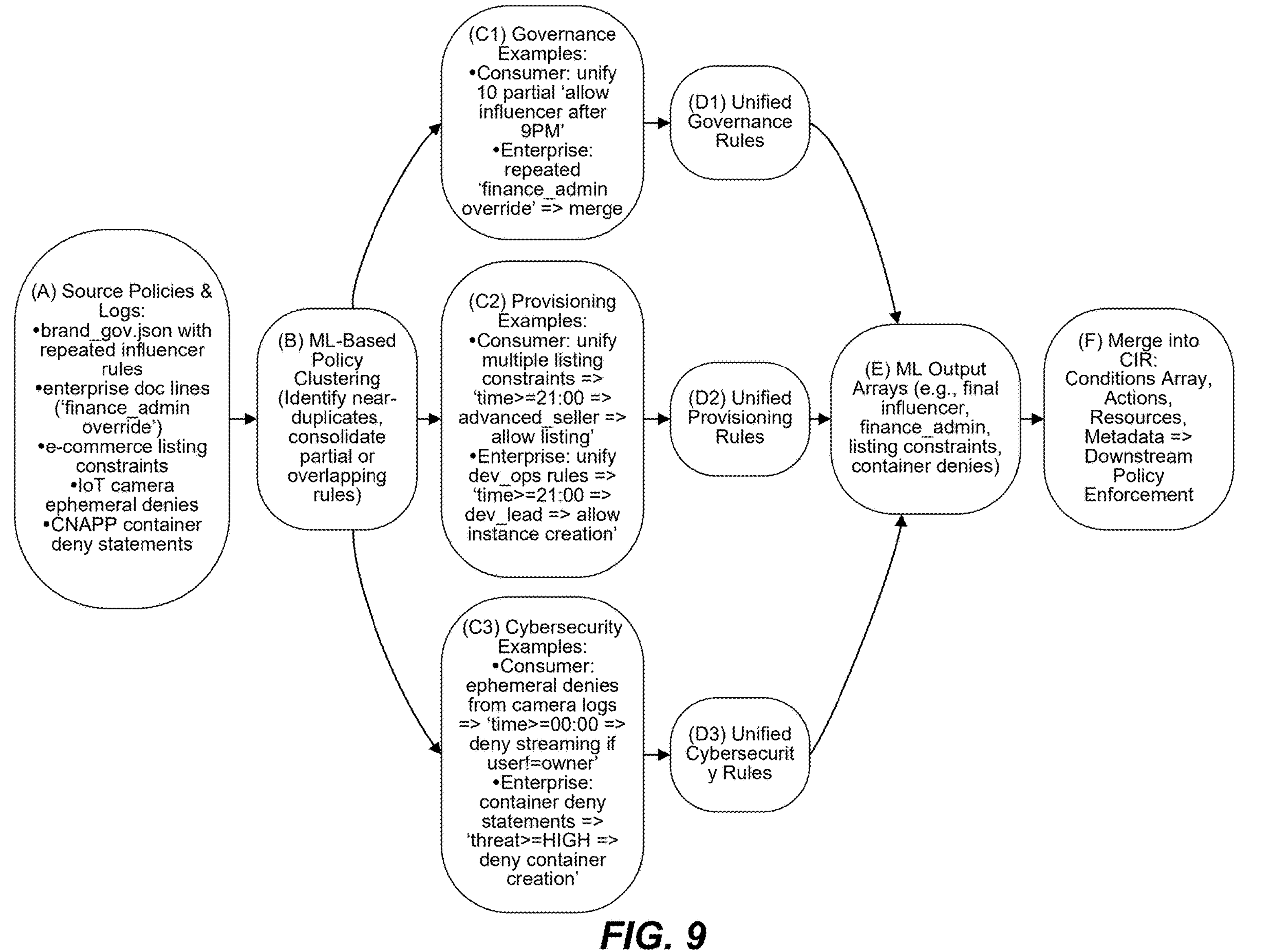
FIG. 9 is a flowchart depicting a machine-learning based policy clustering process performed by the directive management system, in accordance with some embodiments.

FIG. 9 is a flowchart depicting a machine-learning based policy clustering process performed by the directive management system 130, in accordance with some embodiments. In some embodiments, the directive management system 130 leverages machine learning (ML) algorithms to identify, cluster, and consolidate near-duplicate or overlapping compliance rules into unified policies. In some embodiments, the directive management system 130 employs supervised or unsupervised machine learning models, such as K-means or hierarchical clustering, to detect and unify near-duplicate compliance rules into consolidated policies. Unlike traditional rule-based enforcement systems, which treat each policy independently, this invention applies ML clustering to automate policy consolidation.

In some embodiments, the directive management system 130 employs semantic analysis to evaluate textual similarities, conditions, and metadata across rules. For example, ML models detect overlaps in policy intent, even when expressed in varied formats, such as "allow influencer after 9 PM" in JSON files versus "time>=21:00=>verified_influencer=>allow post" in YAML configurations. In some embodiments, the directive management system 130 applies context-aware consolidation to ensure that unified policies respect the intent of the original rules while optimizing their structure for enforcement. For example, repeated provisioning constraints across multi-cloud environments, such as "time≥21:00=>dev_lead=>allow instance creation" in GCP and AWS, are clustered into a single policy. This consolidation reduces duplication and facilitates seamless enforcement across platforms.

In some embodiments, the directive management system 130 optimizes cybersecurity directive enforcement by clustering ephemeral deny statements into unified policies. For instance, ephemeral rules such as "threat≥HIGH=>deny container creation" across multiple environments are consolidated into a single CIR object, improving the efficiency of dynamic directive enforcement while reducing operational complexity.

The directive management system 130 may follow a structured workflow that begins with feature extraction, where rule components are analyzed to identify conditions, actions, and metadata. The process may begin with source policies and logs, where raw rules are collected from diverse inputs. Examples include a brand_gov. json file containing repeated entries such as "allow influencer after 9 PM," an enterprise document with scattered rules such as "finance_admin=>override," e-commerce listing constraints, IoT camera ephemeral denies, and CNAPP logs with container deny statements. Conditions, such as "time≥21:00" or "user!=owner," are extracted as triggers for policies, while actions such as "deny," "allow," or "alert" are identified as enforcement outcomes. Metadata, including severity levels and compliance tags, provides contextual information to guide the clustering process.

In some embodiments, the directive management system 130 applies clustering techniques to optimize provisioning policies. For consumer applications, e-commerce constraints are unified into a policy such as "time>=21:00=>advanced_seller=>allow listing," ensuring streamlined enforcement across platforms. In enterprise environments, repeated DevOps rules across AWS and GCP are consolidated into a unified CIR policy, enabling cross-cloud compliance and reducing operational complexity.

The directive management system 130 calculates similarity metrics using methods such as cosine similarity or the Jaccard index to compare rules. Rules exceeding a predefined similarity threshold, such as greater than 90%, are clustered into unified policies. For example, fragmented ephemeral denies extracted from camera logs are unified into a single policy, such as "time>=00:00=>deny streaming if user!=owner," ensuring that the original intent of the rules is preserved while reducing redundancy. This context-aware consolidation enables efficient directive management and enforcement across diverse domains.

The clustered outputs are transformed into ML output arrays, where unified policies such as "time>=21:00=>advanced_seller=>allow listing" or "threat>=HIGH=>deny container creation" are represented in structured formats. These arrays feed into the CIR pipeline, ensuring compatibility with downstream enforcement systems. Directive management system 130 integrates these ML output arrays with existing CIR fields, including conditions, actions, resources, and metadata, creating fully consolidated policies for governance, provisioning, or cybersecurity enforcement. This final step ensures that repeated or partial instructions from various logs and files are unified into comprehensive rule sets within the CIR, reducing duplication, simplifying policy structures, and optimizing downstream enforcement processes. Machine learning-based policy clustering thus provides a scalable and efficient method to manage complex, overlapping directive data.

The directive management system 130 applies the ML clustering approach to different areas. In governance, fragmented rules such as "allow influencer after 9 PM," spread across multiple JSON entries, are unified into a single CIR policy, such as "time>=21:00=>influencer=>allow." For provisioning, repeated constraints across multi-cloud environments, such as AWS and GCP, are clustered into a unified rule, such as "time≥21:00=>dev_lead=>allow instance creation." In cybersecurity, ephemeral deny statements from CNAPP logs, such as "threat≥HIGH=>deny container creation," are consolidated into a single CIR field for streamlined enforcement. By leveraging ML-based clustering, directive management system 130 reduces duplication, ensures consistency, and optimizes directive enforcement across governance, provisioning, and cybersecurity areas.

In some embodiments, the directive management system 130 enhances cybersecurity directive management by consolidating ephemeral rules into actionable CIR objects. For consumer IoT applications, policies such as camera denies are clustered into a unified rule: "time>=00:00=>deny streaming if user!=owner," simplifying ephemeral directive enforcement and improving efficiency. In enterprise contexts, CNAPP logs containing repeated deny statements, such as "threat≥HIGH=>deny container creation," are consolidated into a single CIR policy, improving response times and ensuring robust enforcement across dynamic environments. By clustering and unifying rules, directive management system 130 reduces redundancy, enhances scalability, and ensures consistent directive enforcement across governance, provisioning, and cybersecurity areas.

Conflict Resolution

Figure 10:
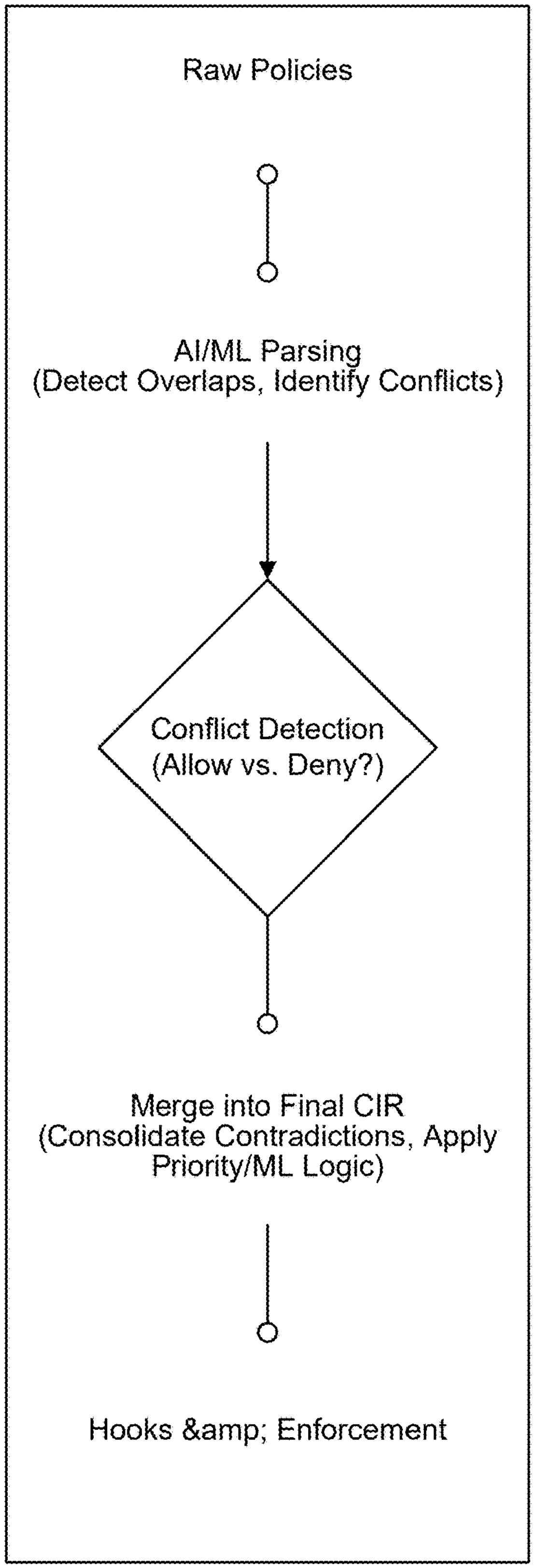
FIG. 10 is a flowchart depicting a conflict resolution technique, in accordance with some embodiments.

FIG. 10 is a flowchart depicting a conflict resolution technique, in accordance with some embodiments. In some embodiments, the directive management system 130 employs conflict resolution techniques to handle contradictory rules across governance, provisioning, and cybersecurity areas. For governance, scenarios such as transitions from Facebook to X.com or Windows to macOS involve conflicting directives such as "Deny brand override after 21:00" versus "Allow manager override any time." The directive management system 130 resolves these contradictions using machine learning-based clustering, priority logic, or a "most restrictive" approach. For example, the final unified machine readable directive might state, "time≥21:00=>manager=>deny except if brand_promo=active."

In provisioning contexts, such as transitions from AWS to Azure or Splunk to Palo Alto XSIAM, contradictory policies such as "Allow dev VM creation if user=dev_ops" versus "Deny after 9 PM" are resolved by integrating time-based and role-based constraints. Directive management system 130 refines these rules into a consolidated CIR statement, such as "time≥21:00=>dev_lead=>allow dev VM creation," balancing user roles and time restrictions to ensure seamless cross-platform provisioning compliance.

In cybersecurity, transitions between platforms such as Cisco NGFW Zero Trust and Palo Alto NGFW Zero Trust present conflicts such as "Deny container creation if threat≥HIGH" versus "Allow cloud_admin override=>ephemeral synergy." Directive management system 130 incorporates a conflict resolution engine that evaluates ephemeral overrides within the context of a zero-trust baseline. The resulting policy might state, "If threat≥HIGH, deny unless user=cloud_admin AND ephemeral override=active."

By employing conflict resolution mechanisms, the directive management system 130 reconciles contradictory rules and dynamically refines CIR objects to provide unified, enforceable policies across diverse operational domains.

In some embodiments, the directive management system 130 processes raw policies originating from platforms such as Facebook, AWS, or Cisco NGFW through AI or ML modules to generate unified and enforceable policies. Initially, raw policies are parsed to extract rules and identify potential conflicts. For example, conflicting directives such as "allow resource" versus "deny resource" are detected by the directive management system 130 during this analysis phase.

After conflicts are identified, directive management system 130 may employ conflict resolution techniques to reconcile these contradictions. The directive management system 130 uses machine learning-based clustering, priority logic, or domain-specific rules to merge conflicting directives into a unified policy. The resulting policy is represented as a final CIR object, which includes conditions, actions, resources, and metadata that harmonize the original intent of the conflicting rules.

In some embodiments, the directive management system 130 incorporates a conflict resolution step to address challenges that arise during the migration of governance, provisioning, or cybersecurity policies from one platform to another, such as Splunk SIEM to Palo Alto XSIAM or Windows GPO to mac MDM.

Conflicts frequently occur when multiple sources or overlapping policies are merged. For instance, an organization consolidating rules from two sources, such as a Network Access Control (NAC) system and an on-premises Windows GPO, may encounter contradictory statements such as "allow access to resource" versus "deny access to resource." Similarly, even within a single platform such as AWS IAM or Cisco firewall rule sets, different policy documents can specify conflicting rules, such as "port 22 allow" versus "port 22 deny." Without resolving these contradictions, the resulting policies may become incoherent or unenforceable.

The directive management system 130 may perform conflict resolution based on target platform requirements. When migrating policies to environments such as Azure, Palo Alto, macOS, or X.com, the target platform might reject contradictory statements governing the same resource or condition. The directive management system 130 may preserve the original intent of the source policies while merging the policies. Directive management system 130 uses algorithms to reconcile contradictory outcomes for the same resource or time condition. For example, if two policy sets govern "access to resource X at time≥21:00" with differing outcomes, the directive management system 130 merges them into a single, coherent policy that reflects organizational priorities and operational rules, avoiding unpredictable behavior in the target platform.

In some embodiments, the directive management system 130 addresses conflicts during migration by unifying contradictory rules from multiple sources into a single, enforceable policy for the target environment. For example, consider a scenario where a Network Access Control (NAC) system specifies, "If device. encryption=false, deny network access," and a Windows Group Policy Object (GPO) states, "If user. domain_joined=true, always allow network access." When migrating these rules to a mac-based Mobile Device Management (MDM) or Zero Trust aggregator that requires a unified statement for "network access," contradictions arise if a domain-joined device is unencrypted. The NAC policy dictates "deny," while the GPO policy specifies "allow."

The directive management system 130 converts both rules into CIR objects: the NAC rule becomes '{"device. encryption"=false=>actions=["deny"]}' and the GPO rule becomes '{"user. domain_joined"=true=>actions=["allow"]}'. To resolve the contradiction, the directive management system 130 employs strategies such as priority-based logic, where the NAC rule is given precedence, resulting in "deny." The most restrictive approach also yields "deny"; or a merged policy with exceptions, such as "If encryption=false=>deny unless user in exceptionGroup=trustedAdmins." The final unified CIR record eliminates the conflict and is pushed to the MDM for enforcement.

In some embodiments, conflict resolution may be minimal or unnecessary in straightforward migration scenarios. For instance, when migrating from one internally consistent source to a single target, such as Cisco NGFW zero-trust rules to Palo Alto NGFW, the system detects no overlaps, requiring only direct translation. Similarly, if the source policies are already conflict-free, the system performs a simple 1:1 conversion. Even in these cases, directive management system 130 performs conflict detection to ensure robustness.

In some embodiments, the directive management system 130 also supports optional or combined conflict resolution steps. For instance, users can specify that all policies are conflict-free, allowing a pass-through conversion without merges. Alternatively, the conflict resolution step can be combined with validation to ensure the target environment accepts the unified rules without internal contradictions.

Runtime CIR Policy Injection

In some embodiments, the directive management system 130 implements runtime enforcement hooks and policy injection to enable the immediate insertion and enforcement of ephemeral, time-based, or conflict-resolved policy rules within a target system. This runtime approach facilitates instant policy updates for governance, provisioning, and cybersecurity across diverse consumer and enterprise domains 110. The policy injection may apply to various situation such as social media pipelines (e.g., Facebook to X.com), cloud provisioning environments (e.g., AWS to Azure), SIEM/SOAR platforms (e.g., Splunk to Palo Alto XSIAM), zero-trust firewalls (e.g., Cisco NGFW to Palo Alto NGFW), and operating system security frameworks (e.g., Windows to macOS). Runtime enforcement ensures seamless integration of new policies without requiring system downtime or redeployment.

In some embodiments, the directive management system 130 achieves key runtime goals by intercepting user actions or resource creation calls before finalization. For instance, the directive management system 130 can intercept a brand manager attempting to post after 10 PM on X.com, a DevOps engineer spinning up a container in Azure, or a Windows endpoint requesting privileged actions. The directive management system 130 checks these actions against the ephemeral and conflict-free rules stored in the CIR and determines real-time outcomes such as "Allow," "Deny," "Override," or "Remediate" based on ephemeral constraints.

In some embodiments, the technical logic of runtime enforcement includes hooking mechanisms and policy injection. Hooks are embedded into the normal request flow of the directive management system 130 to intercept requests before completion. Examples include a Facebook or X.com plugin intercepting post creation to enforce rules such as "verified_influencer=>allow after 10 PM," Kubernetes admission controllers intercepting "create Pod" requests to apply rules such as "deny devOps after 21:00," and NGFW agents on Cisco or Palo Alto firewalls intercepting inbound traffic to enforce constraints such as "deny if threat≥HIGH." Additionally, endpoint hooks on Windows or macOS enforce ephemeral checks, such as verifying patch compliance or maintaining zero-trust posture. These hooks operate without requiring manual intervention or daily script execution.

In some embodiments, policy injection dynamically loads ephemeral constraints at runtime, eliminating the need for system restarts. Injection methods include API calls, such as sending a POST request to add rules such as "deny devOps after 9 PM," light agents installed on operating systems or IoT gateways to retrieve ephemeral JSON policy snippets, and file-based methods that allow partial config files to be reloaded by the hooking engine on demand.

In some embodiments, ephemeral rules are represented in the CIR with fields that define their behavior and lifecycle. These fields may include attributes such as "ephemeral": true to indicate the rule's temporary nature, "priority": 5 to ensure the rule overshadows baseline policies when applicable, and "time_to_live": "2025-01-01T00:00:00Z" to specify the rule's expiration time. These attributes allow the system to enforce temporary rules effectively while maintaining the integrity and consistency of the overall policy framework.

In some embodiments, the directive management system 130 executes runtime enforcement through a series of core operational steps to handle conflict-resolved CIR objects, inject ephemeral rules, and dynamically intercept and enforce policies at runtime. The process begins with the creation of a conflict-resolved CIR object, where raw policy definitions from various sources—such as Facebook to X.com or Cisco to Palo Alto zero-trust systems—are merged into a unified, final CIR object. This CIR object incorporates ephemeral rules, which are designed to be short-lived and context-specific. For example, an ephemeral rule might include the following:

Json code

```
{
"policy_id": "EPHEM99",
"conditions": [
  {"time_of_day": ">=21:00"},
  {"user.role": "devOps"}
],
"actions": ["deny"],
"metadata": {
  "ephemeral": true,
  "priority": 4
  }
}
```

After the CIR object is stored, the ephemeral rules are injected into the runtime environment using the target system's hooking module. These hooks, such as a LinkedIn plugin, Kubernetes webhook, SIEM agent, or NGFW agent, fetch ephemeral rules from the CIR store. Injection methods vary and may include API calls to retrieve the latest ephemeral constraints or a light agent approach that caches ephemeral statements in memory.

During runtime interception, the hooking function evaluates user or system actions against the ephemeral rules. For example, when a user attempts to create an X.com post after 9 PM, provision a virtual machine in Azure, or configure a firewall rule, the hooking function invokes the 'checkEphemeral(cir.ephemeral, context)' method. If the ephemeral logic matches the action's context, the hook returns a decision such as "deny" or "override." If no ephemeral rules apply, the directive management system 130 defaults to enforcing baseline rules.

The directive management system 130 also supports optional removal or expiry of ephemeral rules. Rules with defined expiration times or short-lived windows—such as a 2-hour brand override sale or a 1-day CFO patch exception—are automatically deactivated once their validity period ends. After the rules are expired, the hooking module ceases to enforce these rules, reverting to baseline policies.

In some embodiments, the directive management system 130 delivers more than a static policy statement by enabling deep technical integration, instant enforcement, and cross-domain consistency through runtime hooks and ephemeral policy injection. The directive management system 130 modifies how runtime events—such as social media posts, provisioning calls, firewall traffic, or OS actions—are handled in real-time by embedding hooks directly into official intercept APIs. For example, X.com's plugin system, Kubernetes admission webhooks, SIEM agent triggers, and OS-based security hooks on Windows or macOS allow the directive management system 130 to intercept and act on events without altering baseline workflows.

The ephemeral injection mechanism enables instant and dynamic updates to policies, eliminating the need to redeploy pipelines or wait for scheduled scripts. For instance, a brand manager override on X.com can be made live within minutes, ensuring time-sensitive content is posted during a promotional window. Similarly, a DevOps block for actions after 9 PM can be enforced instantly across environments transitioning from AWS to Azure, ensuring real-time alignment with organizational policies.

This approach ensures cross-domain consistency by applying the ephemeral hooking concept universally across consumer and enterprise domains. Whether enforcing governance rules for social media, provisioning constraints for IoT or e-commerce platforms, or security policies for multi-cloud or zero-trust firewalls, the directive management system 130 adapts with minimal domain-specific code changes. The ability to operate seamlessly across diverse pipelines highlights the flexibility and scalability of the system, making it a robust solution for dynamic and real-time directive enforcement.

In some embodiments, the directive management system 130 demonstrates the flexibility and scalability of runtime hooks and ephemeral policy injection through detailed governance, provisioning, and cybersecurity use cases across consumer and enterprise domains 110.

In governance, consumer applications include ephemeral rules such as "verified_influencer=>post after 10 PM," enforced during Facebook to X.com transitions. The hooking function checks if the current time is after 10 PM and allows the post accordingly. Another example involves transitioning from Windows to macOS, where an ephemeral rule specifies "manager=>override system settings after 21:00." The system hooks into macOS user management APIs, ensuring compliance with the ephemeral rule. In enterprise settings, ephemeral rules such as "CFO=>override budgets" in a Splunk SIEM to Palo Alto XSIAM migration take precedence over baseline rules such as "board_vote." The hooking function evaluates the user role and enforces the higher-priority ephemeral rule. Similarly, in an AWS to Azure migration, an ephemeral rule such as "time≥22:00=>dev_ops=>deny new container creation" hooks directly into the Azure container registry pipeline to enforce restrictions.

In provisioning, consumer scenarios include IoT e-commerce ephemeral rules such as "time≥21:00=>advanced_seller=>listing creation," where the gateway denies normal sellers the ability to create listings after 9 PM. Another example involves enforcing "deny new user creation after midnight unless user=IT_admin" during a Windows to macOS migration, with hooks intercepting OS user-management requests. Enterprise use cases include Kubernetes ephemeral rules such as "deny devOps after 21:00," where admission controllers return "Denied" during runtime checks. In a Cisco NGFW to Palo Alto NGFW migration, ephemeral rules such as "if region=eu=>ephemeral block inbound for certain hours" hook into the firewall's real-time traffic routing system to enforce regional constraints.

In cybersecurity, consumer use cases include X API ephemeral rules such as "threat≥HIGH=>block streaming" for camera feeds, where the hooking function enforces the ephemeral rule over baseline policies. Another example during Facebook to X.com transitions involves ephemeral rules such as "only brand_admin=>edit brand post if suspicious=true," with hooks intercepting and evaluating the post creation flow. Enterprise applications include CNAPP agent ephemeral rules such as "patch_conf block VM creation," where runtime hooks enforce compliance based on patch confidence levels. Another example involves ephemeral rules during Splunk to Palo Alto XSIAM transitions, such as "threat≥HIGH=>ephemeral deny firewall changes," where the hooking function references SIEM feeds to enforce real-time policy updates.

Human-in-the-Loop Deployment

In some embodiments, the directive management system 130 integrates hybrid human-AI review loops to enhance policy generation and enforcement by combining AI-driven proposals with human oversight in real time. These loops allow ephemeral or baseline policy rules to be refined across consumer contexts, such as Facebook to X.com migrations or Windows user flows, and enterprise contexts, such as AWS to Azure transitions, Splunk SIEM to Palo Alto XSIAM integrations, or Cisco NGFW Zero Trust to Palo Alto NGFW Zero Trust implementations. The directive management system 130 unifies ephemeral merges or expansions with existing baseline rules, ensuring robust directive enforcement across social media environments, multi-cloud infrastructures, SIEM/SOAR platforms, next-generation firewalls, or operating system migrations.

In some embodiments, the directive management system 130 begins by linking AI-generated suggestions to the normalized CIR. After normalizing policies in the CIR pipeline, the directive management system 130 scans logs and repeated misconfiguration events to identify candidates for new baseline or ephemeral rules. For consumer pipelines, such as Facebook to X.com post-scheduling or Windows-to-Mac domain rules, the system might detect triggers such as repeated "deny" events on an IoT gateway after 9 PM. Similarly, in enterprise pipelines such as AWS-to-Azure or Splunk-to-Palo Alto XSIAM, frequent misconfigurations after 10 PM in multi-cloud environments could signal the need for a new policy.

Using machine learning models, directive management system 130 generates proposed rules based on detected patterns. These rules may involve time-based blocks, role-based constraints, or zero-trust posture checks. For example, the system might suggest a rule such as "time≥21:00 & user.role=devOps=>deny container creation" if repeated misconfiguration events exceed a threshold, or "threat≥HIGH=>block streaming unless user=owner" in a Facebook-to-X e-commerce scenario. Proposed rules are stored in the CIR as "draft" rules and are not immediately merged into the conflict-resolved policy set.

To facilitate human review, directive management system 130 attaches confidence scores and rationales to each proposed rule. For instance, an ephemeral rule might include metadata such as 'confidence=0.87' and 'rationale="Frequent devOps errors after 21:00."' These annotations help administrators evaluate the validity and relevance of the AI-generated suggestions. Administrators can confirm, reject, or modify proposed rules before they are activated, ensuring that new policies align with organizational priorities and operational contexts.

In some embodiments, the directive management system 130 provides a human review interface (e.g., a panel) to enable administrators to evaluate and manage AI-generated policy proposals as a way to perform human-in-the-loop reviews. This interface allows users to review ephemeral and baseline policy changes, along with AI rationales and confidence scores, ensuring human oversight over directive enforcement decisions.

In consumer contexts, the human review interface might support scenarios such as Facebook to X.com migrations, where a brand admin UI displays "Proposed AI Policy Changes" regarding user roles. For instance, a suggestion such as "verified_influencer can cross-post after 10 PM" includes a confidence score and an explanation for the proposed rule. During Windows-to-Mac migrations, the human review interface might present ephemeral rules such as "deny certain Windows-to-Mac policy exceptions after 20:00" in response to repeated failures, providing administrators with a rationale for these recommendations.

In enterprise contexts, the human review interface integrates with systems such as AWS to Azure pipelines, where a DevOps dashboard might display ephemeral proposals such as "region=us_east=>deny new VM after midnight." For Splunk SIEM/SOAR to Palo Alto XSIAM transitions, security admins might see proposed rules such as "block firewall changes after 20:00 if user=junior_admin." Similarly, in Cisco NGFW Zero Trust to Palo NGFW Zero Trust environments, the human review interface could suggest ephemeral rules such as "time≥21:00=>DMZ inbound deny." Administrators can refine, approve, or reject these proposals based on organizational priorities and operational contexts.

The human review interface provides mechanics for approving or rejecting proposed rules. Each draft ephemeral or baseline rule is presented with options such as "+Add to final CIR" or "Reject." When a rule is approved, the approved rule is injected into the conflict resolution process to ensure the rule integrates seamlessly with existing CIR policies. Administrators can also modify proposed rules before approving them to better align with their organization's requirements.

The directive management system 130 supports immediate or scheduled adoption of approved rules. Domains 110 requiring real-time enforcement can opt for on-the-spot ephemeral injection, allowing instant updates to runtime policies. Alternatively, domains 110 preferring batch updates can queue approved rules for nightly merges, enabling structured and controlled policy updates. This flexibility ensures the directive management system 130 accommodates both real-time and scheduled operational needs, making directive management system 130 adaptable to a variety of deployment strategies and organizational workflows.

In some embodiments, the directive management system 130 enables real-time hooking updates to enforce ephemeral rules immediately upon approval, ensuring dynamic and responsive directive management across consumer and enterprise contexts. For instance, in a consumer scenario, a brand admin in a Facebook-to-X.com migration environment may approve a rule such as "deny cross-post streaming if user≠owner after 22:00." Once approved, the hooking code or plugin in X.com receives an ephemeral rule, represented as '{time≥22:00, user≠owner=>deny streaming, priority=4, ephemeral=true}'. This ephemeral rule may be instantly applied, and any cross-post streaming attempts by non-owners after 10 PM are blocked in real time.

In an enterprise scenario, a DevOps admin in an AWS-to-Azure pipeline might review and approve an AI-suggested rule such as "deny container creation after 21:00." This ephemeral rule is then merged with an existing baseline rule such as "dev_ops=>allow container." Since ephemeral rules have a higher priority, the hooking code on the Azure side, or within a multi-cloud admission controller, immediately enforces the rule as "deny after 21:00." This ensures that the ephemeral constraints take precedence, adapting directive enforcement to dynamic operational needs.

The directive management system 130 also incorporates robust logging and auditing mechanisms to maintain transparency and traceability. Each admin decision, whether an approval or rejection, is timestamped, hashed, and stored in a ledger for compliance purposes. For example, a log entry might state, "CFO ephemeral override rule accepted at 19:15," appearing in Splunk or Palo XSIAM logs. This detailed audit trail ensures accountability and provides an authoritative record for compliance reviews.

The directive management system 130 supports version control for ephemeral merges, allowing changes to be tracked and reverted if necessary. If the pipeline employs Git or a blockchain ledger, ephemeral rule merges become commits with unique identifiers, such as 'commit #abc ephemeral rule: time≥22:00=>block inbound DMZ from Cisco NGFW to Palo NGFW.' Real-time merges are thus fully traceable, enabling admins to monitor, audit, and, if required, roll back ephemeral policy updates with precision.

In some embodiments, the hybrid human-AI review has specific use cases in governance, provisioning, and cybersecurity.

In governance, an enterprise CFO override scenario illustrates the system's capabilities. AI detects repeated ephemeral CFO overrides in AWS or Azure budgeting and proposes a baseline rule, such as "CFO=>auto-override after 6 PM." A security admin in Palo XSIAM or a DevOps pipeline console reviews the suggestion as "Proposed ephemeral CFO override," accepts it, and the system merges the ephemeral rule with baseline logic. The hooking code then enforces this rule, allowing CFOs to skip board votes for budget approvals after 6 PM.

In provisioning, a consumer-focused example involves a Facebook-to-X e-commerce pipeline noticing repeated listing failures for standard_sellers after 9 PM. AI suggests an ephemeral rule such as "time≥21:00=>advanced_seller only." A brand admin reviews and approves the suggestion, and within moments, the hooking code updates to enforce "deny standard_seller after 21:00," ensuring only advanced_sellers can create listings during this timeframe. This avoids manual configuration and ensures real-time enforcement of dynamic rules.

In cybersecurity, the directive management system 130 addresses high-risk logs or misconfigurations in a zero-trust firewall context. For example, repeated logs from Cisco NGFW or a Windows-to-Mac migration might prompt AI to propose an ephemeral rule such as "deny firewall changes after 20:00 if user !=net_admin." A security admin using Splunk or Palo XSIAM reviews and accepts the rule. The ephemeral policy is merged into the CIR, and the hooking code denies firewall changes from junior admins after 8 PM, ensuring secure and controlled access.

By integrating an AI suggestion engine, human-admin confirmation loops, and real-time hooking updates, the directive management system 130 addresses critical technical needs across diverse domains 110. The system tangibly modifies hooking code and ephemeral merges for consumer contexts such as Facebook-to-X.com or Windows-to-Mac, and enterprise contexts such as AWS-to-Azure, Splunk-to-Palo XSIAM, or Cisco-to-Palo NGFW. The directive management system 130 provides ability to instantly propose ephemeral or baseline rules, have them reviewed by humans, and auto-inject them into hooking modules. This unifies ephemeral expansions with baseline logic at scale, providing near-instant enforcement across governance, provisioning, and cybersecurity pipelines.

Predictive Policy

In some embodiments, the directive management system 130 may implement a predictive policy adjustment to proactively enforce governance, provisioning, and cybersecurity rules by monitoring recurring policy failures or overrides and dynamically generating corrective rules. This predictive policy feature may be applied across consumer contexts, such as Facebook-to-X.com or Windows-to-Mac migrations, and enterprise contexts, such as AWS-to-Azure transitions, Splunk SIEM to Palo Alto XSIAM integrations, or Cisco NGFW to Palo NGFW Zero Trust environments. The directive management system 130 adjusts policies either by inserting ephemeral rules that temporarily overshadow existing baseline rules or by permanently refining the baseline to prevent future failures.

The directive management system 130 may use data gathering and ML analysis to form the foundation of predictive policy adjustments. Each time a policy hooking function denies a request or logs an override—such as a brand manager rule violation on X.com, DevOps misconfigurations in AWS-to-Azure pipelines, or ephemeral blocks triggered in a Cisco Zero-Trust DMZ—the system records the event. A machine learning or analytics module monitors these logs for patterns of recurring failures. For example, the directive management system 130 might detect "brand manager overrides failing at night on X.com," "repeated CFO misapprovals in Azure," or "Cisco NGFW ephemeral blocks frequently triggered after 9 PM." When a predefined threshold is exceeded, such as five repeated failures within a specific timeframe, the directive management system 130 proposes or auto-applies a predictive rule to address the pattern.

The directive management system 130 may automatically generate rules based on the identified patterns. For instance, if Facebook-to-X brand manager overrides fail repeatedly at night, the directive management system 130 might generate a rule such as "After 9 PM=>only brand_admin can override social guidelines." In another example, if DevOps misconfigurations in an AWS-to-Azure pipeline exceed ten in a month, the system might create the rule "deny dev_ops after 21:00 unless patch≥80%." These rules can either overshadow the baseline temporarily as ephemeral rules or permanently refine the baseline policy. Hooking modules, whether for X.com, Azure, or NGFW platforms, enforce the rules in real time or during the next synchronization cycle if operating offline.

To ensure smooth integration, the directive management system 130 may resolve conflicts and inserts the predictive rule into the CIR. If the rule is ephemeral, the rule may temporarily take precedence over the baseline, enforcing constraints for a limited period. If the directive management system 130 identifies the pattern as persistent, the rule is integrated into the baseline, providing a permanent solution. Hooking modules, such as those in Windows devices or Cisco NGFW systems, are updated immediately to apply the new rule.

This proactive enforcement mechanism minimizes downtime, prevents repeated failures, and ensures that policy adjustments align with evolving operational contexts. By dynamically responding to patterns of policy failure, directive management system 130 enhances governance, provisioning, and cybersecurity pipelines with predictive, adaptive, and context-aware enforcement.

In some embodiments, the directive management system 130 implements predictive policy adjustments to address repeated failures in governance scenarios by dynamically tightening rules based on historical data.

For example, in some embodiments, predictive policy adjustments may be applied to a consumer scenario, such as in a situation of brand manager overriding failing on Facebook-to-X.com transition. Suppose brand managers repeatedly fail to override e-commerce or social-posting guidelines between 9-10 PM in a pipeline bridging Facebook rules to X.com post-scheduling. Machine learning analytics detect a pattern of "8 failures in the last 14 days after 9 PM," indicating a need for stricter controls. The directive management system 130 automatically generates a predictive adjustment: "time≥21:00=>only brand_admin=>override brand guidelines." This ephemeral rule overshadows the baseline policy, which allowed "brand_manager=>override after 10 PM," as repeated failures suggest brand managers require tighter restrictions.

The technical enforcement involves the hooking function within the X.com social media plugin (or a Windows-to-Mac bridging module) fetching the updated final CIR. At 9 PM, only the brand_admin role is recognized for guideline overrides. If a brand manager attempts an override at 9:05 PM, the hooking code denies the request or logs it as a policy violation. The directive management system 130 may auto-detect repeated override issues and dynamically enforce stricter policies in real time.

In some embodiments, predictive policy adjustments may be applied to an enterprise scenario, such as a CFO's approvals failing in AWS-to-Azure transition. In an enterprise setting, CFO overrides frequently fail between 7-8 PM during multi-cloud budget expansions, indicating a potential conflict with an internal board_vote_required policy. The directive management system 130 logs "10 CFO override failures last month after 7 PM," highlighting the need for stricter controls. In response, the predictive engine generates a new rule: "time≥19:00=>only finance_admin=>final approval." This ephemeral rule takes precedence over the baseline, which allowed "CFO can override any time." The hooking function—whether in a Splunk SIEM module or a Mac-based admin console—references the updated CIR to enforce the stricter policy.

When the CFO attempts an override at 7:15 PM the following day, the hooking code denies the request because the predictive rule now governs the approval process. This adjustment eliminates reliance on manual patches or daily scheduled updates, ensuring that stricter gating mechanisms are automatically applied under repeated fail conditions.

In some embodiments, the predictive policy adjustments, the directive management system 130 proactively dynamically enforces stricter rules to reduce misconfigurations. By analyzing historical patterns and applying real-time enforcement, the directive management system 130 minimizes operational disruptions across consumer and enterprise environments.

For example, in a consumer scenario, such as failures in Windows-to-Mac e-commerce environment, advanced_sellers may repeatedly misconfigure listings at night. The directive management system 130 logs a pattern such as "time≥21:00=>advanced_seller=>12 misconfigs" within a specified timeframe. Machine learning detects that advanced_sellers are prone to errors after 9 PM, prompting the system to generate a predictive rule: "deny all new listings after 21:00 unless user.role=brand_manager." This ephemeral rule overshadows the baseline "allow advanced_seller 24/7" policy. If the pattern persists or is severe, the ephemeral rule may become a permanent update to the baseline.

The hooking function in the Mac aggregator or Windows-based microservice retrieves the updated CIR, enforcing the predictive rule. As a result, any listing attempts by advanced_sellers after 9 PM are denied, significantly reducing misconfigurations without requiring manual intervention. By automatically tightening rules based on failure patterns, the system ensures efficient and reliable e-commerce operations.

In some embodiments, such as in an enterprise scenario, repeated misconfigurations may occur during container or VM creation at night within pipelines bridging Splunk SIEM to Palo Alto XSIAM or Cisco Zero Trust to Palo Alto Zero Trust. The system logs "15 fail events after 10 PM," signaling a need for stricter provisioning controls. The machine learning model proposes a predictive rule: "time≥22:00=>dev_lead=>only one who can create new resources." This rule is merged into the enterprise CIR, overshadowing the baseline "allow dev_ops 24/7" policy.

The hooking code in the enterprise system references the updated rule, restricting resource creation to the dev_lead role during late hours. Logs reviewed post-implementation show a significant decrease in provisioning failures, validating the effectiveness of the predictive adjustment. By avoiding manual toggles or delayed resets, the system ensures immediate updates to the hooking code upon detecting repeated failure patterns, enhancing reliability and operational efficiency.

These scenarios demonstrate the technical gains offered by directive management system 130. Predictive policy adjustments dynamically address recurring misconfigurations, ensuring real-time enforcement and reducing reliance on manual interventions. By automatically refining governance and provisioning policies, the system provides a scalable and adaptive solution for both consumer and enterprise environments.

In some embodiments, the directive management system 130 enhances cybersecurity through predictive policy adjustments, dynamically transforming ephemeral rules into baseline policies or refining enforcement in response to suspicious activity. These adjustments streamline operations across consumer and enterprise contexts by leveraging historical patterns and real-time analytics.

In a consumer IoT cybersecurity setting, a hooking function bridging Facebook-based streaming rules to an X.com plugin detects repeated suspicious streaming attempts after midnight. Over a week, the system logs 10 such events, prompting the machine learning module to generate a predictive rule: "time≥00:00=>deny streaming unless user=verified_owner." This rule ensures that unauthorized or suspicious streams are blocked during high-risk hours. The new rule is merged into the final CIR for the consumer pipeline, and the hooking code within the camera microservice updates to enforce the rule. As a result, suspicious streams originating after midnight are automatically denied.

In an enterprise cybersecurity environment, ephemeral rules such as "threat≥HIGH=>ephemeral block container" are frequently triggered across pipelines, including AWS-to-Azure transitions and Cisco NGFW to Palo Alto NGFW integrations. These ephemeral denies that are logged repeatedly over time may indicate a persistent security risk. The directive management system 130 recognizes this pattern and transforms the ephemeral rule into a permanent baseline: "Anytime threat≥HIGH=>block container creation."

The hooking function—whether in a Splunk-to-Palo Alto XSIAM pipeline or a Cisco-to-Palo Alto environment—references the updated baseline rule. This ensures that containers are denied under high-threat conditions, minimizing the need for daily reapplication of ephemeral rules. By converting recurring ephemeral denies into stable baseline policies, the directive management system 130 reduces operational overhead while maintaining robust security enforcement.

The directive management system 130 bridges the gap between ephemeral and baseline states, ensuring that repeated ephemeral actions inform and refine long-term policy adjustments. This capability minimizes the need for repeated ephemeral reapplications and provides consistent, real-time enforcement across consumer and enterprise pipelines. The ability to transform transient rules into permanent policies enhances cybersecurity operations, reduces manual intervention, and ensures scalable and adaptive protection against emerging threats.

Centralized or Decentralized Models

In some embodiments, the directive management system 130 supports centralized, decentralized, and hybrid architectures for storing and deploying the CIR objects, accommodating both consumer and enterprise pipelines while balancing real-time consistency, offline resilience, and conflict resolution.

In a centralized architecture, a single aggregator server maintains the authoritative set of baseline and ephemeral policies. Local endpoints, such as Windows or Mac devices, IoT kiosks, or social media brand aggregators, query this central server frequently to retrieve the latest policy updates. For example, Splunk SIEM integration with Palo Alto XSIAM or Cisco NGFW integration with Palo Alto NGFW relies on the centralized server to synchronize zero-trust configurations in real time. While this model ensures a single source of truth and simplifies updates, this model in some situations may be limited by its reliance on connectivity, as disconnected endpoints cannot access new policies until they reconnect.

A decentralized architecture distributes repositories, allowing each unit—such as a departmental AWS-to-Azure bridging system, a local Splunk instance, or a social media aggregator for Facebook and X.com—to maintain its own subset of baseline or ephemeral policies. This setup enables autonomous operation, even during extended offline periods. For instance, a local Splunk instance enforcing ephemeral deny rules based on regional constraints can continue functioning without requiring central server access. However, this autonomy introduces complexity in conflict resolution, as contradictory ephemeral expansions or baseline rules defined by multiple nodes require reconciliation, especially in zero-trust contexts.

The hybrid architecture combines a central aggregator with localized caches, providing a balanced approach that ensures global consistency while allowing edge locations to operate autonomously. The main aggregator resolves and merges the final CIR, while local sites—such as IoT devices, departmental Windows/Mac endpoints, or Cisco and Palo Alto firewalls—store partial or cached copies of the CIR. Local enforcement of ephemeral or baseline rules is possible during offline periods, with synchronization occurring upon reconnection. For example, a remote IoT kiosk can enforce cached ephemeral rules such as "deny advanced_seller after 21:00" while offline, syncing updates back to the central aggregator once connectivity is restored. Similarly, in enterprise contexts, local nodes can enforce zero-trust configurations and partial CIR merges, even when isolated from the central server.

Hooking and partial merges apply to both ephemeral expansions and baseline rules, ensuring uninterrupted governance, provisioning, and cybersecurity operations. For instance, if multiple departments define overlapping baseline statements, the hybrid model facilitates partial merges at local nodes while maintaining synchronization with the central aggregator. By supporting centralized, decentralized, and hybrid architectures, directive management system 130 offers a scalable and adaptive framework for managing the CIR across diverse operational pipelines, achieving a balance between consistency and autonomy.

In governance scenarios, the directive management system 130 may handle both consumer and enterprise pipelines through effective policy merging, synchronization, and hooking mechanisms. In a consumer context, social media policies bridging Facebook to X.com and operational rules transitioning from Windows to Mac require a combination of baseline and ephemeral rules. For instance, a brand aggregator might store baseline policies such as "No explicit content in brand posts" or "Windows users must comply with specific user roles, Mac users with different user roles," alongside ephemeral rules such as "During a holiday campaign, brand_manager can bypass guidelines after 10 PM." Local devices, such as Windows or Mac kiosks managing social media posts, may go offline and enforce an older set of baseline or ephemeral rules until they reconnect.

Partial merges ensure policy consistency during such offline periods. If a Mac-based kiosk is disconnected and the central aggregator issues a new baseline rule such as "deny competitor mentions," the kiosk enforces its older rule set until it syncs. Similarly, ephemeral rules such as "allow verified_influencer to post after midnight if brand_promo=active" are introduced at the aggregator level and merged with the kiosk's local rules upon reconnection. In cases where the kiosk locally introduces a partial override, such as "auto-translate posts from Windows to Mac environment," this rule is merged into the central CIR during the next synchronization. The hooking mechanism on each device ensures that the local policy set—comprising both baseline and ephemeral rules—is applied even during offline periods. For example, newly introduced baseline rules, such as "deny all political ads," are fetched and enforced once the kiosk reconnects, demonstrating the system's capacity to integrate non-ephemeral policies seamlessly.

In an enterprise context, department-level governance rules in AWS-to-Azure migrations rely on a central aggregator to unify local policies. Departments may enforce baseline rules such as "board_approval_ needed=> spend>$1M" and ephemeral expansions such as "CFO override after 6 PM for quarter-end" locally. The central aggregator merges these policies weekly, resolving conflicts and creating a unified CIR to ensure consistent governance across multi-cloud environments. For example, a department might enforce both a baseline rule requiring board approval for high expenditures and an ephemeral rule allowing CFO overrides after 6 PM. On the scheduled replication day, the central aggregator unifies these rules, resolves conflicts, and updates the CIR. Departments then adopt the final merged policy, ensuring uniform governance across AWS and Azure.

The hooking logic in enterprise environments, such as a DevOps pipeline bridging AWS to Azure, references local policies during offline periods. For example, ephemeral rules such as "deny dev_ops after 9 PM if patch advanced_ seller=>200 listings/day." Local aggregators on Mac-based kiosks or Windows-based microservices enforce the rules they have available. When offline, these devices operate on older ephemeral or baseline data until they reconnect and synchronize with the central store.

In some embodiments, partial merges may occur when a local aggregator, disconnected from the central store, processes listings based on its cached rules. For instance, if the central aggregator updates the baseline rule to "region=EU=>max 50 items," the local aggregator only enforces it upon reconnection. Similarly, if the local aggregator introduces a new ephemeral policy such as "time>=21: 00=>advanced_seller=>discount changes," this rule is merged with the central CIR during synchronization. The hooking function within the aggregator intercepts listing creation attempts, applying baseline constraints (e.g., limiting listings to 100 items/day) and ephemeral expansions (e.g., allowing 200 items/day for advanced_sellers during holidays). This enforcement is not limited to ephemeral rules; for example, the hooking mechanism might also block a standard_seller from exceeding daily listing limits, a stable baseline constraint.

In an enterprise scenario, such as multi-cloud provisioning with Splunk SIEM/SOAR to Palo Alto XSIAM, the system handles complex rules involving baseline and ephemeral policies. A baseline rule might specify "dev_ops=>can provision 5 new VMs daily on Azure," while an ephemeral rule adds "deny dev_ops after 21:00 if SIEM indicates threat=HIGH." Each department stores partial policies, with a central aggregator merging them weekly to create a unified CIR. Local hooking at each multi-cloud node references stable daily-limit rules and ephemeral expansions for high-threat conditions. If Splunk SIEM detects a threat level of HIGH, the hooking code immediately denies VM creation requests from dev_ops. During the next sync, the aggregator may refine the daily-limit baseline to "2 VMs/day," ensuring consistent provisioning governance across all sites.

If a department introduces an ephemeral rule such as "patch≥85%=>dev_ops can create new VMs," the aggregator integrates it during the weekly merge, potentially adjusting thresholds for all nodes. This approach allows stable provisioning rules, such as daily VM limits, to coexist with ephemeral expansions, such as threat-based denies. The hooking mechanism ensures that local policies, whether stable or ephemeral, are enforced autonomously during offline periods, while the aggregator unifies and refines these policies for synchronized application across the system. Directive management system 130 thus ensures adaptive, real-time provisioning governance while maintaining consistency and scalability across diverse operational environments.

In some embodiments, the directive management system 130 ensures effective directive management by emphasizing that merging ephemeral expansions or baseline constraints occurs after the CIR is created, as directive extraction and normalization must precede unification. Initially, policies are extracted from their sources, such as AWS IAM, Azure Policy, or Facebook Graph API, and normalized into a standard structure. Without this foundational step, rules cannot be meaningfully unified, as their conditions, actions, resources, and metadata must first be represented in the CIR schema.

The CIR serves as the standard "language" that allows disparate rules to be merged cohesively. For example, merging an ephemeral rule such as "deny devOps after 9 PM if threat=HIGH" with a baseline statement such as "devOps can create 5 VMs daily" requires the structured fields provided by the CIR. These fields define the parameters for conflict resolution and rule prioritization, ensuring consistent interpretation and enforcement.

Most merging of policies occurs during the mid-CIR or post-CIR stages. During mid-CIR creation, as rules are partially normalized, local or central nodes can merge ephemeral expansions with baseline constraints, even if the data is incomplete. For instance, if a node receives a new ephemeral rule while offline, it can integrate the rule into its local CIR copy without waiting for full data synchronization. Conversely, post-CIR merges occur once the aggregator or local environment has fully normalized the policies into a final CIR. At this stage, the directive management system 130 resolves conflicts, applies priorities, and finalizes the unified rules for enforcement.

Hooking and enforcement processes may reference the resulting CIR object, whether during the mid-CIR or post-CIR stage. These hooks ensure that rules—ephemeral or baseline—are applied to user actions or resource creation in real time, providing adaptive enforcement based on the finalized CIR.

In some embodiments, merging policies may require at least a skeleton or partial CIR to unify ephemeral expansions or baseline constraints effectively. Most merging happens during the mid- or post-CIR stages, where policies are standardized, conflicts are resolved, and priorities are applied. Hooking mechanisms rely on this unified CIR for enforcement, highlighting why merging cannot occur pre-CIR creation but must follow the extraction and normalization of policies into the CIR framework. This approach ensures robust, scalable, and consistent directive management across centralized, decentralized, and hybrid architectures.

Policy Federation Across Independent Systems

The directive management system 130 may enable policy federation across independent systems to unify ephemeral and baseline policy sets across multiple distinct platforms, ensuring consistent governance, provisioning, and cybersecurity. Organizations often face the challenge of coordinating policies between disparate systems, such as social media pipelines (e.g., Facebook to X.com), multi-cloud environments (e.g., AWS to Azure), SIEM/SOAR solutions (e.g., Splunk to Palo Alto XSIAM), next-generation firewalls with zero trust (e.g., Cisco NGFW to Palo Alto NGFW), or endpoint management (e.g., Windows to Mac). By leveraging a CIR pipeline, the directive management system 130 exchanges and normalizes rules across these platforms, achieving unified directive enforcement.

In some embodiments, policy federation may maintain consistent policy logic—whether ephemeral (short-term) or baseline (long-term)—across independent nodes or aggregators. For instance, a social media policy server managing ephemeral rules such as "brand_admin can override content guidelines after 10 PM during holidays" needs to align with broader governance frameworks shared with X.com. Similarly, a multi-cloud manager governing "dev_ops can create 5 VMs daily on AWS" must synchronize with Azure configurations. The same applies to SIEM aggregators, firewall controllers, and endpoint provisioning systems that must enforce consistent policies across diverse technologies and contexts.

In some embodiments, the directive management system 130 may unify any policy type—consumer or enterprise, ephemeral or baseline—across separate platforms. Traditional systems often merge policies within a single aggregator, focusing narrowly on a single domain such as social media, cloud provisioning, or firewalls. Directive management system 130 extends this capability by enabling federation across domains. For example, ephemeral deny rules for suspicious activity originating from Facebook IoT cameras can align with baseline content governance on X.com, or zero-trust configurations for Cisco NGFW can synchronize with Palo Alto NGFW across geographically distributed sites.

A federation layer integrated into the CIR pipeline resolves conflicts between disparate policy sets. For example, if AWS provisioning rules specify "allow dev_ops during regular hours," and Azure defines "deny dev_ops during high-threat periods," the system reconciles these conflicts through a unified CIR framework. This ensures that each hooking environment—whether a social media platform, multi-cloud manager, SIEM system, firewall, or endpoint—applies a final, conflict-resolved policy in real time. The system also supports partial offline modes, enabling local nodes to enforce cached policies while synchronizing updates when connectivity is restored.

This ability to federate policies across independent systems enhances operational consistency, minimizes manual reconciliation efforts, and provides scalable enforcement across diverse consumer and enterprise technologies. By bridging governance, provisioning, and cybersecurity policies across platforms, directive management system 130 establishes a robust and adaptive framework for policy integration and enforcement.

In governance scenarios, directive management system 130 facilitates the federation of ephemeral and baseline rules across independent systems, ensuring consistency and resolving conflicts between distinct platforms or divisions. This capability is critical in both consumer and enterprise contexts, where policy alignment across diverse environments is necessary.

For consumer governance, consider two social media networks, Facebook and X.com, aiming to unify influencer rules. On Platform A (Facebook), a baseline rule might state "brand_approval=>influencer can post," while Platform B (X.com) enforces an ephemeral rule, such as "time≥22:00=>deny influencer posts." To achieve cross-platform consistency, both platforms require a unified "influencer policy" for cross-posting. Each platform first merges its ephemeral and baseline sets locally. A federation layer then unifies these rules into a single policy. For example, the final synergy might state "time≥22:00=>brand_approval=true," ensuring consistent influencer constraints across both networks. Hooking modules on Facebook and X.com reference this unified policy, avoiding contradictory enforcement. The technical advantage of this approach lies in its ability to reconcile ephemeral rules such as "deny influencer after 22:00" with stable baselines in real time, providing seamless cross-platform governance.

In enterprise governance, consider two corporate divisions, one operating in an AWS environment and the other in Azure, needing to unify budget override policies. Division 1 might enforce a baseline rule, "board_vote if budget>$1M," and an ephemeral rule, "CFO=>override after 6 PM." Division 2 might have a baseline rule, "finance_admin=>day-shift only," and an ephemeral rule, "threat=HIGH=>freeze budgets." To ensure consistency across these cloud environments, the system enables each division to merge its ephemeral and baseline policies locally. A central aggregator then resolves conflicts and unifies the rules. For example, if an ephemeral CFO override in AWS conflicts with a budget freeze in Azure, the federation process applies conflict resolution logic to create a harmonized policy. Hooking mechanisms in financial systems or network access controllers (NACs) reference this unified policy, ensuring consistent enforcement across both environments.

In provisioning scenarios, the directive management system 130 facilitates federation across independent systems to unify ephemeral and baseline rules, ensuring consistent enforcement across consumer and enterprise environments. This capability is particularly critical for managing IoT e-commerce listings and multi-enterprise development environments.

In a consumer IoT example, consider an e-commerce scenario where Platform A operates on a Windows device with a baseline rule of "allow advanced_seller 24/7," while Platform B, operating on a Mac device, enforces an ephemeral rule of "deny listing after 23:00." Federation merges these partial sets, resulting in a unified policy that acts as a compromise: "deny listing after 00:00." Each platform processes its ephemeral and baseline expansions locally, and a federation layer combines them into the final synergy. For instance, the federation layer resolves the time discrepancy between platforms to ensure the rule is enforceable across both. Hooking mechanisms on the Windows-based aggregator and Mac-based aggregator reference this unified policy to ensure consistent enforcement in their respective e-commerce microservices. This approach resolves platform-specific conflicts and achieves real-time consistency across devices.

In an enterprise provisioning example, consider a scenario involving Splunk SIEM and Palo Alto XSIAM integration for container creation policies. Company A, using Splunk SIEM, enforces a baseline rule, "dev_ops=>up to 5 containers daily," and an ephemeral rule, "deny after 21:00 if patch no limit," and an ephemeral rule, "threat=HIGH=>block container creation." The federation layer merges these partial sets into a unified policy, such as "time≥21:00=>dev_lead only=>up to 5 containers; if threat=HIGH=>block all." Weekly or real-time federation processes combine ephemeral and baseline data from Splunk and Palo XSIAM to ensure consistent governance. Hooking logic within container orchestrators references the unified policy, enabling real-time enforcement of constraints, such as limiting dev_ops operations during high-risk periods or allowing unrestricted container creation for dev_lead roles outside those periods.

In some embodiments, the directive management system 130 provides real-time synergy for provisioning constraints across separate systems, such as SIEM/SOAR solutions or container orchestration platforms. By resolving conflicts and merging partial sets into a consistent policy framework, the system enhances operational consistency, scalability, and adaptability in both consumer and enterprise provisioning contexts. This approach ensures that ephemeral and baseline policies are enforced coherently, regardless of platform differences or operational requirements.

In cybersecurity scenarios, the directive management system 130 federates ephemeral and baseline rules across independent systems, enabling consistent enforcement across consumer IoT solutions and enterprise-level NGFW (Next-Generation Firewall) zero-trust configurations. This federation mechanism ensures unified thresholds and consistent governance across platforms that traditionally operate in isolation.

For consumer IoT solutions, consider two brands sharing suspicious device data. Brand IoT #1 enforces a baseline rule, "alert if suspicious≥0.7," and an ephemeral rule, "deny streaming≥0.9." Brand IoT #2 applies an ephemeral rule, "region=eu=>block suspicious≥0.8," and a baseline rule, "owner can override." To achieve consistency, the federation layer merges these partial sets into a single threshold: "suspicious≥0.8=>block." Each brand's aggregator first processes its ephemeral and baseline constraints locally. The cross-brand federation layer then resolves conflicts to establish the unified threshold. Hooking mechanisms in IoT cameras from both brands reference this final synergy, ensuring that suspicious activity is blocked consistently, regardless of the device or brand. This approach prevents discrepancies in suspicious behavior thresholds and ensures a cohesive security posture across IoT devices.

In an enterprise context, federating NGFW policies between Cisco and Palo Alto zero-trust systems highlights the system's ability to unify ephemeral and baseline rules in complex, multi-site environments. Data center A, using Cisco NGFW, might enforce a baseline rule, "deny containers if patch dev_ops=>deny." Data center B, using Palo Alto NGFW, might enforce an ephemeral rule, "threat=HIGH=>block everything," alongside a baseline rule, "allow dev_ops." The federated aggregator resolves these partial sets into a unified policy. For example, the final synergy could state, "threat=HIGH=>block, patch deny container, time≥23:00=>dev_ops=>deny." Each local NGFW applies ephemeral constraints over baseline rules when required, with the aggregator performing regular updates to ensure global consistency.

The federation process involves local hooking mechanisms referencing ephemeral or baseline constraints as needed. Periodically—daily or monthly—the federated aggregator merges these rules, resolves conflicts, and updates the hooking code at each firewall. This ensures that unified policies are consistently enforced across all nodes. For instance, ephemeral rules such as "time≥23:00=>dev_ops=>deny" might temporarily override baseline permissions, while baseline rules such as "patch deny container" provide a stable foundation for security enforcement.

In some embodiments, the directive management system 130 may employ a three-step process to unify ephemeral and baseline rules across distributed systems, ensuring consistent directive enforcement across platforms such as Facebook, X.com, AWS, Azure, Splunk, Palo Alto XSIAM, Cisco NGFW, and Mac endpoints. This process encompasses local merging, federation exchanges, and post-federation hooking updates to maintain real-time alignment and adapt to dynamic policy requirements.

Each system may begin by locally merging ephemeral and baseline rules derived from various sources, such as hooking events, file-based ingestion, or machine learning-generated suggestions. For instance, ephemeral rules such as "time≥21:00=>deny influencer posts" might combine with baseline rules such as "brand_approval=>influencer can post" within a social media aggregator. Similarly, multi-cloud environments may locally merge ephemeral policies such as "patch deny container creation" with stable baseline rules such as "dev_ops=>create up to 5 VMs daily."

Periodically or on demand, these local rule sets, including deltas from recent changes, are exchanged with a central aggregator or peer-based system in a federation exchange. During this step, the directive management system 130 resolves conflicts between ephemeral and baseline rules. For example, if an ephemeral rule specifies "deny after time≥21:00" but another ephemeral rule specifies "deny after time≥22:00," the federation layer applies priority-based or consensus logic to finalize the unified policy. This ensures that contradictory rules are harmonized, creating a cohesive policy set applicable across all connected systems.

The finalized synergy is then pushed back to each local hooking environment during post-federation hooking updates. For example, brand A's hooking on Facebook, brand B's hooking on X.com, or a data center's hooking on Cisco NGFW or Palo Alto NGFW is updated to reflect the unified expansions. Nodes that were offline, such as remote firewalls or IoT aggregators, continue using their last-known ephemeral and baseline merges until reconnection. Upon reconnecting, these nodes integrate the newly finalized synergy from the federation, ensuring consistency across all systems.

This approach ensures scalable, adaptive, and conflict-resilient directive enforcement across decentralized and federated architectures. Directive management system 130's ability to unify local and global policies dynamically provides robust governance, provisioning, and cybersecurity across consumer and enterprise environments.

Edge-Specific & Hybrid Cloud Governance

In some embodiments, the directive management system 130 may provide continuous enforcement of ephemeral and baseline policy rules in edge-specific and hybrid cloud environments, even when local nodes, such as consumer IoT devices, remote enterprise branches, or mid-migration endpoints, are partially or fully offline. In hybrid contexts—spanning AWS, Azure, and on-prem systems, or environments such as Windows, macOS, and containerized workloads—each node operates based on the last-known synergy of ephemeral and baseline constraints. Once connectivity is restored, directive management system 130 resynchronizes these nodes with a central aggregator or peer nodes, ensuring consistent policy governance without requiring manual interventions or re-deployments.

In some embodiments, the directive management system 130 addresses scenarios that traditional solutions fail to handle effectively. Typical systems often assume always-online hooking or focus solely on ephemeral rule expansions in fully connected environments. In contrast, directive management system 130 dynamically unifies ephemeral and baseline rules in offline or hybrid contexts. For example, in an offline e-commerce platform managing brand policies, directive management system 130 ensures enforcement of cached ephemeral rules such as "deny advanced_seller listing creation after 21:00," alongside baseline constraints such as "limit advanced_seller to 100 listings per day." Similarly, in a Splunk-to-Palo XSIAM partial merge, directive management system 130 ensures local security nodes maintain critical ephemeral constraints, such as "threat≥HIGH=>block all," while respecting baseline rules such as "allow dev_ops provisioning with patch≥80%."

In a hybrid zero-trust firewall configuration spanning Cisco NGFW and Palo Alto NGFW, directive management system 130 ensures consistent local hooking, even during periods of disconnection. A remote firewall node might enforce a baseline rule such as "deny inbound traffic if patch up to 5 listings daily," while an ephemeral rule set at headquarters states "deny listing after midnight." A local aggregator, such as an offline plugin bridging Facebook Graph rules to X.com cross-posting, operates based on its last synchronized ephemeral and baseline rules. At 12:01 AM, local hooking enforces the ephemeral rule, automatically denying requests from standard_sellers because ephemeral constraints overshadow baseline permissions. If a local brand administrator modifies the baseline rule to "allow advanced_seller 24/7," the ephemeral midnight restriction continues to take precedence. Upon reconnection, the aggregator syncs with headquarters, and any changes—such as the removal or modification of the ephemeral rule—are reconciled through conflict resolution. The updated hooking logic reflects the final synergy, ensuring alignment with the unified policy.

In an enterprise scenario involving multi-cloud governance, a remote branch enforces policies governing AWS and Azure environments. The baseline rule might allow "dev_ops=>create expansions in AWS 24/7," while the central aggregator introduces an ephemeral rule stating "time≥21:00=>dev_ops=>deny expansions." While offline, the branch's local aggregator merges ephemeral and baseline rules, with local hooking enforcing the ephemeral restriction during night hours. For example, a dev_ops request to create a new expansion at 10:00 PM is blocked by the ephemeral rule, ensuring compliance with nighttime restrictions. When the branch reconnects after weeks of offline operation, the monthly sync merges local changes with central policies. If the ephemeral rule is made permanent or removed, the central aggregator updates the unified CIR, and any local modifications—such as an added baseline rule such as "Azure dev_ops limit=2" are integrated. The updated hooking logic ensures consistent enforcement across all nodes.

In some embodiments, the directive management system 130 may maintain consistent directive enforcement during partial offline states, where traditional ephemeral hooking typically assumes full connectivity. By supporting local merges of ephemeral and baseline rules and reconciling these with the central aggregator during reconnection, directive management system 130 provides a robust and adaptive governance solution. This approach ensures uninterrupted directive enforcement in both consumer and enterprise pipelines, demonstrating scalability and reliability in distributed and hybrid environments.

In some embodiments, the directive management system 130 effectively manages provisioning policies in offline and hybrid scenarios by ensuring local enforcement of ephemeral and baseline rules while supporting conflict resolution and unification during reconnection. This capability is demonstrated in both consumer and enterprise contexts, allowing adaptive provisioning governance in distributed environments.

In a consumer example involving partial IoT integration from Windows to macOS for cross-app deployments, a baseline rule might specify "standard_user=>run social media automation 24/7 on Windows devices," while an ephemeral rule states "time≥21:00=>advanced_user=>only on mac devices." When the device is offline, directive management system 130 merges ephemeral and baseline rules locally. Local hooking references these merged rules; for example, if a 'standard_user' attempts cross-posting on a macOS device at 10:00 PM, the ephemeral rule denies the action unless the user is recognized as an 'advanced_user'. Offline changes, such as a local plugin update to "manager=>override after 22:00," are merged with the existing ephemeral and baseline rules. Upon reconnection, ephemeral expansions from the brand aggregator—such as adding 'advanced_user' to macOS development groups—are unified with local changes, resolving conflicts automatically and ensuring consistent cross-device provisioning.

In an enterprise example involving hybrid cloud provisioning, such as integrating Splunk with Palo Alto XSIAM or Cisco with Palo Alto systems, the baseline rule might state "dev_ops=>up to 10 VMs daily," while an ephemeral rule from the central aggregator adds "If maintenance=on=>dev_ops=>deny new VMs." During offline periods, directive management system 130 ensures local hooking enforces ephemeral rules over baseline permissions. For instance, if 'maintenance=on' is detected, local hooking denies dev_ops requests to provision new VMs, overriding the baseline rule. Offline edits, such as a local admin updating the baseline rule to "dev_ops=>12 VMs," are integrated into the ephemeral≥baseline merge. Upon reconnection, the central aggregator merges these ephemeral and baseline expansions with local updates to produce a final synergy. This unified policy is then enforced across all connected nodes, maintaining consistency.

In some embodiments, the directive management system 130's approach to ephemeral≥baseline hooking in offline states represents a significant improvement over traditional systems. By ensuring real-time enforcement of merged rules during disconnection and seamlessly integrating updates upon reconnection, directive management system 130 provides robust, scalable, and adaptive provisioning governance for both consumer and enterprise environments. This ensures uninterrupted policy compliance and operational consistency in complex, hybrid infrastructures.

In some embodiments, the directive management system 130 enhances cybersecurity enforcement by merging ephemeral and baseline rules locally for offline nodes and synchronizing updates upon reconnection. This approach is essential for maintaining security integrity in consumer and enterprise contexts, such as IoT devices and edge computing environments, even during extended offline periods.

In a consumer scenario involving offline IoT cameras managed through a Facebook Graph to X.com cross-posting pipeline, the baseline rule might state "owner=>allow streaming," while an ephemeral rule specifies "suspicious≥0.8=>deny streaming." When the cameras are offline, directive management system 130 enforces ephemeral≥baseline rules from the last synchronization. If a suspicious≥0.8 condition is triggered, local hooking denies the streaming request based on the ephemeral rule's priority. If the local baseline is modified offline to "owner=>always allow," the ephemeral rule continues to overshadow it, maintaining security against suspicious activity. Upon reconnection, the aggregator merges local updates, such as relaxed rules introduced during offline operation, with new ephemeral expansions or permanent rules from headquarters. Hooking mechanisms are updated accordingly, ensuring the final synergy is enforced across the system.

In an enterprise scenario, directive management system 130 governs cybersecurity at edge sites, such as remote rigs or facilities, while merging zero-trust policies between Cisco and Palo Alto systems. A baseline rule might specify "patch≥70%=>allow container," with an ephemeral rule adding "threat=HIGH=>block container." While offline for an extended period, such as a month, the edge site continues enforcing ephemeral≥baseline rules through local hooking. If a 'threat=HIGH' condition remains flagged, hooking denies container creation requests, ensuring zero-trust compliance. During offline operation, a local admin might update the baseline to "patch≥75%=>allow container." However, the ephemeral rule continues to take precedence until conditions change or reconnection occurs. Upon resynchronization, directive management system 130 merges local changes with any updates from the central aggregator. If the ephemeral rule "threat=HIGH=>block container" is promoted to a permanent rule, the hooking logic seamlessly reflects this transition, ensuring consistent enforcement.

In some embodiments, the directive management system 130's capability to enforce ephemeral≥baseline rules in real-time through local hooking, even during disconnection, represents a significant advancement over traditional systems. By supporting local merges and enabling seamless updates upon reconnection, directive management system 130 ensures continuous cybersecurity enforcement for both consumer IoT devices and enterprise edge computing environments. This approach enhances security resilience, maintains zero-trust principles, and provides scalable solutions for complex distributed infrastructures.

In some embodiments, the directive management system 130 facilitates a seamless implementation flow for enforcing ephemeral and baseline rules in edge-specific and hybrid cloud environments, ensuring real-time governance, provisioning, and cybersecurity enforcement across distributed and partially connected nodes.

Each IoT gateway, hybrid cloud node, or OS bridging environment hosts a partial aggregator that merges ephemeral≥baseline constraints from the last known synchronization. The hooking code at these nodes references this synergy for real-time enforcement, allowing local policies to operate independently of central systems during disconnection. Local administrators or systems can add ephemeral or stable constraints offline, with conflict resolution occurring locally. These changes are stored in a partial CIR object, ensuring that ephemeral constraints maintain priority over baseline rules where applicable.

Periodic reconnection enables the node to synchronize with a central aggregator. Local ephemeral and baseline expansions unify with new ephemeral rules introduced by headquarters, resolving any conflicts to create a single unified policy. For example, a stricter ephemeral rule from headquarters may overshadow older baseline references, ensuring alignment with global policy updates. Post-synchronization, hooking code updates at the local node reflect the final synergy, allowing for seamless enforcement of updated ephemeral or baseline constraints.

The directive management system 130 ensures continuity in enforcing ephemeral≥baseline policies, even when nodes are partially or fully offline. Local hooking applies last-known merges for real-time governance in consumer scenarios, such as Facebook to X.com cross-posting or brand IoT governance, and enterprise contexts, such as Splunk to Palo XSIAM SIEM or Cisco to Palo Zero Trust NGFW integration. Federated reconnection unifies local expansions with central aggregator updates, enabling conflict resolution and final synergy creation.

The some embodiments, the hybrid pipeline avoids the inefficiencies of daily re-scripting, manual toggles, or missed ephemeral logic in hybrid and partially connected deployments. By bridging ephemeral constraints (e.g., brand promo blocks after midnight, threat=HIGH container blocks) with baseline governance (e.g., daily listing limits, zero-trust firewall postures), directive management system 130 provides a novel, robust solution for real-time directive management. Its scalable architecture adapts seamlessly across consumer and enterprise ecosystems, supporting scenarios such as Facebook to X.com, AWS to Azure, Splunk to Palo XSIAM, Cisco to Palo Alto NGFW, and Windows to macOS migrations. This innovation ensures continuous and adaptive enforcement in complex, distributed environments.

Dynamic Resource Discovery

In some embodiments, the directive management system 130 may provide dynamic resource discovery to continuously identify newly created or connected resources across consumer and enterprise domains, ensuring real-time enforcement of ephemeral and baseline policies without manual operator intervention. These resources can include Facebook or X microservices (e.g., new brand features, page roles, or scheduled posts), AWS or Azure VMs (including serverless or containerized workloads), Splunk SIEM/SOAR or Palo Alto XSIAM connectors and events, Cisco or Palo Alto zero-trust firewall segments (such as new security zones or policy sets), Windows or Mac endpoints (including new desktops or laptops), consumer or enterprise IoT devices (e.g., new cameras, sensors, or industrial IoT), and Infrastructure-as-Code definitions (e.g., new YAML or Terraform entries).

Upon discovering a resource, the directive management system 130 dynamically merges ephemeral and baseline rules from the CIR to ensure immediate compliance and security. For example, if a new IoT camera is connected in a consumer e-commerce environment, an ephemeral rule such as "deny streaming if suspicious≥0.8" is immediately applied, overriding a baseline rule such as "owner can stream any time." Similarly, when a new AWS container resource is created, ephemeral constraints such as "threat=HIGH=>block creation" are prioritized over baseline rules such as "allow container creation for dev_ops." This dynamic merging process eliminates delays associated with manual onboarding and guarantees immediate adherence to governance, provisioning, and cybersecurity standards.

In some embodiments, the directive management system 130 may automate resource onboarding and directive enforcement across diverse environments. Traditional systems often rely on manual configuration updates, such as assigning new firewall rules, applying scheduled post restrictions, or conducting endpoint posture checks for newly added resources. In contrast, directive management system 130 leverages its hooking pipeline to dynamically merge ephemeral≥baseline policies, ensuring real-time security and compliance. This capability spans a wide range of environments, including Facebook to X social media integrations, AWS to Azure cloud provisioning, Splunk to Palo Alto SIEM monitoring, Cisco to Palo Alto zero-trust enforcement, and Windows to Mac migrations.

By continuously discovering resources and applying predefined ephemeral and baseline rules, directive management system 130 provides a unified, scalable, and adaptive solution for dynamic resource governance. This ensures that new resources are immediately incorporated into the organization's security and compliance framework, maintaining robust and consistent directive enforcement across consumer and enterprise domains.

In some embodiments, the directive management system 130 implements dynamic resource discovery through a detailed flow that ensures immediate compliance and security for newly added resources. This process involves discovering resources, referencing relevant rules, merging ephemeral and baseline constraints, updating hooking logic, and maintaining adaptability through future edits.

Resource discovery is initiated through light agents, Network Access Control (NAC) mechanisms, or other monitoring tools. These tools scan for newly added devices, such as IoT cameras, new Git commits introducing Terraform or Azure templates, updated SIEM playbooks in Splunk, new VLAN segments in Cisco environments, or OS enrollments transitioning from Windows to macOS. Each detected resource triggers an automated directive enforcement workflow.

In some embodiments, the directive management system 130 references the CIR to identify ephemeral and baseline constraints relevant to the discovered resource type. For example, ephemeral rules such as "deny after midnight" for a social media post scheduler, or "threat=HIGH=>block" for a zero-trust firewall, may supersede baseline rules such as "allow dev_ops." Conditions such as "region=us_west," "time≥21:00," or "brand_admin only after midnight" are dynamically matched to ensure precise policy application.

The directive management system 130 merges ephemeral and baseline rules for the resource. If an ephemeral rule exists, such as "deny after midnight," it overshadows a conflicting baseline rule such as "allow dev_ops." In the absence of ephemeral rules, baseline rules are applied. The final unified policy is updated in the CIR, ensuring that ephemeral≥baseline constraints are resolved consistently. Hooking code for the target environment is then updated to reflect the final synergy.

Real-time hooking or policy injection is performed to enforce the unified rules in the relevant environment. Examples include hooking mechanisms for Facebook or X microservices, AWS or Azure provisioning pipelines, Splunk or Palo Alto SIEM automation, Cisco or Palo Alto zero-trust firewalls, and Windows or macOS Endpoint Detection and Response (EDR) systems. This ensures immediate compliance and security across diverse platforms.

In some embodiments, future edits are handled dynamically. If an ephemeral rule expires, hooking logic automatically reverts to baseline constraints. When new baseline rules are introduced or ephemeral rules are added, the hooking logic re-syncs to maintain up-to-date enforcement. This adaptability ensures that resources remain compliant with the organization's governance, provisioning, and cybersecurity standards in real time.

In some embodiments, the directive management system 130 provides a dynamic resource discovery that is a robust and scalable solution for managing ephemeral and baseline rules across consumer and enterprise environments. By automating the onboarding process and ensuring immediate rule enforcement, the system eliminates manual interventions and enhances operational efficiency, security, and compliance.

In some embodiments, the directive management system 130 dynamically manages governance, provisioning, and cybersecurity by integrating resource discovery with ephemeral and baseline rule enforcement. This process ensures seamless policy adaptation across consumer and enterprise domains, automatically applying and merging rules without requiring manual intervention.

In a consumer governance scenario, a newly discovered brand microservice in Facebook or X.com triggers updated post-scheduling or user role policies. A baseline rule may specify "manager=>override social guidelines after 21:00," while an ephemeral rule states "brand_admin=>region=EU=>stricter at night." Upon resource discovery, such as detecting a new page role or microservice via a light agent in Facebook or X.com APIs, directive management system 130 merges ephemeral≥baseline rules. The hooking environment on X.com applies the final synergy, such as enforcing the stricter ephemeral rule for brand_admin after midnight. This eliminates the need for manual toggles, ensuring immediate governance compliance when new resources are identified.

In an enterprise governance example, a newly connected Mac device is discovered in the corporate directory through MDM or enrollment processes. The baseline rule may allow "finance_admin=>install software on Windows endpoints," while an ephemeral rule adds "mac endpoints=>only domain_joined=>allow software installs." Directive management system 130 merges ephemeral≥baseline rules and updates the hooking logic. If the Mac is not domain-joined, ephemeral rules deny software installations, overriding baseline permissions. Upon reconnection, the aggregator unifies updates, ensuring consistent governance across all endpoints. This real-time bridging of Windows to Mac device roles under a single hooking pipeline is a significant improvement over traditional methods.

For provisioning, the discovery of new resource definitions in AWS or Azure, such as a new Terraform file in a Git repository, triggers automated directive enforcement. A baseline rule might state "dev_ops=>up to 5 daily VMs,"

while an ephemeral rule adds "time≥00:00=>dev environment=>deny creation." Directive management system 130 detects the new file, merges ephemeral≥baseline rules, and updates the provisioning pipeline to enforce the final synergy. Conflicts are resolved automatically, prioritizing ephemeral rules when necessary, ensuring no manual steps delay enforcement.

In a cybersecurity context, a new VLAN or zero-trust segment, such as "Finance_VLAN," discovered in a Cisco NGFW environment is integrated into the policy framework. A baseline rule may allow "dev_ops=>container traffic," while an ephemeral rule states "threat=HIGH=>block containers." Upon discovery, directive management system 130 merges ephemeral and baseline rules and updates hooking mechanisms in parallel Palo Alto NGFW environments. This ensures consistent enforcement of zero-trust principles across distributed segments.

Similarly, for endpoint security, a newly enrolled Mac device discovered by an EDR agent is subject to immediate policy updates. A baseline rule might allow "standard usage," while an ephemeral rule states "if suspicious_conf≥0.7=>quarantine device." Directive management system 130 merges these rules, and the hooking code enforces the stricter ephemeral condition in real time, quarantining the device when necessary.

Interoperability with Emerging Technologies

In some embodiments, the directive management system 130 may facilitate interoperability with emerging technologies by dynamically merging ephemeral and baseline policies across consumer and enterprise pipelines while extending them to advanced platforms. These platforms include blockchain ledgers for policy auditing, quantum HPC job schedulers for ephemeral task management, federated ML systems for data-driven constraints, on-chain governance tokens for zero-trust environments, and advanced large language models (LLMs) for proactive rule generation.

For blockchain integrations, directive management system 130 hashes ephemeral overrides, such as "time≥21:00=>deny container creation if threat=HIGH," to ensure an immutable audit trail. In quantum HPC environments, the system enforces ephemeral policies such as "time≥21:00=>HPC job=allowed for dev_lead" across hybrid pipelines spanning AWS, Azure, Windows, and macOS. Federated ML systems use ephemeral constraints—e.g., "EU shipping limit=50 if ML confidence≥0.8" as dynamic inputs for real-time decision-making. On-chain governance tokens enable granular control in zero-trust networks, where firewall overrides or ephemeral rules such as "time≥22:00=>deny DMZ traffic" are gated by token validation. Advanced LLM scanning further enhances directive enforcement by identifying suspicious usage or text and dynamically proposing ephemeral rules, such as "deny data access if usage matches anomalous patterns."

The interoperability enabled by directive management system 130 seamlessly integrates ephemeral and baseline constraints with advanced technologies, enabling real-time enforcement in complex, distributed environments. For instance, if a quantum HPC job is scheduled to run after 9 PM in an AWS-to-Azure hybrid setup or Windows-to-macOS HPC environment, the system evaluates and applies ephemeral rules dynamically. Similarly, if a dev_ops user with on-chain governance tokens attempts a firewall override in a Splunk-to-Palo Alto XSIAM pipeline, directive management system 130 enforces ephemeral constraints, ensuring compliance with overarching security and governance policies.

By bridging ephemeral merges with emerging technologies, directive management system 130 provides a robust and scalable solution that adapts to evolving technological landscapes. This approach ensures real-time enforcement, enhanced auditability, and advanced security across consumer and enterprise domains, delivering significant improvements over traditional ephemeral hooking methods.

In some embodiments, the directive management system 130 implements a detailed process for integrating ephemeral and baseline directive enforcement across advanced domains, ensuring real-time governance, provisioning, and cybersecurity in consumer and enterprise environments.

In blockchain-based consumer governance, the system normalizes ephemeral overrides, such as those occurring in Facebook-to-X.com pipelines. Each time an override is triggered, such as "time≥21:00=>brand_manager=>post allowed," the hooking mechanism writes an immutable event to a blockchain ledger. This ensures that ephemeral rule usage is transparently recorded, supporting auditability and compliance.

For enterprise governance in quantum HPC environments, the system references ephemeral and baseline statements, such as those in AWS-to-Azure or Windows-to-macOS transitions. Time-based ephemeral merges, such as "time≥21:00=>dev_lead=>HPC job allowed," enable authorized HPC tasks while denying others. The hooking logic enforces these ephemeral constraints dynamically, ensuring adherence to governance policies.

In federated ML systems used for consumer provisioning, ephemeral constraints are derived from multiple brand microservices, such as "region=EU=>shipping=50." Directive management system 130 merges these ephemeral rules into the final CIR, enabling hooking mechanisms to apply real-time provisioning policies. For instance, ephemeral constraints ensure compliance with region-specific shipping limits without manual reconfiguration.

Enterprise provisioning benefits from blockchain-ledger integration, where every ephemeral action—such as "deny dev_ops VM creation after 9 PM" is hashed and stored on-chain. In pipelines such as Splunk-to-Palo Alto XSIAM or Cisco-to-Palo Alto, this approach surpasses traditional plaintext logs by providing tamper-proof records of ephemeral rule applications.

Consumer cybersecurity is enhanced by advanced LLM scanning. When suspicious patterns are detected, the system generates ephemeral rules, such as "deny streaming if suspicious≥0.8." These ephemeral constraints are applied immediately through hooking mechanisms without requiring daily redeployment or manual intervention.

On-chain governance tokens enable granular control in enterprise cybersecurity. For example, ephemeral rules such as "token≥100=>allow firewall changes" are enforced in real-time by checking token thresholds on the blockchain. If ephemeral constraints specify stricter requirements, such as "deny unless token≥200," the hooking code applies the higher-priority rule dynamically, ensuring zero-trust principles are maintained.

Through this detailed process, directive management system 130 seamlessly integrates ephemeral and baseline policies into emerging technologies. Its adaptive enforcement mechanisms ensure robust compliance, enhanced security, and real-time adaptability across consumer and enterprise domains, setting a new standard for directive management in advanced technological ecosystems.

In some embodiments, the directive management system 130 enables real-time interoperability between emerging technologies and ephemeral or baseline directive management across governance, provisioning, and cybersecurity domains. These processes demonstrate the system's capacity to enforce policies dynamically while ensuring robust compliance and operational efficiency.

In a consumer governance example, Facebook-to-X.com integrations leverage blockchain ledger logging to record brand manager overrides. When ephemeral rules such as "brand_manager=>override after 10 PM" are triggered, the hooking code logs an entry on the blockchain ledger, such as 'User=brand_manager, time=22:15, override=used'. This ensures tamper-proof auditing of ephemeral actions. The system merges ephemeral rules into the CIR and updates hooking mechanisms in the X.com API plugin to enforce these policies dynamically. By appending blockchain transactions in real time, the system provides a transparent and immutable record of ephemeral overrides, ensuring compliance without relying on abstract manual processes.

For enterprise governance, quantum HPC schedulers enforce ephemeral rules such as "time≥21:00=>dev_lead=>HPC job allowed" to manage late-night computational tasks across AWS and Azure or Windows and macOS HPC environments. The HPC job scheduler intercepts job creation requests and enforces ephemeral constraints. If time-based or role-based conditions are unmet, the job is denied. This process unifies ephemeral merges with multi-cloud or cross-OS pipelines, delivering a tangible technical improvement over traditional static schedulers.

In consumer provisioning, federated ML systems integrate ephemeral constraints into cross-platform pipelines such as Facebook-to-X.com or Windows-to-Mac brand configurations. For example, ephemeral rules derived from ML outputs, such as "region=EU=>shipping limit=50 if ML confidence≥0.8," are merged into the CIR. Hooking mechanisms reference the updated policies during e-commerce listing creation, ensuring real-time enforcement of ephemeral constraints. By automating the coordination of ML-generated ephemeral rules across distributed devices, directive management system 130 eliminates the need for daily manual re-scripting.

Enterprise provisioning employs blockchain-ledger-based auditing to enhance ephemeral directive enforcement. In an AWS-to-Azure pipeline, ephemeral rules such as "time≥22:00=>dev_ops=>deny new VM" are enforced by the hooking code. Each denied or successful provisioning attempt is hashed on the blockchain ledger, providing tamper-proof compliance records. This process bridges ephemeral merges with ledger-based governance, enabling transparent policy auditing across multi-cloud environments.

In consumer cybersecurity, the system integrates brand-level LLM scanning with ephemeral rule enforcement. For example, an LLM monitoring IoT camera logs may detect suspicious usage and propose ephemeral rules such as "deny streaming if user !=verified_owner." These ephemeral rules overshadow baseline permissions such as "allow streaming if user=any," and the hooking code enforces the updated policies in real time. This integration of advanced LLM detection with ephemeral rule enforcement delivers a scalable solution for managing dynamic security threats.

Enterprise cybersecurity benefits from on-chain governance tokens to enforce zero-trust policies. Ephemeral rules such as "token≥100=>user can make advanced firewall changes" are dynamically enforced. Hooking modules in Splunk SIEM or Cisco firewalls reference on-chain token balances to determine access. If ephemeral constraints such as "deny unless token≥200" are triggered, the system enforces these stricter rules, ensuring that zero-trust principles are maintained even in complex environments.

By integrating blockchain, quantum HPC, federated ML, and advanced LLMs into its directive management framework, directive management system 130 provides a scalable solution for enforcing ephemeral and baseline rules dynamically across diverse technologies. These capabilities enable robust governance, provisioning, and cybersecurity in both consumer and enterprise contexts.

Robust Compliance & Auditability

In some embodiments, the directive management system 130 ensures robust compliance and auditability in cross-platform policy conversions by dynamically merging ephemeral and baseline constraints while cryptographically logging enforcement outcomes. This approach guarantees tamper-proof audits and real-time adaptability in governance, provisioning, and security contexts.

Each time a policy is applied, whether ephemeral or baseline, the system intercepts and processes the relevant rules. Ephemeral constraints, such as "deny after midnight" or "block if threat=HIGH," are evaluated against baseline rules, such as "allow 24/7 access" or "approve up to 5 containers daily." If ephemeral rules take precedence due to higher priority or contextual relevance, the system updates the Common Intermediate Representation (CIR) and enforces the resulting synergy through real-time hooking mechanisms.

Simultaneously, directive management system 130 logs the enforcement details cryptographically, including data such as timestamp, user, applied rule, and action taken. For example, if a brand manager override is triggered in a Facebook-to-X.com pipeline after 10 PM, the system records the event as a hashed blockchain entry: "User=brand_manager, time=22:15, action=override, rule_applied=ephemeral." This immutable record ensures transparency and compliance for audits while safeguarding against tampering.

In enterprise scenarios, such as multi-cloud CFO budget approvals or zero-trust firewall changes across Cisco and Palo Alto, the system applies the same methodology. Ephemeral rules such as "CFO=>override after 7 PM" or "deny firewall changes if threat=HIGH" are merged with baseline rules in real time. Hooking modules enforce these updates dynamically, and each action is cryptographically logged. For example, a denied firewall change due to an ephemeral rule might generate a ledger entry like "User=net_admin, time=23:45, action=deny, rule_id=E123, reason=threat=HIGH."

By combining real-time directive enforcement with tamper-proof audit trails, directive management system 130 bridges ephemeral and baseline constraints in consumer and enterprise environments. This integration supports governance (e.g., social media cross-posting or departmental budget approvals), provisioning (e.g., multi-cloud resource limits), and cybersecurity (e.g., IoT device streaming or zero-trust firewall policies) with unparalleled compliance and operational integrity.

In some embodiments, the directive management system 130 implements a robust and detailed process for directive enforcement, outcome determination, and cryptographic logging, ensuring both real-time compliance and immutable auditability across consumer and enterprise platforms.

The hooking module serves as the primary mechanism for intercepting user actions and enforcing ephemeral≥baseline constraints. When actions such as a brand manager override for social media, a CFO override in multi-cloud governance, or a dev_ops container creation in a zero-trust firewall occur, the hooking module references the merged ephemeral and baseline rules stored in the Common Intermediate Representation (CIR). If ephemeral rules, such as "time≥22:00=>deny," take precedence over baseline policies, the hooking enforces the ephemeral outcome dynamically. Conversely, if no ephemeral constraints are active, the system defaults to baseline enforcement.

Once an outcome is determined, the system constructs an audit record in a structured format such as JSON. For example:

```
"'json
  {
  "timestamp": "2025-07-01T21:30:00Z",
  "user": "brand_manager",
  "resource": "cross_platform_post",
  "rule_id": "ephemeral_rule_ABC",
  "outcome": "override_granted",
  "compliance_tags": ["ISO27001", "GDPR"]
  }
"'
```

This record includes details such as the timestamp, user, resource, rule applied, outcome, and optional compliance tags for governance audits. The system then cryptographically hashes the record using a secret key or appends it to a secure ledger, such as Hyperledger, an internal blockchain, or hash-based log files. Each appended event is verified to prevent tampering, ensuring an immutable audit trail.

The final stage of the process involves making these logs accessible for audit and compliance purposes. Administrators, brand owners, or zero-trust firewall managers can query the logs to verify past actions. In case of tampering attempts, a mismatch in the cryptographic hash immediately flags the anomaly, ensuring the integrity of the audit records. This process enables comprehensive oversight and compliance verification for ephemeral and baseline rule enforcement across diverse platforms, enhancing both operational transparency and security.

In some embodiments, the directive management system 130 provides robust governance, provisioning, and cybersecurity enforcement by merging ephemeral≥baseline rules, ensuring compliance through hashed logs, and enabling traceability across consumer and enterprise contexts.

In consumer governance scenarios, consider a Facebook to X.com pipeline with a baseline rule: "only brand_admin can schedule cross-posts," but an ephemeral rule states "brand_manager=>override scheduling after 9 PM." If a brand_manager attempts an override at 9:30 PM, the hooking mechanism dynamically evaluates ephemeral≥baseline constraints. If the ephemeral rule is active, the action is allowed, and a cryptographic log is created with details such as time, user, and the applied ephemeral rule ID. This log is then hashed and stored in a secure ledger, ensuring the action can be audited for tamper-proof legitimacy. This approach enables brand owners to trace overrides directly to the ephemeral rule ID, offering proof of compliance and resolving disputes over social media governance.

In enterprise governance, an AWS to Azure multi-cloud environment might have a baseline rule: "CFO=>override budgets," alongside an ephemeral rule: "threat=HIGH=>freeze budgets." When a CFO attempts an override during an active threat, the hooking mechanism enforces the ephemeral rule, denying the action. The outcome, whether deny or allow, is cryptographically logged with metadata such as the ephemeral rule ID, timestamp, and user role. This ensures compliance and allows auditors to verify the precise rule in effect during the action, minimizing disputes over financial decisions in cross-cloud governance.

For consumer provisioning, a Windows IoT kiosk to macOS brand environment may have a baseline rule: "standard_seller=>can list items," and an ephemeral rule: "manager=>indefinite override after 10 PM." If a manager lists an item at 10:30 PM, the kiosk enforces ephemeral≥baseline logic, allowing the action. A cryptographic log records the event, hashed with a brand-level key, enabling brand owners to verify compliance for after-hours provisioning. Similarly, in enterprise provisioning, a Splunk SIEM to Palo Alto XSIAM pipeline might include a baseline rule: "dev_ops=>spin up 5 VMs daily," with an ephemeral rule: "time≥00:00=>no dev environment." If a dev_ops user attempts a creation at 12:05 AM, ephemeral≥baseline logic denies the action, and a hashed log documents the event for future auditing.

In cybersecurity contexts, consumer scenarios such as Facebook to X.com camera streaming may involve a baseline rule: "owner=>streaming," and an ephemeral rule: "if suspicious≥0.8=>deny." When a non-owner triggers the suspicion threshold, ephemeral≥baseline logic denies streaming, and a hashed log captures details such as the time, camera ID, and ephemeral rule ID for brand security reviews. In enterprise cybersecurity, a Cisco NGFW to Palo Alto NGFW zero-trust migration might have a baseline rule: "dev_ops=>container creation," and an ephemeral rule: "threat=HIGH=>block container." When a container creation request is denied due to the ephemeral rule, the event is logged cryptographically with compliance tags (e.g., PCI, HIPAA), enabling auditors to trace the denial to the specific ephemeral rule.

By merging ephemeral to baseline rules and maintaining cryptographically secure logs, directive management system 130 ensures real-time enforcement, robust compliance, and full traceability across governance, provisioning, and cybersecurity domains.

Example Machine Learning Models

In various embodiments, a wide variety of machine learning techniques may be used. Examples include different forms of supervised learning, unsupervised learning, and semi-supervised learning, such as decision trees, support vector machines (SVMs), regression, Bayesian networks, and genetic algorithms. Deep learning techniques such as neural networks, including convolutional neural networks (CNN), recurrent neural networks (RNN), long short-term memory networks (LSTM), transformers, and linear recurrent neural networks such as Mamba may also be used. For example, various directive translation tasks performed by the directive management system, validation tasks performed by the compliance evaluation module, and other processes may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to translate free-text policy descriptions into a standardized schema, the training samples may be pairs of free-text descriptions and corresponding standardized configurations. The labels for each training sample may be binary or multi-class. In training a machine learning model for predicting compliance to regulatory frameworks, the training labels may include a positive label that indicates adherence to regulations and a negative label that indicates non-adherence or violations. In some embodiments, the training labels may also be multi-class, such as different levels of compliance (e.g., full compliance, partial compliance, non-compliance).

By way of example, the training set may include multiple past records of policy deployments with known outcomes. Each training sample in the training set may correspond to a past deployment, and the corresponding outcome may serve as the label for the sample. A training sample may be represented as a feature vector that includes multiple dimensions. Each dimension may include data of a feature, which may be a quantized value of an attribute that describes the past record. For example, in a machine learning model that is used to recommend adjustments to policy translation logic, the features in a feature vector may include policy complexity, historical translation error rates, compliance success rates, etc. In various embodiments, certain preprocessing techniques may be used to normalize the values in different dimensions of the feature vector.

In some embodiments, an unsupervised learning technique may be used. The training samples used for an unsupervised model may also be represented by feature vectors but may not be labeled. Various unsupervised learning techniques such as clustering may be used in determining similarities among the feature vectors, thereby categorizing the training samples into different clusters. In some cases, the training may be semi-supervised, with a training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in policy compliance prediction, the objective function may correspond to minimizing classification error rates or maximizing compliance prediction accuracy. In various embodiments, the error rate may be measured as cross-entropy loss, L1 loss (e.g., the sum of absolute differences between the predicted values and the actual value), or L2 loss (e.g., the sum of squared distances).

Figure 11:
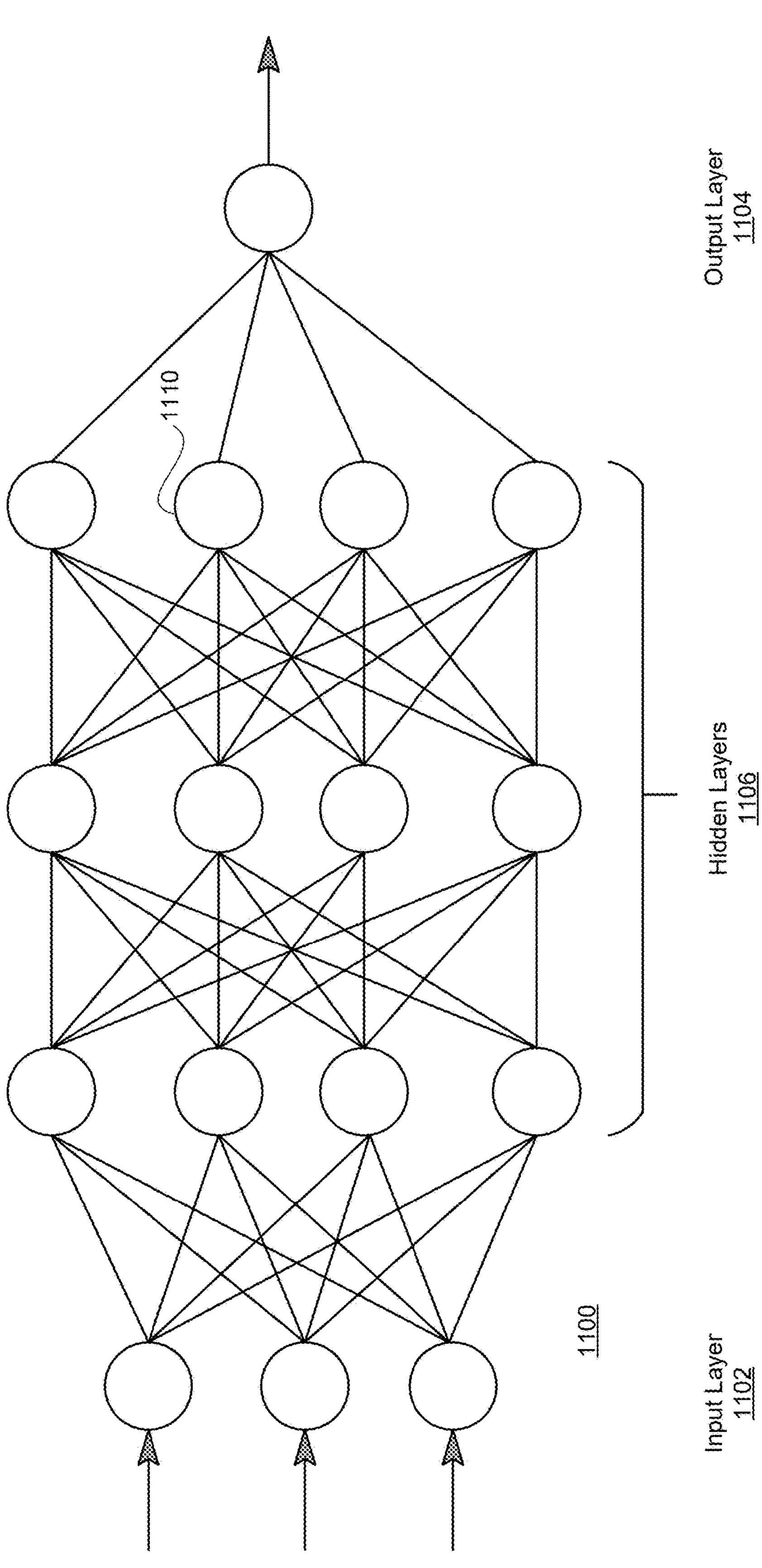
FIG. 11 is a conceptual diagram illustrating a structure of an example neural network, in accordance with some embodiments.

Referring to FIG. 11, a structure of an example neural network is illustrated, in accordance with some embodiments. The neural network 1100 may receive an input and generate an output. The input may be the feature vector of a training sample in the training process and the feature vector of an actual case when the neural network is making an inference. The output may be the prediction, classification, or another determination performed by the neural network. The neural network 1100 may include different kinds of layers, such as convolutional layers, pooling layers, recurrent layers, fully connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layers and pooling layers may be followed by a recurrent layer that includes one or more feedback loops. The feedback may be used to account for spatial relationships of the features in an image or temporal relationships of the objects in the image. The layers may be followed by multiple fully connected layers that have nodes connected to each other. The fully connected layers may be used for classification and object detection. In one embodiment, one or more custom layers may also be presented for the generation of a specific format of the output. For example, a custom layer may be used for image segmentation for labeling pixels of an image input with different segment labels.

The order of layers and the number of layers of the neural network 1100 may vary in different embodiments. In various embodiments, a neural network 1100 includes one or more layers 1102, 1104, and 1106, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes 1110, kernels, and/or coefficients. Training of a neural network, such as the NN 1100, may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loops in RNNs, various gates in LSTMs, etc. The functions may also include an activation function that adjusts the weight of the output of the node. Nodes in different layers may be associated with different functions.

Training of a machine learning model may include an iterative process that includes iterations of making determinations, monitoring the performance of the machine learning model using the objective function, and backpropagation to adjust the weights (e.g., weights, kernel values, coefficients) in various nodes 1110. For example, a computing device may receive a training set that includes policy deployment data with associated outcomes. Each training sample in the training set may be assigned with labels indicating whether the deployment succeeded or failed. The computing device, in a forward propagation, may use the machine learning model to generate predicted deployment outcomes. The computing device may compare the predicted outcomes with the labels of the training sample. The computing device may adjust, in a backpropagation, the weights of the machine learning model based on the comparison. The computing device backpropagates one or more error terms obtained from one or more loss functions to update a set of parameters of the machine learning model. The backpropagating may be performed through the machine learning model and one or more of the error terms based on a difference between a label in the training sample and the generated predicted value by the machine learning model.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through the neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing directive translation, compliance evaluation, or validation tasks or another suitable task for which the model is trained.

In various embodiments, the training samples described above may be refined and used to continue re-training the model, enhancing the model's ability to perform inference tasks. In some embodiments, this training and re-training process may repeat, resulting in a computer system that continues to improve its functionality through the use-retraining cycle. For example, after the model is trained, multiple rounds of re-training may be performed. The process may include periodically retraining the machine learning model. The periodic retraining may include obtaining an additional set of training data, such as through other sources, by usage of users, and by using the trained machine learning model to generate additional samples. The additional set of training data and later retraining may be based on updated data describing updated parameters in training samples. The process may also include applying the additional set of training data to the machine learning model and adjusting parameters of the machine learning model based on the applying of the additional set of training data to the machine learning model. The additional set of training data may include any features and/or characteristics that are mentioned above.

Computing Machine Architecture

Figure 12:
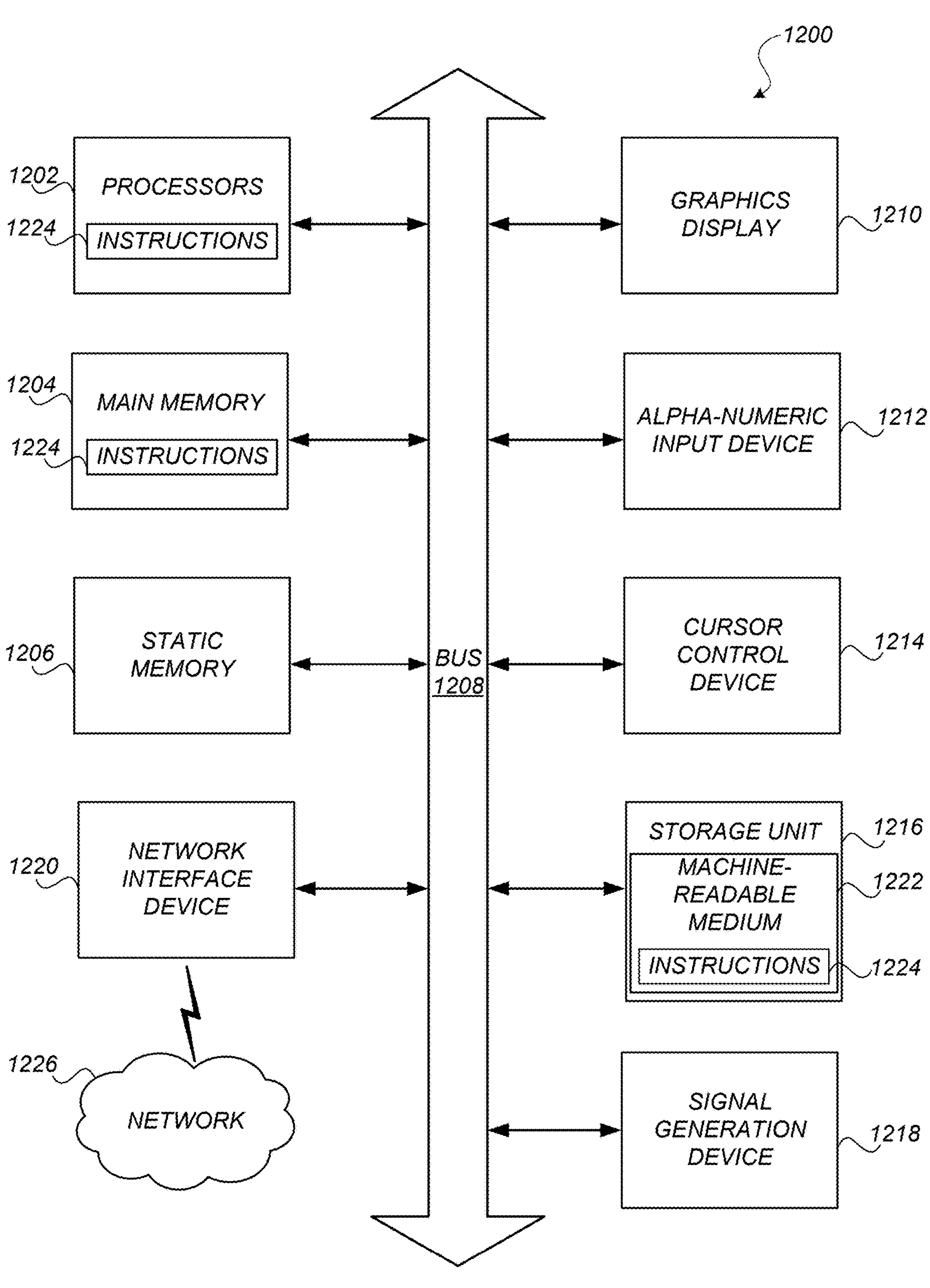
FIG. 12 is a block diagram illustrating components of an example computing machine, in accordance with some embodiments.

FIG. 12 is a block diagram illustrating components of an example computing machine that is capable of reading instructions from a computer-readable medium and executing them in a processor (or controller). A computer described herein may include a single computing machine shown in FIG. 12, a virtual machine, a distributed computing system that includes multiple nodes of computing machines shown in FIG. 12, or any other suitable arrangement of computing devices.

By way of example, FIG. 12 shows a diagrammatic representation of a computing machine in the example form of a computer system 1200 within which instructions 1224 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 12 may correspond to any software, hardware, or combined components shown in FIGS. 1 and 2. While FIG. 12 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1224 that specify actions to be taken by that machine. Further, while only a single machine is illustrated, the terms "machine" and "computer" may also be taken to include any collection of machines that individually or jointly execute instructions 1224 to perform any one or more of the methodologies discussed herein.

The example computer system 1200 includes one or more processors 1202 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1200 may also include a memory 1204 that stores computer code including instructions 1224 that may cause the processors 1202 to perform certain actions when the instructions are executed, directly or indirectly by the processors 1202. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 1202 and reduce the space required for the memory 1204. For example, the database processing techniques described herein reduce the complexity of the computation of the processor 1202 by applying one or more novel techniques that simplify the steps in training, reaching convergence, and generating results of the processors 1202. The algorithms described herein also reduce the size of the models and datasets to reduce the storage space requirement for memory 1204.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributively, comprise instructions that, when executed by one or more processors, cause a processor (including in situation of one or more processors) to perform, individually, together, or distributively, the steps of the instructions stored on the one or more computer-readable media. Similarly, a processor comprises one or more processors or processing units that, individually, together, or distributively, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 1200 may include a main memory 1204, and a static memory 1206, which are configured to communicate with each other via a bus 1208. The computer system 1200 may further include a graphics display unit 1210 (e.g., a plasma display panel (PDP), a liquid crystal display (LCD), a projector, or a cathode ray tube (CRT)). The graphics display unit 1210, controlled by the processor 1202, displays a graphical user interface (GUI) to display one or more results and data generated by the processes described herein. The computer system 1200 may also include an alphanumeric input device 1212 (e.g., a keyboard), a cursor control device 1214 (e.g., a mouse, a trackball, a joystick, a motion sensor, or other pointing instruments), a storage unit 1216 (a hard drive, a solid-state drive, a hybrid drive, a memory disk, etc.), a signal generation device 1218 (e.g., a speaker), and a network interface device 1220, which also are configured to communicate via the bus 1208.

The storage unit 1216 includes a computer-readable medium 1222 on which is stored instructions 1224 embodying any one or more of the methodologies or functions described herein. The instructions 1224 may also reside, completely or at least partially, within the main memory 1204 or within the processor 1202 (e.g., within a processor's cache memory) during execution thereof by the computer system 1200, the main memory 1204 and the processor 1202 also constituting computer-readable media. The instructions 1224 may be transmitted or received over a network 1226 via the network interface device 1220.

While computer-readable medium 1222 is shown in an example embodiment to be a single medium, the term "computer-readable medium" should be taken to include a single medium or multiple media (e.g., a centralized or distributed database, or associated caches and servers) able to store instructions (e.g., instructions 1224). The computer-readable medium may include any medium that is capable of storing instructions (e.g., instructions 1224) for execution by the processors (e.g., processors 1202) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, or storage medium, as well. The dependencies or references in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:

employing a large language model (LLM) to scan data associated with one or more computing resources of an environment, the one or more computing resources being associated with a default directive that controls a function of the one or more computing resources;

receiving, from the LLM, a detection of suspicious usage within the data;

responsive to the detection of the suspicious usage, dynamically generating an ephemeral machine-executable directive based on the suspicious usage, wherein the ephemeral machine-executable directive is generated in response to an event trigger corresponding to the suspicious usage and is configured to temporarily supersede the default directive during persistence of the event trigger;

assigning, to the ephemeral machine-executable directive, a priority tag having a higher enforcement priority than the default directive; and enforcing the ephemeral machine-executable directive in a runtime request flow to gate the function of the one or more computing resources by temporarily superseding the default directive with the ephemeral machine-executable directive based on the priority tag, and reverting to the default directive when the event trigger no longer persists.

2. The method of claim 1, wherein the environment comprises: an operating system, an operating system application, an endpoint computing device, a network appliance, a cloud service, a software as a service platform, or an AI or an AI agent service.

3. The method of claim 1, wherein the data comprises Internet of Things (IoT) device logs.

4. The method of claim 1, wherein the data comprises operating system or endpoint telemetry data, and the telemetry data comprises process, file access, network, or API call events.

5. The method of claim 1, wherein gating the function comprises denying access to the one or more computing resources or denying a data streaming service associated with the one or more computing resources.

6. The method of claim 5, wherein the data streaming is denied based on a determination that a user identity attribute does not satisfy a verified owner criterion for accessing the one or more computing resources.

7. The method of claim 1, wherein enforcing the ephemeral machine-executable directive comprises runtime hooking or policy injection that intercepts user actions or resource creation calls without system downtime or redeployment.

8. The method of claim 1, wherein enforcing the ephemeral machine-executable directive comprises:

persisting the ephemeral machine-executable directive during partial or full offline states of the one or more computing resources by:

locally merging ephemeral machine-executable directive and the default directive; and synchronizing updates upon reconnection.

9. The method of claim 1, wherein generating the ephemeral machine-executable directive is triggered by at least one of: time of day, device posture, a SIEM alert, or external threat intelligence.

10. The method of claim 1, further comprising:

assigning a priority to the ephemeral machine-executable directive; and overriding the default directive with the ephemeral machine-executable directive during a triggering condition.

11. The method of claim 1, wherein the ephemeral machine-executable directive is removed, expires, or is downgraded responsive to a resolution of the suspicious usage.

12. The method of claim 1, further comprising:

automatically applying the ephemeral machine-executable directive to newly detected computing resources within the environment.

13. The method of claim 1, wherein dynamically generating the ephemeral machine-executable directive comprises:

retrieving a source directive; and translating the source directive to the ephemeral machine-executable directive using a platform capability database to generate a platform specific enforcement rule for the environment.

14. The method of claim 13, wherein translating the source directive to the ephemeral machine-executable directive comprises retaining compliance attributes including regulatory tags preserved in a common intermediate representation (CIR).

15. The method of claim 1, further comprising:

presenting the ephemeral machine-executable directive for a human-in-the-loop review prior to enforcement.

16. The method of claim 1, wherein gating the function of the one or more computing resources comprises denying resource creation or modification operations including at least one of: container creation, virtual machine instantiation, firewall rule changes, or file write operations.

17. The method of claim 1, wherein the detection of the suspicious usage within the data comprises:

evaluating whether the data meets a predefined pattern that describes the suspicious usage.

18. The method of claim 1, wherein the detection of the suspicious usage within the data comprises:

evaluating whether the data meets an anomalous usage pattern that defines the suspicious usage.

19. The method of claim 1, further comprising cryptographically logging enforcement outcomes to a tamper evident ledger.

20. A directive-management system, comprising:

one or more processors; and memory configured to store code comprising instructions, wherein the instructions, when executed by the one or more processors, cause the one or more processors to:

employ a large language model (LLM) to scan data associated with one or more computing resources of an environment, the one or more computing resources being associated with a default directive that controls a function of the one or more computing resources;

receive, from the LLM, a detection of suspicious usage within the data;

responsive to the detection of the suspicious usage, dynamically generate an ephemeral machine-executable directive based on the suspicious usage, wherein the ephemeral machine-executable directive is generated in response to an event trigger corresponding to the suspicious usage and is configured to temporarily supersede the default directive during persistence of the event trigger;

assign, to the ephemeral machine-executable directive, a priority tag having a higher enforcement priority than the default directive; and enforce the ephemeral machine-executable directive in a runtime request flow to gate the function of the one or more computing resources by temporarily superseding the default directive with the ephemeral machine-executable directive based on the priority tag, and reverting to the default directive when the event trigger no longer persists.

21. A non-transitory computer-readable medium configured to store code comprising instructions, wherein the instructions, when executed by one or more processors, cause the one or more processors to:

employ a large language model (LLM) to scan data associated with one or more computing resources of an environment, the one or more computing resources being associated with a default directive that controls a function of the one or more computing resources;

receive, from the LLM, a detection of suspicious usage within the data;

responsive to the detection of the suspicious usage, dynamically generate an ephemeral machine-executable directive based on the suspicious usage, wherein the ephemeral machine-executable directive is generated in response to an event trigger corresponding to the suspicious usage and is configured to temporarily supersede the default directive during persistence of the event trigger; assign, to the ephemeral machine-executable directive, a priority tag having a higher enforcement priority than the default directive; and enforce the ephemeral machine-executable directive in a runtime request flow to gate the function of the one or more computing resources by temporarily superseding the default directive with the ephemeral machine-executable directive based on the priority tag, and reverting to the default directive when the event trigger no longer persists.

* * * * *